US012663624B2

(12) United States Patent (10) Patent No.: US 12,663,624 B2

Noda (45) Date of Patent: Jun. 23, 2026

(54) ZOOM LENS AND IMAGING APPARATUS

(71) Applicant: FUJIFILM Corporation, Tokyo (JP)

(72) Inventor: Taiga Noda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 323 days.

(21) Appl. No.: 18/182,104

(22) Filed: Mar. 10, 2023

(65) Prior Publication Data

US 2023/0305276 A1 Sep. 28, 2023

(30) Foreign Application Priority Data

Mar. 28, 2022 (JP) ................................. 2022-052532

(51) Int. Cl.
| | |
|---|---|
| *G02B 15/14* | (2006.01) |
| *G02B 13/00* | (2006.01) |
| *G02B 13/02* | (2006.01) |
| *G02B 27/00* | (2006.01) |

(52) U.S. Cl.
CPC ... *G02B 15/145105* (2019.08); *G02B 13/009* (2013.01); *G02B 13/02* (2013.01); *G02B 27/0025* (2013.01)

(58) Field of Classification Search
CPC .......... G02B 15/145105; G02B 13/009; G02B 13/02; G02B 27/0025; G02B 15/144105; G02B 15/16
See application file for complete search history.

(56) References Cited

U.S. PATENT DOCUMENTS

| | | |
|---|---|---|
| 2009/0251778 A1 | 10/2009 | Adachi et al. |
| 2011/0286105 A1 | 11/2011 | Yamanaka et al. |

| | | |
|---|---|---|
| 2013/0258494 A1 | 10/2013 | Saori |
| 2014/0268365 A1 | 9/2014 | Nishio et al. |
| 2015/0338620 A1 | 11/2015 | Iwasawa |
| 2017/0336601 A1 | 11/2017 | Wei et al. |

(Continued)

FOREIGN PATENT DOCUMENTS

| | | |
|---|---|---|
| JP | 2009-265654 A | 11/2009 |
| JP | 2011-247962 A | 12/2011 |

(Continued)

OTHER PUBLICATIONS

Gross Herbert et al. Handbook of Optical Systems, 2007, Wiley-VCH, vol. 3: Aberration Theory and Correction of Optical Systems, pp. 242-379 (Year: 2007).*

(Continued)

*Primary Examiner* — Ricky L Mack

*Assistant Examiner* — K Muhammad

(74) *Attorney, Agent, or Firm* — Studebaker Brackett PLLC

(57) ABSTRACT

The zoom lens consists of, in order from an object side, a first lens group that has a positive refractive power, a second lens group that has a negative refractive power, a middle group that includes one or more lens groups, and a final lens group. The middle group has a positive refractive power as a whole throughout an entire zoom range. During zooming, a spacing between the first lens group and the second lens group changes, a spacing between the second lens group and the middle group changes, and a spacing between the middle group and the final lens group changes. The zoom lens satisfies predetermined conditional expressions.

74 Claims, 22 Drawing Sheets

EXAMPLE 1

(56) References Cited

U.S. PATENT DOCUMENTS

| | | | |
|---|---|---|---|
| 2018/0045929 A1 | 2/2018 | Takemoto | |
| 2018/0095242 A1 | 4/2018 | Iwamoto et al. | |
| 2019/0187444 A1* | 6/2019 | Arai | G02B 13/18 |
| 2019/0271829 A1 | 9/2019 | Hatada | |
| 2020/0158998 A1 | 5/2020 | Tanaka | |
| 2020/0174235 A1 | 6/2020 | Kikuchi | |
| 2020/0174236 A1* | 6/2020 | Kikuchi | G02B 15/145105 |
| 2022/0390724 A1* | 12/2022 | Noda | G02B 15/145105 |
| 2024/0061223 A1 | 2/2024 | Kikuchi | |
| 2025/0052983 A1 | 2/2025 | Tokunaga et al. | |

FOREIGN PATENT DOCUMENTS

| | | |
|---|---|---|
| JP | 2013-205532 A | 10/2013 |
| JP | 2014-006354 A | 1/2014 |
| JP | 2014-178478 A | 9/2014 |
| JP | 2016-122221 A | 7/2016 |
| JP | 2016-156901 A | 9/2016 |
| JP | 2017-134302 A | 8/2017 |
| JP | 2017-207667 A | 11/2017 |
| JP | 2018-025623 A | 2/2018 |
| JP | 2018-054989 A | 4/2018 |
| JP | 2018-146739 A | 9/2018 |
| JP | 2019-132887 A | 8/2019 |
| JP | 2020-071439 A | 5/2020 |
| JP | 2020-085925 A | 6/2020 |
| JP | 2020-086304 A | 6/2020 |
| JP | 2020-086305 A | 6/2020 |
| JP | 2020-086331 A | 6/2020 |
| JP | 2020-106681 A | 7/2020 |
| JP | 2021-032928 A | 3/2021 |
| JP | 2023-104137 A | 7/2023 |
| JP | 2023-130688 A | 9/2023 |
| WO | 2023/090050 A1 | 5/2023 |

OTHER PUBLICATIONS

"Notice of Reasons for Refusal" Office Action issued in JP 2022-052532; mailed by the Japanese Patent Office on Nov. 4, 2025.
An Office Action, "Notice of Reasons for Refusal," mailed by the Japanese Patent Office on Jan. 13, 2026, which corresponds to Japanese Patent Application JP 2022-052532 and is related to U.S. Appl. No. 18/182,104; with English langauge translation.

* cited by examiner

EXAMPLE 1

EXAMPLE 1

EXAMPLE 2

EXAMPLE 2

EXAMPLE 3

EXAMPLE 3

WIDE

TELE

EXAMPLE 3

EXAMPLE 4

EXAMPLE 4

EXAMPLE 5

EXAMPLE 5

EXAMPLE 6

EXAMPLE 6

EXAMPLE 7

EXAMPLE 7

EXAMPLE 8

EXAMPLE 8

EXAMPLE 8

ZOOM LENS AND IMAGING APPARATUS

CROSS-REFERENCE TO RELATED APPLICATIONS

This application claims priority from Japanese Patent Application No. 2022-052532, filed on Mar. 28, 2022, the entire disclosure of which is incorporated herein by reference.

BACKGROUND

Technical Field

The technique of the present disclosure relates to a zoom lens and an imaging apparatus.

Related Art

In the related art, as a zoom lens that can be used in an imaging apparatus such as a digital camera, a zoom lens described in JP2020-086305A below is known.

There is a demand for a zoom lens which has a high zoom ratio and maintains favorable optical performance while being configured to have a small size. The demand level is increasing year by year.

SUMMARY

An object of the present disclosure is to provide a zoom lens, which has a high zoom ratio and maintains favorable optical performance while being configured to have a small size, and an imaging apparatus comprising the zoom lens.

According to one aspect of the present disclosure, there is provided a zoom lens consisting of, in order from an object side to an image side: a first lens group that has a positive refractive power; a second lens group that has a negative refractive power; a middle group that includes one or more lens groups; and a final lens group. The middle group has a positive refractive power as a whole throughout an entire zoom range. During zooming, a spacing between the first lens group and the second lens group changes, a spacing between the second lens group and the middle group changes, and a spacing between the middle group and the final lens group changes. In a case where the middle group includes a plurality of lens groups, all spacings of adjacent lens groups in the middle group change during zooming. Assuming that a focal length of a whole system in a state where an infinite distance object is in focus at a wide angle end is fw, and a focal length of the whole system in a state where the infinite distance object is in focus at a telephoto end is ft, Conditional Expression (1) is satisfied, which is represented by $$6 < ft/fw < 30 \tag{1}$$

It is preferable that the zoom lens of the above-mentioned aspect satisfies Conditional Expression (1-1).

$$7.5 < ft/fw < 20 \tag{1-1}$$

Assuming that an Abbe number of a lens closest to the object side in the first lens group based on a d line is vd1, it is preferable that the zoom lens according to the above-mentioned aspect satisfies Conditional Expression (2), which is represented by $$29.6 < vd1 < 50 \tag{2}$$

Assuming that an Abbe number of a lens which is second from the object side in the first lens group based on a d line is vd2, and an Abbe number of a lens which is third from the object side in the first lens group based on the d line is vd3, it is preferable that the zoom lens according to the above-mentioned aspect satisfies Conditional Expression (3), which is represented by $$68 < (vd2 + vd3)/2 < 98 \tag{3}$$

The final lens group may be configured to have a negative refractive power.

The first lens group may be configured to consist of a negative lens, a positive lens, and a positive lens, in order from the object side to the image side.

It is preferable that the zoom lens according to the above-mentioned aspect includes a focus group that moves along an optical axis during focusing. It is preferable that the focus group has a negative refractive power. It is preferable that the focus group includes a positive lens and a negative lens. The focus group may be configured to consist of a cemented lens in which a positive lens and a negative lens are cemented to each other. A lens group which is fourth from the object side in the zoom lens may be configured to be a focus group that moves along an optical axis during focusing.

It is preferable that the middle group includes at least one lens group that has a positive refractive power. The middle group may be configured to include a lens group that has a positive refractive power at a position closest to the object side. The middle group may be configured to include, successively in order from a position closest to the object side to the image side, a lens group that has a positive refractive power and a lens group that has a negative refractive power.

A configuration may be made such that all the lens groups move during zooming.

The zoom lens according to the above-mentioned aspect may be configured to consist of five lens groups as a whole. Alternatively, the zoom lens according to the above-mentioned aspect may be configured to consist of six lens groups as a whole.

A lens group closest to the object side in the middle group may be configured to include, successively in order from the object side to the image side, a positive lens, a positive lens, and a negative lens. The lens group closest to the object side in the middle group may be configured to include, successively in order from the image side to the object side, a positive lens, a positive lens, and a negative lens.

The second lens group may be configured to consist of, in order from the object side to the image side, a negative lens, a negative lens, a positive lens, and a negative lens.

Assuming that an F number in a state where the infinite distance object is in focus at the telephoto end is FNot, it is preferable that the zoom lens according to the above-mentioned aspect satisfies Conditional Expression (4), which is represented by $$45 < FNot \times (ft/fw) < 130 \tag{4}$$

Assuming that a sum of a back focal length of the whole system at an air-equivalent distance and a distance on an optical axis from a lens surface closest to the object side in the first lens group to a lens surface closest to the image side in the final lens group in a state where the infinite distance object is in focus at the wide angle end is TLw, it is preferable that the zoom lens according to the above-mentioned aspect satisfies Conditional Expression (5), which is represented by $$4.5 < TLw/fw < 9.5 \tag{5}$$

Assuming that a sum of a back focal length of the whole system at an air-equivalent distance and a distance on an optical axis from a lens surface closest to the object side in the first lens group to a lens surface closest to the image side in the final lens group in a state where the infinite distance object is in focus at the telephoto end is TLt, it is preferable that the zoom lens according to the above-mentioned aspect satisfies Conditional Expression (6), which is represented by $$0.5 < TLt/ft < 1.3 \tag{6}$$

Assuming that a sum of a back focal length of the whole system at an air-equivalent distance and a distance on an optical axis from a lens surface closest to the object side in the first lens group to a lens surface closest to the image side in the final lens group in a state where the infinite distance object is in focus at the telephoto end is TLt, and a maximum half angle of view in a state where the infinite distance object is in focus at the telephoto end is $\omega t$, it is preferable that the zoom lens according to the above-mentioned aspect satisfies Conditional Expression (7), which is represented by $$10 < TLt/(ft \times \tan \omega t) < 18 \tag{7}$$

Assuming that a back focal length of the whole system at an air-equivalent distance in a state where the infinite distance object is in focus at the wide angle end is Bfw, and a maximum half angle of view in a state where the infinite distance object is in focus at the wide angle end is $\omega w$, it is preferable that the zoom lens according to the above-mentioned aspect satisfies Conditional Expression (8), which is represented by $$0.5 < Bfw/(fw \times \tan \omega w) < 1.1 \tag{8}$$

Assuming that a distance on an optical axis from a lens surface closest to the object side in the first lens group to a paraxial entrance pupil position in a state where the infinite distance object is in focus at the wide angle end is Denw, it is preferable that the zoom lens according to the above-mentioned aspect satisfies Conditional Expression (9), which is represented by $$1.1 < Denw/fw < 1.9 \tag{9}$$

It is preferable that a lens group which is fourth from the object side in the zoom lens is set as a fourth lens group, and the fourth lens group moves during at least one of zooming or focusing. Assuming that a distance on an optical axis from a lens surface closest to the object side in the fourth lens group to a lens surface closest to the image side in the fourth lens group is DG4, and a sum of a back focal length of the whole system at an air-equivalent distance and a distance on an optical axis from a lens surface closest to the object side in the first lens group to a lens surface closest to the image side in the final lens group in a state where the infinite distance object is in focus at the wide angle end is TLw, it is preferable that the zoom lens according to the above-mentioned aspect satisfies Conditional Expression (10), which is represented by $$0.009 < DG4/TLw < 0.12 \tag{10}$$

In a configuration in which the zoom lens includes a focus group in which the zoom lens according to the above-mentioned aspect moves along an optical axis during focusing, assuming that an average value of specific gravities of all lenses in the focus group is Gfave, it is preferable that the zoom lens according to the above-mentioned aspect satisfies Conditional Expression (11), which is represented by $$2.3 < Gfave < 5.15 \tag{11}$$

In a configuration in which the zoom lens according to the above-mentioned aspect includes a focus group that moves along an optical axis during focusing, the focus group includes at least one negative lens, and assuming that a specific gravity of the at least one negative lens in the focus group is Gfn, it is preferable that the zoom lens according to the above-mentioned aspect satisfies Conditional Expression (12), which is represented by $$2.4 < Gfn < 5.6 \tag{12}$$

In a configuration in which the zoom lens includes a vibration-proof group in which the zoom lens of the above-mentioned aspect moves in a direction intersecting with an optical axis during image shake correction, and assuming that an average value of specific gravities of all lenses in the vibration-proof group is GISave, it is preferable that the zoom lens according to the above-mentioned aspect satisfies Conditional Expression (13), which is represented by $$2.5 < GISave < 5.2 \tag{13}$$

In a configuration in which the zoom lens includes a vibration-proof group that moves in a direction intersecting with an optical axis during image shake correction, the vibration-proof group includes at least one positive lens, and assuming that a specific gravity of the at least one positive lens in the vibration-proof group is GISp, it is preferable that the zoom lens according to the above-mentioned aspect satisfies Conditional Expression (14), which is represented by $$2.6 < GISp < 5 \tag{14}$$

Assuming that an amount of movement of the first lens group during zooming from the wide angle end to the telephoto end is M1, a sign of M1 is positive in a case where the first lens group moves from the object side to the image side and is negative in a case where the first lens group moves from the image side to the object side, and a sum of a back focal length of the whole system at an air-equivalent distance and a distance on an optical axis from a lens surface closest to the object side in the first lens group to a lens surface closest to the image side in the final lens group in a state where the infinite distance object is in focus at the telephoto end is TLt, it is preferable that the zoom lens according to the above-mentioned aspect satisfies Conditional Expression (15), which is represented by $$0.25 < -M1/TLt < 0.6 \tag{15}$$

Assuming that an amount of movement of the second lens group during zooming from the wide angle end to the telephoto end is M2, a sign of M2 is positive in a case where the second lens group moves from the object side to the image side and is negative in a case where the second lens group moves from the image side to the object side, and a sum of a back focal length of the whole system at an air-equivalent distance and a distance on an optical axis from a lens surface closest to the object side in the first lens group to a lens surface closest to the image side in the final lens group in a state where the infinite distance object is in focus at the telephoto end is TLt, it is preferable that the zoom lens according to the above-mentioned aspect satisfies Conditional Expression (16), which is represented by $$0.01 < -M2/TLt < 0.2 \tag{16}$$

It is preferable that a lens group closest to the object side in the middle group is set as a third lens group. Assuming that an amount of movement of the third lens group during zooming from the wide angle end to the telephoto end is M3, a sign of M3 is positive in a case where the third lens group moves from the object side to the image side and is negative in a case where the third lens group moves from the image side to the object side, and a sum of a back focal length of the whole system at an air-equivalent distance and a distance on an optical axis from a lens surface closest to the object side in the first lens group to a lens surface closest to the image side in the final lens group in a state where the infinite distance object is in focus at the telephoto end is TLt, it is preferable that the zoom lens according to the above-mentioned aspect satisfies Conditional Expression (17), which is represented by $$0.08 < -M3/TLt < 0.4 \tag{17}$$

It is preferable that a lens group which is fourth from the object side in the zoom lens is set as a fourth lens group. Assuming that an amount of movement of the fourth lens group during zooming from the wide angle end to the telephoto end is M4, a sign of M4 is positive in a case where the fourth lens group moves from the object side to the image side and is negative in a case where the fourth lens group moves from the image side to the object side, and a sum of a back focal length of the whole system at an air-equivalent distance and a distance on an optical axis from a lens surface closest to the object side in the first lens group to a lens surface closest to the image side in the final lens group in a state where the infinite distance object is in focus at the telephoto end is TLt, it is preferable that the zoom lens according to the above-mentioned aspect satisfies Conditional Expression (18), which is represented by $$0.15 < -M4/TLt < 0.3 \tag{18}$$

It is preferable that a lens group which is fifth from the object side in the zoom lens is set as a fifth lens group. Assuming that an amount of movement of the fifth lens group during zooming from the wide angle end to the telephoto end is M5, a sign of M5 is positive in a case where the fifth lens group moves from the object side to the image side and is negative in a case where the fifth lens group moves from the image side to the object side, and a sum of a back focal length of the whole system at an air-equivalent distance and a distance on an optical axis from a lens surface closest to the object side in the first lens group to a lens surface closest to the image side in the final lens group in a state where the infinite distance object is in focus at the telephoto end is TLt, it is preferable that the zoom lens according to the above-mentioned aspect satisfies Conditional Expression (19), which is represented by $$0.11 < -M5/TLt < 0.31 \tag{19}$$

Assuming that a central thickness of a lens closest to the object side in the first lens group is d1, and an effective diameter of an object side surface of the lens closest to the object side in the first lens group is ED1, it is preferable that the zoom lens according to the above-mentioned aspect satisfies Conditional Expression (20), which is represented by $$0.022 < d1/ED1 < 0.04 \tag{20}$$

Assuming that a central thickness of a lens closest to the object side in the first lens group is d1, a distance on an optical axis from a lens surface closest to the object side in the first lens group to a paraxial entrance pupil position in a state where the infinite distance object is in focus at the wide angle end is Denw, and a maximum half angle of view in a state where the infinite distance object is in focus at the wide angle end is ωw, it is preferable that the zoom lens according to the above-mentioned aspect satisfies Conditional Expression (21), which is represented by $$0.035 < d1/(Denw \times \tan \omega w) < 0.077 \tag{21}$$

Assuming that a central thickness of a lens which is second from the object side in the first lens group is d2, a paraxial curvature radius of an object side surface of the lens which is second from the object side in the first lens group is R2f, and a paraxial curvature radius of an image side surface of the lens which is second from the object side in the first lens group is R2r, it is preferable that the zoom lens according to the above-mentioned aspect satisfies Conditional Expression (22), which is represented by $$0.06 < d2 \times (1/R2f - 1/R2r) < 0.19 \tag{22}$$

Assuming that a central thickness of a lens closest to the object side in the first lens group is d1, and a focal length of the first lens group is f1, it is preferable that the zoom lens according to the above-mentioned aspect satisfies Conditional Expression (23), which is represented by $$0.01 < d1/f1 < 0.021 \tag{23}$$

Assuming that a central thickness of a lens closest to the object side in the first lens group is d1, and a distance on an optical axis from a lens surface closest to the object side in the first lens group to a lens surface closest to the image side in the first lens group is DG1, it is preferable that the zoom lens according to the above-mentioned aspect satisfies Conditional Expression (24), which is represented by $$0.06 < d1/DG1 < 0.125 \tag{24}$$

Assuming that an Abbe number of a lens which is second from the object side in the first lens group based on a d line is vd2, it is preferable that the zoom lens according to the above-mentioned aspect satisfies Conditional Expression (25), which is represented by $$75 < vd2 < 120 \tag{25}$$

Assuming that an Abbe number of a lens which is third from the object side in the first lens group based on a d line is vd3, it is preferable that the zoom lens according to the above-mentioned aspect satisfies Conditional Expression (26), which is represented by $$70 < vd3 < 110 \tag{26}$$

Assuming that a partial dispersion ratio of a lens which is second from the object side in the first lens group between a g line and an F line is θgF2, it is preferable that the zoom lens according to the above-mentioned aspect satisfies Conditional Expression (27), which is represented by $$0.46 < \theta gF2 < 0.62 \tag{27}$$

Assuming that a partial dispersion ratio of a lens which is third from the object side in the first lens group between a g line and an F line is θgF3, it is preferable that the zoom lens according to the above-mentioned aspect satisfies Conditional Expression (28), which is represented by $$0.46 < \theta gF3 < 0.62 \tag{28}$$

Assuming that a paraxial curvature radius of a surface having a minimum absolute value of the paraxial curvature radius among object side concave surfaces of lenses in the final lens group is REf, and a focal length of the final lens group is fE, it is preferable that the zoom lens according to the above-mentioned aspect satisfies Conditional Expression (29), which is represented by $$-18 < REf/fE < -2 \tag{29}$$

In a configuration in which the zoom lens includes a focus group in which the zoom lens according to the above-mentioned aspect moves along an optical axis during focusing, assuming that a paraxial curvature radius of a lens surface closest to the object side in the focus group is RfF, and a paraxial curvature radius of a lens surface closest to the image side in the focus group is RfR, it is preferable that the zoom lens according to the above-mentioned aspect satisfies Conditional Expression (30), which is represented by $$1.5 < RfF/RfR < 6 \qquad (30).$$

In a configuration in which the zoom lens includes a focus group in which the zoom lens according to the above-mentioned aspect moves along an optical axis during focusing, assuming that a focal length of the focus group is ffoc, it is preferable that the zoom lens according to the above-mentioned aspect satisfies Conditional Expression (31), which is represented by $$-0.35 < ffoc/ft < -0.02 \qquad (31).$$

In a configuration in which the zoom lens includes a vibration-proof group in which the zoom lens of the above-mentioned aspect moves in a direction intersecting with an optical axis during image shake correction, assuming that a focal length of the vibration-proof group is fIS, it is preferable that the zoom lens according to the above-mentioned aspect satisfies Conditional Expression (32), which is represented by $$0.01 < |fIS/ft| < 0.35 \qquad (32).$$

Assuming that a focal length of the second lens group is f2, and a focal length of a lens which is second from the object side in the second lens group is fL22, it is preferable that the zoom lens according to the above-mentioned aspect satisfies Conditional Expression (33), which is represented by $$1.4 < fL22/f2 < 7 \qquad (33).$$

In a configuration in which the zoom lens includes a focus group in which the zoom lens according to the above-mentioned aspect moves along an optical axis during focusing, assuming that a lateral magnification of the focus group in a state where the infinite distance object is in focus at the wide angle end is $\beta fw$, and a combined lateral magnification of all lenses closer to the image side than the focus group in a state where the infinite distance object is in focus at the wide angle end is $\beta fRw$, it is preferable that the zoom lens according to the above-mentioned aspect satisfies Conditional Expression (34), which is represented by $$-6 < (1-\beta fw^2) \times \beta fRw^2 < -1 \qquad (34).$$

In a configuration in which the zoom lens includes a focus group in which the zoom lens according to the above-mentioned aspect moves along an optical axis during focusing, assuming that a lateral magnification of the focus group in a state where the infinite distance object is in focus at the telephoto end is $\beta ft$, and a combined lateral magnification of all lenses closer to the image side than the focus group in a state where the infinite distance object is in focus at the telephoto end is $\beta fRt$, it is preferable that the zoom lens according to the above-mentioned aspect satisfies Conditional Expression (35), which is represented by $$-25 < (1-\beta ft^2) \times \beta fRt^2 < -6.3 \qquad (35).$$

In a configuration in which the zoom lens includes a vibration-proof group in which the zoom lens according to the above-mentioned aspect moves in a direction intersecting with an optical axis during image shake correction, assuming that a lateral magnification of the vibration-proof group in a state where the infinite distance object is in focus at the wide angle end is $\beta ISw$, and a combined lateral magnification of all lenses closer to the image side than the vibration-proof group in a state where the infinite distance object is in focus at the wide angle end is $\beta ISRw$, it is preferable that the zoom lens according to the above-mentioned aspect satisfies Conditional Expression (36), which is represented by $$0.75 < |(1-\beta ISw) \times \beta ISRw| < 2.5 \qquad (36).$$

In a configuration in which the zoom lens includes a vibration-proof group in which the zoom lens according to the above-mentioned aspect moves in a direction intersecting with an optical axis during image shake correction, assuming that a lateral magnification of the vibration-proof group in a state where the infinite distance object is in focus at the telephoto end is $\beta ISt$, and a combined lateral magnification of all lenses closer to the image side than the vibration-proof group in a state where the infinite distance object is in focus at the telephoto end is $\beta ISRt$, it is preferable that the zoom lens according to the above-mentioned aspect satisfies Conditional Expression (37), which is represented by $$1.7 < |(1-\beta ISt) \times \beta ISRt| < 7 \qquad (37).$$

In a configuration in which the zoom lens includes a focus group in which the zoom lens according to the above-mentioned aspect moves along an optical axis during focusing, assuming that a lateral magnification of the focus group in a state where the infinite distance object is in focus at the wide angle end is $\beta fw$, a combined lateral magnification of all lenses closer to the image side than the focus group in a state where the infinite distance object is in focus at the wide angle end is $\beta fRw$, a focal length of the focus group is ffoc, a composite focal length of all lenses closer to the image side than the focus group in a state where the infinite distance object is in focus at the wide angle end is ffRw, a sum of a back focal length of the whole system at an air-equivalent distance and a distance on an optical axis from a paraxial exit pupil position to a lens surface closest to the image side in the final lens group in a state where the infinite distance object is in focus at the wide angle end is Dexw, a maximum half angle of view in a state where the infinite distance object is in focus at the wide angle end is $\omega w$, $\gamma w = (1-\beta fw^2) \times \beta fRw^2$, and $BRw = \{\beta fw/(ffoc \times \gamma w) - 1/(\beta fRw \times ffRw) - (1/Dexw)\}$, it is preferable that the zoom lens according to the above-mentioned aspect satisfies Conditional Expression (38), which is represented by $$0 < |BRw \times (fw \times \tan \omega w)| < 0.25 \qquad (38).$$

In a configuration in which the zoom lens includes a focus group in which the zoom lens according to the above-mentioned aspect moves along an optical axis during focusing, assuming that a lateral magnification of the focus group in a state where the infinite distance object is in focus at the telephoto end is $\beta ft$, a combined lateral magnification of all lenses closer to the image side than the focus group in a state where the infinite distance object is in focus at the telephoto end is $\beta fRt$, a focal length of the focus group is ffoc, a composite focal length of all lenses closer to the image side than the focus group in a state where the infinite distance object is in focus at the telephoto end is ffRt, a sum of a back focal length of the whole system at an air-equivalent distance and a distance on an optical axis from a paraxial exit pupil position to a lens surface closest to the image side in the final lens group in a state where the infinite distance object is in focus at the telephoto end is Dext, a maximum half angle of view in a state where the infinite distance object is in focus at the telephoto end is $\omega t$, $\gamma t=(1-\beta ft^2)\times\beta fRt^2$, and $BRt=\{\beta ft/(ffoc\times\gamma t)-1/(\beta fRt\times ffRt)-(1/Dext)\}$, it is preferable that the zoom lens according to the above-mentioned aspect satisfies Conditional Expression (39), which is represented by $$0<|BRt\times(ft\times\tan \omega t)|<0.034 \tag{39}$$

Assuming that a focal length of the first lens group is f1, and a focal length of the second lens group is f2, it is preferable that the zoom lens according to the above-mentioned aspect satisfies Conditional Expression (40), which is represented by $$-10<f1/f2<-5.6 \tag{40}$$

Assuming that a focal length of the second lens group is f2, and a focal length of a lens group closest to the object side in the middle group is f3, it is preferable that the zoom lens according to the above-mentioned aspect satisfies Conditional Expression (41), which is represented by $$-0.9<f2/f3<-0.54 \tag{41}$$

It is preferable that a lens group closest to the object side in the middle group includes five or more lenses.

In a configuration in which the zoom lens includes a focus group in which the zoom lens according to the above-mentioned aspect moves along an optical axis during focusing, it is preferable that the number of lenses included in the focus group is two or less.

It is preferable that among movement loci of respective lens groups that move during zooming from the wide angle end to the telephoto end, different movement loci are only five.

The zoom lens according to the above-mentioned aspect may be configured to include a plurality of lens groups that move on the same movement locus during zooming from the wide angle end to the telephoto end. In such a case, the zoom lens according to the above-mentioned aspect may be configured to include a focus group that moves along an optical axis during focusing, and the focus group may be configured to be located between the plurality of lens groups that move on the same movement locus.

It is preferable that a lens group which is fourth from the object side in the zoom lens and the final lens group move on the same movement locus during zooming from the wide angle end to the telephoto end.

It is preferable that a lens group which is fourth from the object side in the zoom lens is set as a fourth lens group. Assuming that an amount of movement of the fourth lens group during zooming from the wide angle end to the telephoto end is M4, an amount of movement of the final lens group during zooming from the wide angle end to the telephoto end is ME, and signs of M4 and ME are positive in a case where the fourth lens group and the final lens group move from the object side to the image side and are negative in a case where the fourth lens group and the final lens group move from the image side to the object side, it is preferable that the zoom lens according to the above-mentioned aspect satisfies Conditional Expression (42), which is represented by $$0.9<M4/ME<1.1 \tag{42}$$

Assuming that a focal length of the middle group in a state where the infinite distance object is in focus at the wide angle end is fMw, it is preferable that the zoom lens according to the above-mentioned aspect satisfies Conditional Expression (43), which is represented by $$0.54<fw/fMw<0.95 \tag{43}$$

Assuming that a focal length of the middle group in a state where the infinite distance object is in focus at the telephoto end is fMt, it is preferable that the zoom lens according to the above-mentioned aspect satisfies Conditional Expression (44), which is represented by $$5.1<ft/fMt<20 \tag{44}$$

In a configuration in which the zoom lens includes a focus group in which the zoom lens according to the above-mentioned aspect moves along an optical axis during focusing, assuming that an amount of movement of a lens group adjacent to the object side in the focus group during zooming from the wide angle end to the telephoto end is MfF, an amount of movement of a lens group adjacent to the image side in the focus group during zooming from the wide angle end to the telephoto end is MfR, and signs of MfF and MfR are positive in a case where the lens groups move from the object side to the image side and are negative in a case where the lens groups move from the image side to the object side, it is preferable that the zoom lens according to the above-mentioned aspect satisfies Conditional Expression (45), which is represented by $$0.9<MfF/MfR<1.1 \tag{45}$$

The zoom lens according to the above-mentioned aspect may be configured to include eight or more lens surfaces each having an aspherical shape.

A lens closest to the image side in the second lens group may be configured to include an aspherical surface. A lens closest to the object side in the second lens group may be configured to include an aspherical surface.

A lens closest to the image side in a lens group closest to the object side in the middle group may be configured to include an aspherical surface. A lens closest to the object side in the lens group closest to the object side in the middle group may be configured to include an aspherical surface.

An object side surface of a lens closest to the image side in the second lens group may be configured to have an aspherical shape by which a refractive power at a position of a maximum effective diameter is weaker than a refractive power near an optical axis.

An image side surface of a lens closest to the object side in the second lens group may be configured to have an aspherical shape by which a refractive power at a position of a maximum effective diameter is stronger than a refractive power near an optical axis.

An object side surface of a lens closest to the image side in a lens group closest to the object side in the middle group may be configured to have an aspherical shape by which a refractive power at a position of a maximum effective diameter is weaker than a refractive power near an optical axis.

An image side surface of a lens closest to the object side in a lens group closest to the object side in the middle group may be configured to have an aspherical shape by which a refractive power at a position of a maximum effective diameter is weaker than a refractive power near an optical axis.

Assuming that a paraxial curvature radius of an object side surface of a lens closest to the image side in the second lens group is Rc2ef, and a curvature radius of the object side surface of the lens closest to the image side in the second lens group at a position of a maximum effective diameter is Ry2ef, it is preferable that the zoom lens according to the above-mentioned aspect satisfies Conditional Expression (46), which is represented by $$0.1 < Rc2ef/Ry2ef < 0.999 \tag{46}$$

Assuming that a paraxial curvature radius of an image side surface of a lens closest to the object side in the second lens group is Rc21r, and a curvature radius of the image side surface of the lens closest to the object side in the second lens group at a position of a maximum effective diameter is Ry21r, it is preferable that the zoom lens according to the above-mentioned aspect satisfies Conditional Expression (47), which is represented by $$1.001 < Rc21r/Ry21r < 4.5 \tag{47}$$

Assuming that a paraxial curvature radius of an object side surface of a lens closest to the image side in a lens group closest to the object side in the middle group is Rc3ef, and a curvature radius of the object side surface of the lens closest to the image side in the lens group closest to the object side in the middle group at a position of a maximum effective diameter is Ry3ef, it is preferable that the zoom lens according to the above-mentioned aspect satisfies Conditional Expression (48), which is represented by $$0.1 < Rc3ef/Ry3ef < 0.999 \tag{48}$$

Assuming that a paraxial curvature radius of an image side surface of a lens closest to the object side in a lens group closest to the object side in the middle group is Rc31r, and a curvature radius of the image side surface of the lens closest to the object side in the lens group closest to the object side in the middle group at a position of a maximum effective diameter is Ry31r, it is preferable that the zoom lens according to the above-mentioned aspect satisfies Conditional Expression (49), which is represented by $$0 < Rc31r/Ry31r < 0.999 \tag{49}$$

Assuming that a paraxial curvature radius of an object side surface of a lens closest to the image side in the second lens group is Rc2ef, a paraxial curvature radius of an image side surface of a lens closest to the image side in the second lens group is Rc2er, a curvature radius of the object side surface of the lens closest to the image side in the second lens group at a position of a maximum effective diameter is Ry2ef, and a curvature radius of the image side surface of the lens closest to the image side in the second lens group at the position of the maximum effective diameter is Ry2er, it is preferable that the zoom lens according to the above-mentioned aspect satisfies Conditional Expression (50), which is represented by $$1.05 < (1/Rc2ef - 1/Rc2er)/(1/Ry2ef - 1/Ry2er) < 5 \tag{50}$$

Assuming that a paraxial curvature radius of an object side surface of a lens closest to the object side in the second lens group is Rc21f, a paraxial curvature radius of an image side surface of the lens closest to the object side in the second lens group is Rc21r, a curvature radius of the object side surface of the lens closest to the object side in the second lens group at a position of a maximum effective diameter is Ry21f, and a curvature radius of the image side surface of the lens closest to the object side in the second lens group at the position of the maximum effective diameter is Ry21r, it is preferable that the zoom lens according to the above-mentioned aspect satisfies Conditional Expression (51), which is represented by $$0.4 < (1/Rc21f - 1/Rc21r)/(1/Ry21f - 1/Ry21r) < 0.99 \tag{51}$$

Assuming that a paraxial curvature radius of an object side surface of a lens closest to the image side in a lens group closest to the object side in the middle group is Rc3ef, a paraxial curvature radius of an image side surface of the lens closest to the image side in the lens group closest to the object side in the middle group is Rc3er, a curvature radius of the object side surface of the lens closest to the image side in the lens group closest to the object side in the middle group at a position of a maximum effective diameter is Ry3ef, and a curvature radius of the image side surface of the lens closest to the image side in the lens group closest to the object side in the middle group at the position of the maximum effective diameter is Ry3er, it is preferable that the zoom lens according to the above-mentioned aspect satisfies Conditional Expression (52), which is represented by $$1.01 < (1/Rc3ef - 1/Rc3er)/(1/Ry3ef - 1/Ry3er) < 2 \tag{52}$$

Assuming that a paraxial curvature radius of an object side surface of a lens closest to the object side in the middle group is Rc31f, a paraxial curvature radius of an image side surface of the lens closest to the object side in the lens group closest to the object side in the middle group is Rc31r, a curvature radius of the object side surface of the lens closest to the object side in the lens group closest to the object side in the middle group at a position of a maximum effective diameter is Ry31f, and a curvature radius of the image side surface of the lens closest to the object side in the lens group closest to the object side in the middle group at the position of the maximum effective diameter is Ry31r, it is preferable that the zoom lens according to the above-mentioned aspect satisfies Conditional Expression (53), which is represented by $$1.1 < (1/Rc31f - 1/Rc31r)/(1/Ry31f - 1/Ry31r) < 3 \tag{53}$$

The imaging apparatus according to another aspect of the present disclosure includes the zoom lens according to the above-mentioned aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the terms "group that has a positive refractive power" and "group that has a positive refractive power" mean that the group as a whole has a positive refractive power. Similarly, the terms "group that has a negative refractive power" and "group has a negative refractive power" mean that the group as a whole has a negative refractive power. The term "a lens that has a positive refractive power" and the term "a positive lens" are synonymous. The term "a lens that has a negative refractive power" and the term "negative lens" are synonymous. The terms "first lens group", "second lens group", "middle group", "lens group", "final lens group", "focus group", and "vibration-proof group" in the present specification are not limited to a configuration consisting of a plurality of lenses, but may be a configuration consisting of only one lens.

A compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The sign of the refractive power and the surface shape of the lens including the aspherical surface will be used in terms of the paraxial region unless otherwise specified. The sign of the curvature radius of the convex surface facing toward the object side is positive, and the sign of the curvature radius of the convex surface facing toward the image side is negative.

In the present specification, the term "whole system" means "zoom lens". The "focal length" used in a conditional expression is a paraxial focal length. Unless otherwise specified, the "distance on the optical axis" used in a conditional expression is considered as a geometrical distance. The values used in the conditional expressions are values in a case where the d line is used as a reference in a state where the infinite distance object is in focus unless otherwise specified.

The "d line", "C line", "F line", and "g line" described in the present specification are emission lines. It is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the present disclosure, it is possible to provide a zoom lens, which has a high zoom ratio and maintains favorable optical performance while being configured to have a small size, and an imaging apparatus comprising the zoom lens.

DESCRIPTION OF EMBODIMENTS

Figure 1:
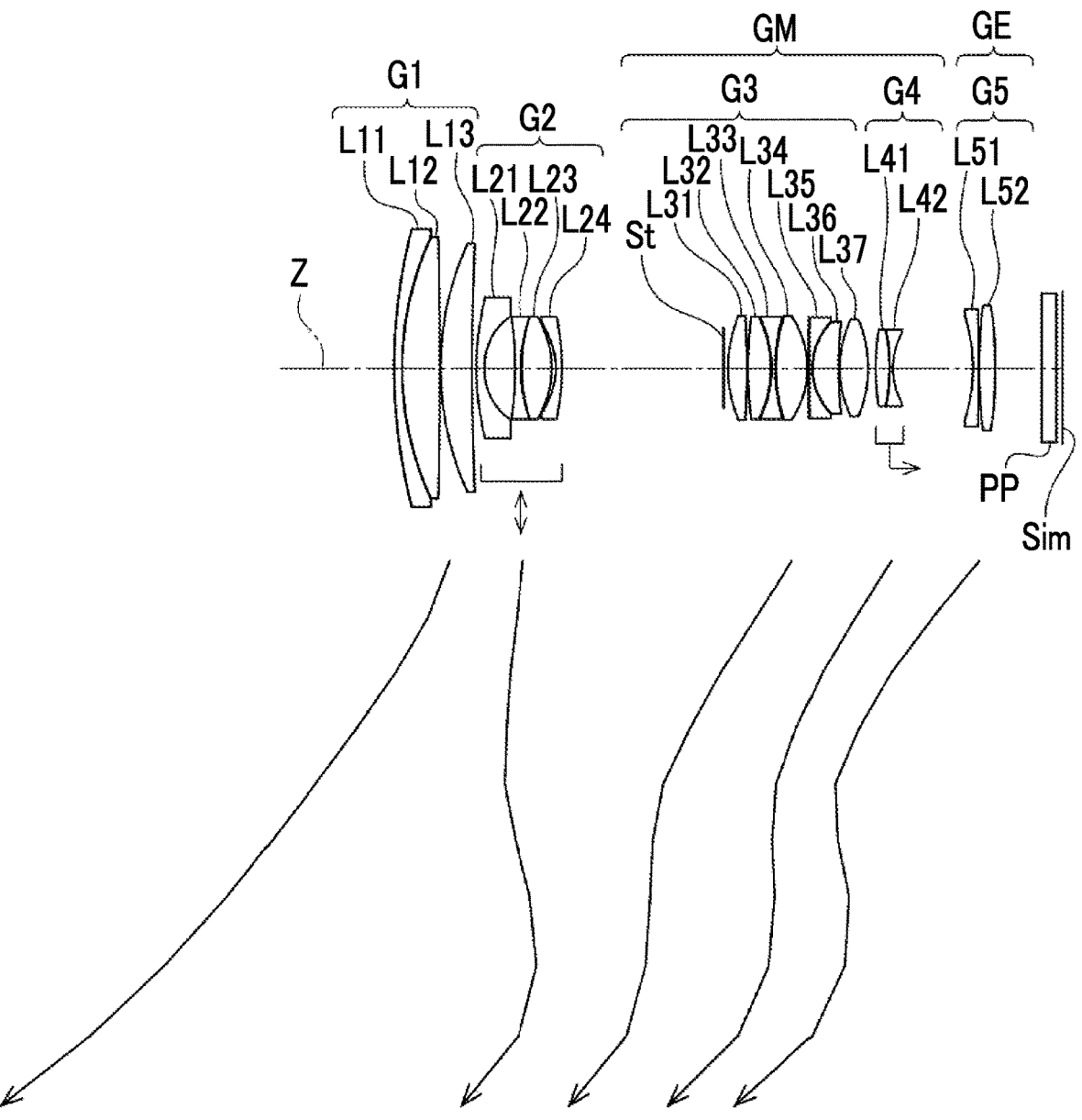
FIG. 1 is a cross-sectional view showing a configuration of a zoom lens according to an embodiment and a diagram showing movement loci thereof, the zoom lens corresponding to a zoom lens of Example 1.
Figure 2:
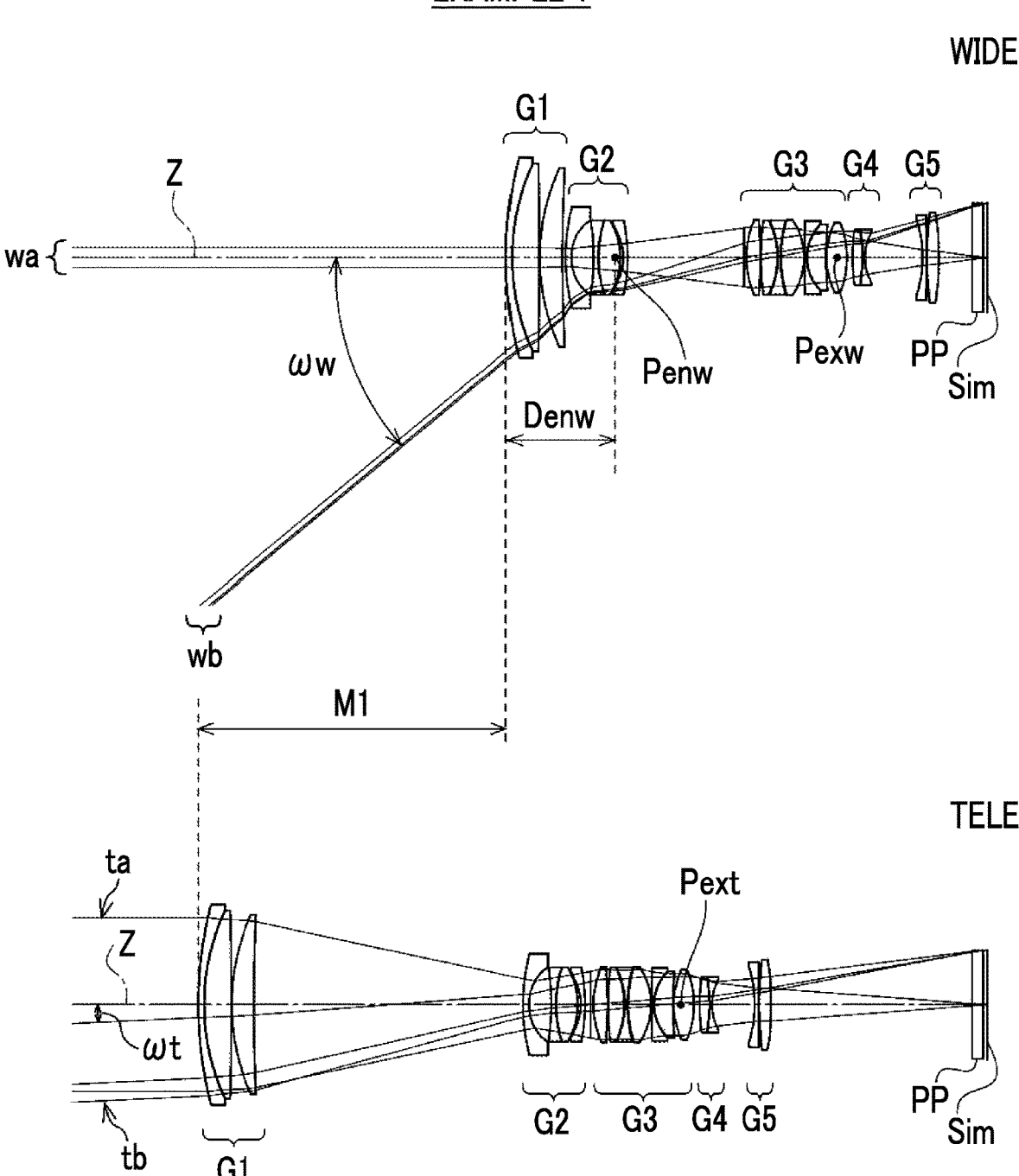
FIG. 2 is a diagram showing a configuration and luminous flux in each zooming state of the zoom lens of FIG. 1.

Hereinafter, embodiments of the present disclosure will be described with reference to the accompanying drawings. FIG. 1 shows a cross-sectional view of a configuration and movement loci of a zoom lens according to an embodiment of the present disclosure at a wide angle end. Further, FIG. 2 shows a cross-sectional view and a luminous flux of the configuration of the zoom lens of FIG. 1 in each state. In FIG. 2, the upper part labeled "WIDE" shows a wide angle end state, and the lower part labeled "TELE" shows a telephoto end state. FIG. 2 shows, as the luminous flux, an on-axis luminous flux wa and luminous flux wb with a maximum half angle of view ωw in the wide angle end state and an on-axis luminous flux ta and luminous flux tb with a maximum half angle of view ωt in the telephoto end state. The examples shown in FIGS. 1 and 2 correspond to a zoom lens of Example 1 to be described later. FIGS. 1 and 2 show situations where an infinite distance object is in focus, the left side thereof is an object side, and the right side thereof is an image side. Hereinafter, the zoom lens according to the embodiment of the present disclosure will be described mainly with reference to FIG. 1.

FIG. 1 shows an example in which, assuming that a zoom lens is applied to an imaging apparatus, an optical member PP having a parallel plate shape is disposed between the zoom lens and an image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The zoom lens of the present disclosure consists of, in order from the object side to the image side along an optical axis Z, a first lens group G1 that has a positive refractive power, a second lens group G2 that has a negative refractive power, a middle group GM that includes one or more lens groups, and a final lens group GE. During zooming, the spacing between the first lens group G1 and the second lens group G2 changes, the spacing between the second lens group G2 and the middle group GM changes, and the spacing between the middle group GM and the final lens group GE changes. Further, in a case where the middle group GM includes a plurality of lens groups, all the spacings of adjacent lens groups in the middle group GM change during zooming. According to the above-mentioned configuration, there is an advantage in achieving a high zoom ratio. The middle group GM has a positive refractive power as a whole throughout the entire zoom range. By setting the refractive power of the middle group GM in such a manner, there is an advantage in achieving reduction in total length of the lens system.

The "first lens group G1", "second lens group G2", "lens groups" included in the middle group GM, and "final lens group GE" in the present specification are constituent parts of the zoom lens, and are parts which are separated by the air spacings that change during zooming and each of which includes at least one lens. During zooming, each lens group as a unit moves or remains stationary, and the mutual spacing between the lenses in each lens group does not change. That is, in the present specification, one lens group is a group in which the spacing between adjacent groups changes during zooming and the total spacing between adjacent lenses does not change within itself.

For example, the zoom lens of FIG. 1 consists of a first lens group G1, a second lens group G2, a third lens group G3, a fourth lens group G4, and a fifth lens group G5, in order from the object side to the image side. In the example of FIG. 1, the middle group GM consists of a third lens group G3 and a fourth lens group G4, and the final lens group GE consists of a fifth lens group G5. As described above, in a case where the zoom lens is configured to consist of five lens groups as a whole, there is an advantage in achieving reduction in total length of the lens system while simplifying the zooming mechanism.

For example, each lens group in FIG. 1 is composed of lenses described below. The first lens group G1 consists of three lenses L11 to L13, in order from the object side to the image side. The second lens group G2 consists of four lenses L21 to L24, in order from the object side to the image side. The third lens group G3 consists of an aperture stop St and seven lenses L31 to L37, in order from the object side to the image side. The fourth lens group G4 consists of two lenses L41 and L42, in order from the object side to the image side. The fifth lens group G5 consists of two lenses L51 and L52, in order from the object side to the image side. The aperture stop St shown in FIG. 1 does not indicate the shape and size, but indicates the position in an optical axis direction.

In the example of FIG. 1, during zooming, all the lens groups move along the optical axis Z by changing the spacings between the adjacent lens groups. The curved arrow under each of the five lens groups in FIG. 1 indicates an approximate movement locus of each lens group during zooming from the wide angle end to the telephoto end. As in the example of FIG. 1, in a case where all the lens groups are configured to move during zooming, there is an advantage in suppressing various aberrations in the entire zoom range.

The first lens group G1 may be configured to consist of a negative lens, a positive lens, and a positive lens, in order from the object side to the image side. In such a case, there is an advantage in suppressing lateral chromatic aberration at the wide angle end and longitudinal chromatic aberration at the telephoto end while achieving reduction in total length of the lens system.

The second lens group G2 may be configured to consist of, in order from the object side to the image side, a negative lens, a negative lens, a positive lens, and a negative lens. In such a case, there is an advantage in suppressing lateral chromatic aberration at the wide angle end.

It is preferable that the middle group GM includes at least one lens group that has a positive refractive power. In such a case, there is an advantage in achieving reduction in total length of the lens system. The middle group GM may be configured to include a lens group that has a positive refractive power at a position closest to the object side. In such a case, there is an advantage in achieving reduction in total length of the lens system. The middle group GM may be configured to include, successively in order from a position closest to the object side to the image side, a lens group that has a positive refractive power and a lens group that has a negative refractive power. In such a case, there is an advantage in suppressing field curvature.

A lens group closest to the object side in the middle group GM may be configured to include, successively in order from the object side to the image side, a positive lens, a positive lens, and a negative lens. In such a case, there is an advantage in suppressing spherical aberration. A more preferable configuration is a configuration in which the lens group closest to the object side in the middle group GM includes, successively in order from a position closest to the object side to the image side, a positive lens, a positive lens, and a negative lens.

The lens group closest to the object side in the middle group GM may be configured to include, successively in order from the image side to the object side, a positive lens, a positive lens, and a negative lens. In such a case, there is an advantage in suppressing field curvature. A more preferable configuration is a configuration in which the lens group closest to the object side in the middle group GM includes, successively in order from the image side to the object side, a positive lens, a positive lens, and a negative lens.

The lens group closest to the object side in the middle group GM may be configured to include five or more lenses. In such a case, there is an advantage in suppressing fluctuation in spherical aberration during zooming.

The final lens group GE may be configured to have a negative refractive power. In such a case, there is an advantage in achieving reduction in total length of the lens system.

It is preferable that the zoom lens of the present disclosure includes a focus group that moves along the optical axis Z during focusing. In the present specification, the group which moves along the optical axis Z during focusing is referred to as a focus group. The focusing is performed by moving the focus group. In the example of FIG. 1, the focus group consists of a fourth lens group G4. The brackets under the fourth lens group G4 and the arrow pointing to the right in FIG. 1 indicate that the fourth lens group G4 is a focus group moving toward the image side during focusing from the infinite distance object to the closest object.

In a case where the lens group which is fourth from the object side in the zoom lens is configured to be the focus group as in the example of FIG. 1, there is an advantage in suppressing fluctuation in angle of view during focusing.

It is preferable that the focus group has a negative refractive power. In such a case, the amount of movement of the focus group during focusing can be suppressed. As a result, there is an advantage in achieving reduction in size and weight of the whole system. It is preferable that the focus group includes at least one negative lens. In such a case, there is an advantage in suppressing fluctuation in chromatic aberration during focusing.

It is preferable that the focus group includes a positive lens and a negative lens. In such a case, there is an advantage in suppressing fluctuation in chromatic aberration during focusing. The focus group may be configured to consist of a cemented lens in which a positive lens and a negative lens are cemented to each other. Such a case is advantageous in suppressing fluctuation in chromatic aberration during focusing, and is advantageous in achieving reduction in size as compared with a case in which a positive lens and a negative lens are not cemented to each other.

It is preferable that the number of lenses included in the focus group is two or less. In such a case, there is an advantage in achieving reduction in weight of the focus group.

It is preferable that the zoom lens of the present disclosure includes a vibration-proof group that moves in a direction intersecting with the optical axis Z during image shake correction. In the present specification, a group that moves in a direction intersecting with the optical axis Z during image shake correction is referred to as a vibration-proof group. Image shake correction is performed by moving the vibration-proof group. In the example of FIG. 1, the vibration-proof group consists of the second lens group G2. The brackets under the second lens group G2 in FIG. 1 and the double arrow in the direction perpendicular to the brackets indicate that the second lens group G2 is a vibration-proof group.

It is preferable that the vibration-proof group includes at least one positive lens. In such a case, there is an advantage in suppressing fluctuation in chromatic aberration during image shake correction.

Next, preferable and possible configurations about the conditional expressions of the zoom lens of the present disclosure will be described. In the following description of conditional expressions, in order to avoid redundant descriptions, the same symbols are used for those having the same definition, and some duplicate descriptions of the symbols will not be repeated. Further, in the following description, the term "zoom lens of the present disclosure" is also simply referred to as a "zoom lens" in order to avoid redundant description.

Assuming that a focal length of the whole system in a state where the infinite distance object is in focus at the wide angle end is fw and a focal length of the whole system in a state where the infinite distance object is in focus at the telephoto end is ft, it is preferable that the zoom lens satisfies Conditional Expression (1). By not allowing the corresponding value of Conditional Expression (1) to be equal to or less than the lower limit thereof, it is possible to provide an optical system having a higher zoom ratio. By not allowing the corresponding value of Conditional Expression (1) to be equal to or greater than the upper limit thereof, the zoom ratio is prevented from becoming excessively high. As a result, there is an advantage in achieving reduction in size. In order to obtain more favorable characteristics, it is more preferable that the zoom lens satisfies Conditional Expression (1-1), and it is yet more preferable that the zoom lens satisfies Conditional Expression (1-2).

$$6 < ft/fw < 30 \tag{1}$$

$$7.5 < ft/fw < 20 \tag{1-1}$$

$$9 < ft/fw < 16.5 \tag{1-2}$$

Assuming that an Abbe number of a lens closest to the object side in the first lens group G1 based on a d line is vd1, it is preferable that the zoom lens satisfies Conditional Expression (2). By not allowing the corresponding value of Conditional Expression (2) to be equal to or less than the lower limit thereof, it is possible to prevent longitudinal chromatic aberration at the telephoto end from being excessively corrected. By not allowing the corresponding value of Conditional Expression (2) to be equal to or greater than the upper limit thereof, there is an advantage in correcting longitudinal chromatic aberration at the telephoto end. In order to obtain more favorable characteristics, it is more preferable that the zoom lens satisfies Conditional Expression (2-1), and it is yet more preferable that the zoom lens satisfies Conditional Expression (2-2).

$$29.6 < vd1 < 50 \tag{2}$$

$$30.5 < vd1 < 46 \tag{2-1}$$

$$31.6 < vd1 < 42.8 \tag{2-2}$$

Assuming that an Abbe number of a lens which is second from the object side in the first lens group G1 based on a d line is vd2, and an Abbe number of the lens which is third from an object side in the first lens group G1 based on the d line is vd3, it is preferable that the zoom lens satisfies Conditional Expression (3). By not allowing the corresponding value of Conditional Expression (3) to be equal to or less than the lower limit thereof, there is an advantage in correcting longitudinal chromatic aberration at the telephoto end. By not allowing the corresponding value of Conditional Expression (3) to be equal to or greater than the upper limit thereof, it is possible to prevent longitudinal chromatic aberration at the telephoto end from being excessively corrected. In order to obtain more favorable characteristics, it is more preferable that the zoom lens satisfies Conditional Expression (3-1), and it is yet more preferable that the zoom lens satisfies Conditional Expression (3-2).

$$68 < (vd2 + vd3)/2 < 98 \tag{3}$$

$$77.5 < (vd2 + vd3)/2 < 95 \tag{3-1}$$

$$81.55 < (vd2 + vd3)/2 < 93 \tag{3-2}$$

Assuming that an F number in a state where the infinite distance object is in focus at the telephoto end is FNot, it is preferable that the zoom lens satisfies Conditional Expression (4). In a case where the opening diameter of the aperture stop St is variable, FNot is set as a value of an open F number. By not allowing the corresponding value of Conditional Expression (4) to be equal to or less than the lower limit thereof, there is an advantage in achieving a high zoom ratio. By not allowing the corresponding value of Conditional Expression (4) to be equal to or greater than the upper limit thereof, there is an advantage in achieving reduction in F number.

In order to obtain more favorable characteristics, it is more preferable that the zoom lens satisfies Conditional Expression (4-1), and it is yet more preferable that the zoom lens satisfies Conditional Expression (4-2).

$$45 < FNot \times (ft/fw) < 130 \tag{4}$$

$$56 < FNot \times (ft/fw) < 120 \tag{4-1}$$

$$58 < FNot \times (ft/fw) < 107 \tag{4-2}$$

It is preferable that the zoom lens satisfies Conditional Expression (5). Here, it is assumed that a sum of a back focal length of the whole system at an air-equivalent distance and a distance on the optical axis from a lens surface closest to the object side in the first lens group G1 to a lens surface closest to the image side in the final lens group GE in a state where the infinite distance object is in focus at the wide angle end is TLw. It should be noted that the "back focal length of the whole system at the air-equivalent distance" is the air-equivalent distance on the optical axis from the lens surface closest to the image side in the whole system to the image plane. By not allowing the corresponding value of Conditional Expression (5) to be equal to or less than the lower limit thereof, there is an advantage in suppressing various aberrations at the wide angle end. By not allowing the corresponding value of Conditional Expression (5) to be equal to or greater than the upper limit thereof, there is an advantage in achieving reduction in total length of the lens system at the wide angle end. In order to obtain more favorable characteristics, it is more preferable that the zoom lens satisfies Conditional Expression (5-1), and it is yet more preferable that the zoom lens satisfies Conditional Expression (5-2).

$$4.5 < TLw/fw < 9.5 \tag{5}$$

$$5.2 < TLw/fw < 8.5 \tag{5-1}$$

$$5.8 < TLw/fw < 7.45 \tag{5-2}$$

It is preferable that the zoom lens satisfies Conditional Expression (6). Here, it is assumed that a sum of a back focal length of the whole system at an air-equivalent distance and a distance on the optical axis from a lens surface closest to the object side in the first lens group G1 to a lens surface closest to the image side in the final lens group GE in a state where the infinite distance object is in focus at the telephoto end is TLt. By not allowing the corresponding value of Conditional Expression (6) to be equal to or less than the lower limit thereof, there is an advantage in suppressing various aberrations at the telephoto end. By not allowing the corresponding value of Conditional Expression (6) to be equal to or greater than the upper limit thereof, there is an advantage in achieving reduction in total length of the lens system at the telephoto end. In order to obtain more favorable characteristics, it is more preferable that the zoom lens satisfies Conditional Expression (6-1), and it is yet more preferable that the zoom lens satisfies Conditional Expression (6-2).

$$0.5 < TLt/ft < 1.3 \tag{6}$$

$$0.58 < TLt/ft < 1.24 \tag{6-1}$$

$$0.67 < TLt/ft < 1.19 \tag{6-2}$$

Assuming that a maximum half angle of view in a state where the infinite distance object is in focus at the telephoto end is $\omega t$, it is preferable that the zoom lens satisfies Conditional Expression (7). The tan is a tangent. For example, FIG. 2 shows a maximum half angle of view $\omega t$ in a state where the infinite distance object is in focus at the telephoto end. By not allowing the corresponding value of Conditional Expression (7) to be equal to or less than the lower limit thereof, the on-axis luminous flux ta can be gently converged toward the image plane Sim at the telephoto end. As a result, there is an advantage in suppressing longitudinal chromatic aberration occurring in a case where the luminous flux is converged. By not allowing the corresponding value of Conditional Expression (7) to be equal to or greater than the upper limit thereof, there is an advantage in achieving reduction in total length of the lens system at the telephoto end. In order to obtain more favorable characteristics, it is more preferable that the zoom lens satisfies Conditional Expression (7-1), and it is yet more preferable that the zoom lens satisfies Conditional Expression (7-2).

$$10 < TLt/(ft \times \tan \omega t) < 18 \tag{7}$$

$$11.2 < TLt/(ft \times \tan \omega t) < 16.9 \tag{7-1}$$

$$12.1 < TLt/(ft \times \tan \omega t) < 15.4 \tag{7-2}$$

It is preferable that the zoom lens satisfies Conditional Expression (8). Here, it is assumed that a back focal length of the whole system at an air-equivalent distance in a state where the infinite distance object is in focus at the wide angle end is Bfw. Further, it is assumed that a maximum half angle of view in a state where the infinite distance object is in focus at the wide angle end is $\omega w$. For example, FIG. 2 shows a maximum half angle of view $\omega w$ in a state where the infinite distance object is in focus at the wide angle end. By not allowing the corresponding value of Conditional Expression (8) to be equal to or less than the lower limit thereof, there is an advantage in ensuring the amount of ambient light. By not allowing the corresponding value of Conditional Expression (8) to be equal to or greater than the upper limit thereof, there is an advantage in achieving reduction in total length of the lens system at the wide angle end. In order to obtain more favorable characteristics, it is more preferable that the zoom lens satisfies Conditional Expression (8-1), and it is yet more preferable that the zoom lens satisfies Conditional Expression (8-2).

$$0.5 < Bfw/(fw \times \tan \omega w) < 1.1 \tag{8}$$

$$0.56 < Bfw/(fw \times \tan \omega w) < 0.95 \tag{8-1}$$

$$0.63 < Bfw/(fw \times \tan \omega w) < 0.8 \tag{8-2}$$

Assuming that a distance on the optical axis from the lens surface closest to the object side in the first lens group G1 to a paraxial entrance pupil position Penw in a state where the infinite distance object is in focus at the wide angle end is Denw, it is preferable that the zoom lens satisfies Conditional Expression (9). For example, FIG. 2 shows the distance Denw and the paraxial entrance pupil position Penw. By not allowing the corresponding value of Conditional Expression (9) to be equal to or less than the lower limit thereof, the on-axis luminous flux wa and an off-axis luminous flux passing through the first lens group G1 can be appropriately separated. As a result, there is an advantage in correcting lateral chromatic aberration. By not allowing the corresponding value of Conditional Expression (9) to be equal to or greater than the upper limit thereof, the paraxial entrance pupil position Penw is located closer to the object side. As a result, it is possible to lower a height of the off-axis ray passing through the first lens group G1 from the optical axis Z. There is an advantage in achieving reduction in size and weight of the first lens group G1. In order to obtain more favorable characteristics, it is more preferable that the zoom lens satisfies Conditional Expression (9-1), and it is yet more preferable that the zoom lens satisfies Conditional Expression (9-2).

$$1.1 < Denw/fw < 1.9 \tag{9}$$

$$1.25 < Denw/fw < 1.75 \tag{9-1}$$

$$1.44 < Denw/fw < 1.69 \tag{9-2}$$

In a case where a lens group which is fourth from the object side in the zoom lens is the fourth lens group G4, the fourth lens group G4 may be configured to move during at least one of zooming or focusing. In such a configuration, it is preferable that the zoom lens satisfies Conditional Expression (10). Here, it is assumed that a distance on the optical axis from the lens surface closest to the object side in the fourth lens group G4 to a lens surface closest to the image side in the fourth lens group G4 is DG4. By not allowing the corresponding value of Conditional Expression (10) to be equal to or less than the lower limit thereof, there is an advantage in achieving reduction in total length of the lens system. By not allowing the corresponding value of Conditional Expression (10) to be equal to or greater than the upper limit thereof, there is an advantage in achieving reduction in weight of the fourth lens group G4 driven during at least one of zooming or focusing. In order to obtain more favorable characteristics, it is more preferable that the zoom lens satisfies Conditional Expression (10-1), and it is yet more preferable that the zoom lens satisfies Conditional Expression (10-2).

$$0.009 < DG4/TLw < 0.12 \tag{10}$$

$$0.015 < DG4/TLw < 0.05 \tag{10-1}$$

$$0.02 < DG4/TLw < 0.028 \tag{10-2}$$

Assuming that an average value of specific gravities of all lenses in the focus group is Gfave, it is preferable that the zoom lens satisfies Conditional Expression (11). By not allowing the corresponding value of Conditional Expression (11) to be equal to or less than the lower limit thereof, a highly available material can be used for the focus group. As a result, there is an advantage in implementing the focus group in which fluctuation in aberration during focusing is small. By not allowing the corresponding value of Conditional Expression (11) to be equal to or greater than the upper limit thereof, there is an advantage in achieving reduction in weight of the focus group. In order to obtain more favorable characteristics, it is more preferable that the zoom lens satisfies Conditional Expression (11-1), and it is yet more preferable that the zoom lens satisfies Conditional Expression (11-2).

$$2.3 < Gfave < 5.15 \tag{11}$$

$$2.7 < Gfave < 4.78 \tag{11-1}$$

$$2.91 < Gfave < 3.5 \tag{11-2}$$

In a configuration in which the focus group includes at least one negative lens, it is preferable that the zoom lens satisfies Conditional Expression (12). Here, it is assumed that a specific gravity of the at least one negative lens in the focus group is Gfn. By not allowing the corresponding value of Conditional Expression (12) to be equal to or less than the lower limit thereof, a highly available material can be used for the focus group. As a result, there is an advantage in implementing the focus group in which fluctuation in aberration during focusing is small. By not allowing the corresponding value of Conditional Expression (12) to be equal to or greater than the upper limit thereof, there is an advantage in achieving reduction in weight of the focus group. In order to obtain more favorable characteristics, it is more preferable that the zoom lens satisfies Conditional Expression (12-1), and it is yet more preferable that the zoom lens satisfies Conditional Expression (12-2).

$$2.4 < Gfn < 5.6 \tag{12}$$

$$2.8 < Gfn < 5 \tag{12-1}$$

$$3.1 < Gfn < 3.6 \tag{12-2}$$

Assuming that an average value of specific gravities of all lenses in the vibration-proof group is GISave, it is preferable that the zoom lens satisfies Conditional Expression (13). By not allowing the corresponding value of Conditional Expression (13) to be equal to or less than the lower limit thereof, a highly available material can be used for the vibration-proof group. As a result, there is an advantage in implementing the vibration-proof group in which fluctuation in aberration during image shake correction is small. By not allowing the corresponding value of Conditional Expression (13) to be equal to or greater than the upper limit thereof, there is an advantage in achieving reduction in weight of the vibration-proof group. In order to obtain more favorable characteristics, it is more preferable that the zoom lens satisfies Conditional Expression (13-1), and it is yet more preferable that the zoom lens satisfies Conditional Expression (13-2).

$$2.5 < GISave < 5.2 \tag{13}$$

$$3 < GISave < 4.5 \tag{13-1}$$

$$3.5 < GISave < 4 \tag{13-2}$$

In a configuration in which the vibration-proof group includes at least one positive lens, it is preferable that the zoom lens satisfies Conditional Expression (14). Here, it is assumed that a specific gravity of the at least one positive lens in the vibration-proof group is GISp. By not allowing the corresponding value of Conditional Expression (14) to be equal to or less than the lower limit thereof, a highly available material can be used for the vibration-proof group. As a result, there is an advantage in implementing the vibration-proof group in which fluctuation in aberration during image shake correction is small. By not allowing the corresponding value of Conditional Expression (14) to be equal to or greater than the upper limit thereof, there is an advantage in achieving reduction in weight of the vibration-proof group. In order to obtain more favorable characteristics, it is more preferable that the zoom lens satisfies Conditional Expression (14-1), and it is yet more preferable that the zoom lens satisfies Conditional Expression (14-2).

$$2.6 < GISp < 5 \tag{14}$$

$$2.8 < GISp < 4.6 \tag{14-1}$$

$$2.95 < GISp < 3.7 \tag{14-2}$$

Assuming that an amount of movement of the first lens group G1 during zooming from the wide angle end to the telephoto end is M1, it is preferable that the zoom lens satisfies Conditional Expression (15). Here, it is assumed that a sign of M1 is positive in a case where the first lens group G1 moves from the object side to the image side and is negative in a case where the first lens group G1 moves from the image side to the object side. For example, FIG. 2 shows the amount of movement M1 of the first lens group G1. By not allowing the corresponding value of Conditional Expression (15) to be equal to or less than the lower limit thereof, there is an advantage in achieving a high zoom ratio. By not allowing the corresponding value of Conditional Expression (15) to be equal to or greater than the upper limit thereof, it is possible to suppress fluctuation in centroid position during zooming. In order to obtain more favorable characteristics, it is more preferable that the zoom lens satisfies Conditional Expression (15-1), and it is yet more preferable that the zoom lens satisfies Conditional Expression (15-2).

$$0.25 < -M1/TLt < 0.6 \tag{15}$$

$$0.31 < -M1/TLt < 0.53 \tag{15-1}$$

$$0.36 < -M1/TLt < 0.46 \tag{15-2}$$

Assuming that an amount of movement of the second lens group G2 during zooming from the wide angle end to the telephoto end is M2, it is preferable that the zoom lens satisfies Conditional Expression (16). Here, it is assumed that a sign of M2 is positive in a case where the second lens group G2 moves from the object side to the image side and is negative in a case where the second lens group G2 moves from the image side to the object side. By not allowing the corresponding value of Conditional Expression (16) to be equal to or less than the lower limit thereof, there is an advantage in achieving a high zoom ratio. By not allowing the corresponding value of Conditional Expression (16) to be equal to or greater than the upper limit thereof, there is an advantage in suppressing fluctuation in distortion during zooming. In order to obtain more favorable characteristics, it is more preferable that the zoom lens satisfies Conditional Expression (16-1), and it is yet more preferable that the zoom lens satisfies Conditional Expression (16-2).

$$0.01 < -M2/TLt < 0.2 \tag{16}$$

$$0.02 < -M2/TLt < 0.15 \tag{16-1}$$

$$0.036 < -M2/TLt < 0.109 \tag{16-2}$$

A lens group closest to the object side in the middle group GM is set as a third lens group G3. Assuming that an amount of movement of the third lens group G3 during zooming from the wide angle end to the telephoto end is M3, it is preferable that the zoom lens satisfies Conditional Expression (17). Here, it is assumed that a sign of M3 is positive in a case where the third lens group G3 moves from the object side to the image side and is negative in a case where the third lens group G3 moves from the image side to the object side. By not allowing the corresponding value of Conditional Expression (17) to be equal to or less than the lower limit thereof, there is an advantage in achieving a high zoom ratio. By not allowing the corresponding value of Conditional Expression (17) to be equal to or greater than the upper limit thereof, there is an advantage in suppressing fluctuation in spherical aberration during zooming. In order to obtain more favorable characteristics, it is more preferable that the zoom lens satisfies Conditional Expression (17-1), and it is yet more preferable that the zoom lens satisfies Conditional Expression (17-2).

$$0.08 < -M3/TLt < 0.4 \tag{17}$$

$$0.13 < -M3/TLt < 0.35 \tag{17-1}$$

$$0.17 < -M3/TLt < 0.23 \tag{17-2}$$

A lens group which is fourth from the object side in the zoom lens is set as a fourth lens group G4. Assuming that an amount of movement of the fourth lens group G4 during zooming from the wide angle end to the telephoto end is M4, it is preferable that the zoom lens satisfies Conditional Expression (18). Here, it is assumed that a sign of M4 is positive in a case where the fourth lens group G4 moves from the object side to the image side and is negative in a case where the fourth lens group G4 moves from the image side to the object side. By not allowing the corresponding value of Conditional Expression (18) to be equal to or less than the lower limit thereof, there is an advantage in achieving a high zoom ratio. By not allowing the corresponding value of Conditional Expression (18) to be equal to or greater than the upper limit thereof, there is an advantage in suppressing fluctuation in field curvature during zooming. In order to obtain more favorable characteristics, it is more preferable that the zoom lens satisfies Conditional Expression (18-1), and it is yet more preferable that the zoom lens satisfies Conditional Expression (18-2).

$$0.15 < -M4/TLt < 0.3 \tag{18}$$

$$0.166 < -M4/TLt < 0.25 \tag{18-1}$$

$$0.18 < -M4/TLt < 0.222 \tag{18-2}$$

A lens group which is fifth from the object side in the zoom lens is set as a fifth lens group G5. Assuming that an amount of movement of the fifth lens group G5 during zooming from the wide angle end to the telephoto end is M5, it is preferable that the zoom lens satisfies Conditional Expression (19). Here, it is assumed that a sign of M5 is positive in a case where the fifth lens group G5 moves from the object side to the image side and is negative in a case where the fifth lens group G5 moves from the image side to the object side. By not allowing the corresponding value of Conditional Expression (19) to be equal to or less than the lower limit thereof, there is an advantage in achieving a high zoom ratio. By not allowing the corresponding value of Conditional Expression (19) to be equal to or greater than the upper limit thereof, there is an advantage in suppressing fluctuation in field curvature during zooming. In order to obtain more favorable characteristics, it is more preferable that the zoom lens satisfies Conditional Expression (19-1), and it is yet more preferable that the zoom lens satisfies Conditional Expression (19-2).

$$0.11 < -M5/TLt < 0.31 \tag{19}$$

$$0.13 < -M5/TLt < 0.27 \tag{19-1}$$

$$0.16 < -M5/TLt < 0.24 \tag{19-2}$$

Assuming that a central thickness of a lens closest to the object side in the first lens group G1 is d1, and an effective diameter of an object side surface of the lens closest to the object side in the first lens group G1 is ED1, it is preferable that the zoom lens satisfies Conditional Expression (20). By not allowing the corresponding value of Conditional Expression (20) to be equal to or less than the lower limit thereof, there is an advantage in ensuring the strength of the lens closest to the object side in the first lens group G1. By not allowing the corresponding value of Conditional Expression (20) to be equal to or greater than the upper limit thereof, there is an advantage in achieving reduction in weight of the first lens group G1. In order to obtain more favorable characteristics, it is more preferable that the zoom lens satisfies Conditional Expression (20-1), and it is yet more preferable that the zoom lens satisfies Conditional Expression (20-2).

$$0.022 < d1/ED1 < 0.04 \tag{20}$$

$$0.025 < d1/ED1 < 0.035 \tag{20-1}$$

$$0.027 < d1/ED1 < 0.032 \tag{20-2}$$

In the present specification, twice the distance to the optical axis Z from the intersection between the lens surface and the ray passing through the outermost side among rays incident onto the lens surface from the object side and emitted to the image side is the "effective diameter" of the lens surface. The "outer side" here is the radial outside centered on the optical axis Z, that is, the side separated from the optical axis Z. It should be noted that the "ray passing through the outermost side" is determined in consideration of the entire zoom range.

Figure 3:
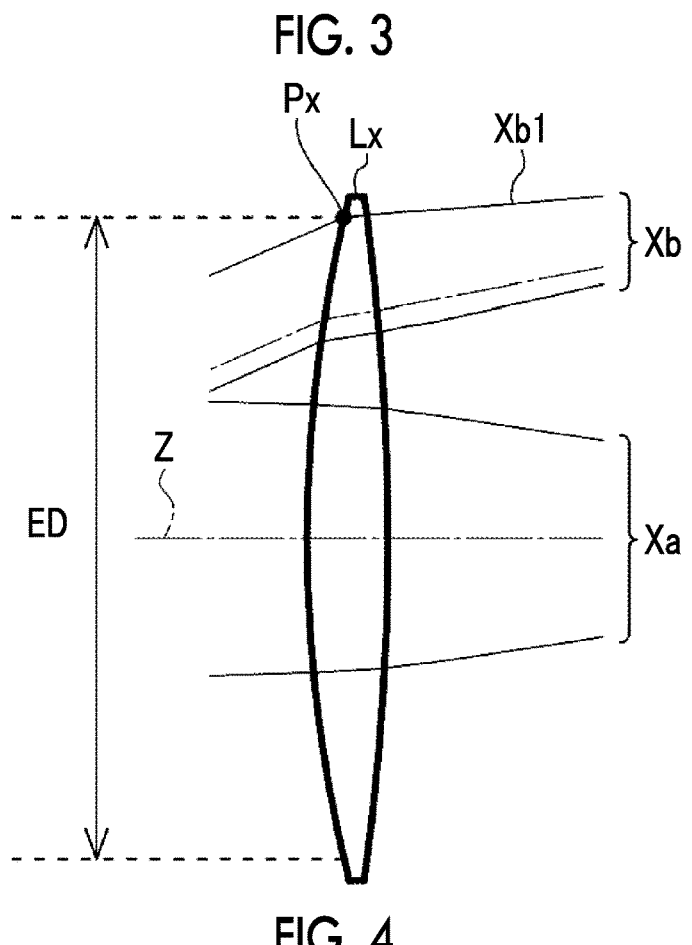
FIG. 3 is a diagram for explaining an effective diameter.

As an explanatory diagram, FIG. 3 shows an example of an effective diameter ED. In FIG. 3, the left side is the object side, and the right side is the image side. FIG. 3 shows an on-axis luminous flux Xa and an off-axis luminous flux Xb passing through a lens Lx. In the example of FIG. 3, a ray Xb1, which is the upper ray of the off-axis luminous flux Xb, is the ray passing through the outermost side. Therefore, in the example of FIG. 3, twice the distance to the optical axis Z from the intersection between the ray Xb1 and the object side surface of the lens Lx is the effective diameter ED of the object side surface of the lens Lx. It should be noted that a position of the intersection of the lens surface and the ray passing through the outermost side is a position Px of the maximum effective diameter. In the example of FIG. 3, the upper ray of the off-axis luminous flux Xb is the ray passing through the outermost side, but which ray is the ray passing through the outermost side depends on the optical system.

It is preferable that the zoom lens satisfies Conditional Expression (21). By not allowing the corresponding value of Conditional Expression (21) to be equal to or less than the lower limit thereof, there is an advantage in ensuring the strength of the lens closest to the object side in the first lens group G1. By not allowing the corresponding value of Conditional Expression (21) to be equal to or greater than the upper limit thereof, there is an advantage in achieving reduction in weight of the first lens group G1. In order to obtain more favorable characteristics, it is more preferable that the zoom lens satisfies Conditional Expression (21-1), and it is yet more preferable that the zoom lens satisfies Conditional Expression (21-2).

$$0.035 < d1/(Denw \times \tan \omega w) < 0.077 \tag{21}$$

$$0.045 < d1/(Denw \times \tan \omega w) < 0.07 \tag{21-1}$$

$$0.055 < d1/(Denw \times \tan \omega w) < 0.067 \tag{21-2}$$

It is preferable that the zoom lens satisfies Conditional Expression (22). Here, it is assumed that a central thickness of a lens which is second from the object side in the first lens group G1 is d2. Further, it is assumed that a paraxial curvature radius of an object side surface of the lens which is second from the object side in the first lens group G1 is R2f, and a paraxial curvature radius of an image side surface of the lens which is second from the object side in the first lens group G1 is R2r. By not allowing the corresponding value of Conditional Expression (22) to be equal to or less than the lower limit thereof, there is an advantage in ensuring the strength of the lens which is second from the object side in the first lens group G1. By not allowing the corresponding value of Conditional Expression (22) to be equal to or greater than the upper limit thereof, there is an advantage in achieving reduction in weight of the first lens group G1. In order to obtain more favorable characteristics, it is more preferable that the zoom lens satisfies Conditional Expression (22-1), and it is yet more preferable that the zoom lens satisfies Conditional Expression (22-2).

$$0.06 < d2 \times (1/R2f - 1/R2r) < 0.19 \tag{22}$$

$$0.085 < d2 \times (1/R2f - 1/R2r) < 0.175 \tag{22-1}$$

$$0.091 < d2 \times (1/R2f - 1/R2r) < 0.143 \tag{22-2}$$

Assuming that a focal length of the first lens group G1 is f1, it is preferable that the zoom lens satisfies Conditional Expression (23). By not allowing the corresponding value of Conditional Expression (23) to be equal to or less than the lower limit thereof, there is an advantage in ensuring the strength of the lens closest to the object side in the first lens group G1. By not allowing the corresponding value of Conditional Expression (23) to be equal to or greater than the upper limit thereof, there is an advantage in achieving reduction in weight of the first lens group G1. In order to obtain more favorable characteristics, it is more preferable that the zoom lens satisfies Conditional Expression (23-1), and it is yet more preferable that the zoom lens satisfies Conditional Expression (23-2).

$$0.01 < d1/f1 < 0.021 \tag{23}$$

$$0.013 < d1/f1 < 0.019 \tag{23-1}$$

$$0.014 < d1/f1 < 0.016 \tag{23-2}$$

Assuming that a distance on the optical axis from a lens surface closest to the object side in the first lens group G1 to a lens surface closest to the image side in the first lens group G1 is DG1, it is preferable that the zoom lens satisfies Conditional Expression (24). By not allowing the corresponding value of Conditional Expression (24) to be equal to or less than the lower limit thereof, there is an advantage in ensuring the strength of the lens closest to the object side in the first lens group G1. By not allowing the corresponding value of Conditional Expression (24) to be equal to or greater than the upper limit thereof, there is an advantage in achieving reduction in weight of the first lens group G1. In order to obtain more favorable characteristics, it is more preferable that the zoom lens satisfies Conditional Expression (24-1), and it is yet more preferable that the zoom lens satisfies Conditional Expression (24-2).

$$0.06 < d1/DG1 < 0.125 \tag{24}$$

$$0.08 < d1/DG1 < 0.12 \tag{24-1}$$

$$0.098 < d1/DG1 < 0.115 \tag{24-2}$$

Assuming that an Abbe number of the lens which is second from the object side in the first lens group G1 based on a d line is vd2, it is preferable that the zoom lens satisfies Conditional Expression (25). By not allowing the corresponding value of Conditional Expression (25) to be equal to or less than the lower limit thereof, there is an advantage in suppressing longitudinal chromatic aberration at the telephoto end. By not allowing the corresponding value of Conditional Expression (25) to be equal to or greater than the upper limit thereof, it is possible to prevent longitudinal chromatic aberration at the telephoto end from being excessively corrected. In order to obtain more favorable characteristics, it is more preferable that the zoom lens satisfies Conditional Expression (25-1), and it is yet more preferable that the zoom lens satisfies Conditional Expression (25-2).

$$75 < vd2 < 120 \tag{25}$$

$$81.55 < vd2 < 110 \tag{25-1}$$

$$85 < vd2 < 105.9 \tag{25-2}$$

Assuming that an Abbe number of a lens which is third from the object side in the first lens group G1 based on a d line is vd3, it is preferable that the zoom lens satisfies Conditional Expression (26). By not allowing the corresponding value of Conditional Expression (26) to be equal to or less than the lower limit thereof, there is an advantage in suppressing longitudinal chromatic aberration at the telephoto end. By not allowing the corresponding value of Conditional Expression (26) to be equal to or greater than the upper limit thereof, it is possible to prevent longitudinal chromatic aberration at the telephoto end from being excessively corrected. In order to obtain more favorable characteristics, it is more preferable that the zoom lens satisfies Conditional Expression (26-1), and it is yet more preferable that the zoom lens satisfies Conditional Expression (26-2).

$$70 < vd3 < 110 \tag{26}$$

$$75 < vd3 < 105 \tag{26-1}$$

$$81.55 < vd3 < 100 \tag{26-2}$$

Assuming that a partial dispersion ratio of the lens which is second from the object side in the first lens group G1 between a g line and an F line is θgF2, it is preferable that the zoom lens satisfies Conditional Expression (27). By not allowing the corresponding value of Conditional Expression (27) to be equal to or less than the lower limit thereof, there is an advantage in suppressing second-order longitudinal chromatic aberration at the telephoto end. By not allowing the corresponding value of Conditional Expression (27) to be equal to or greater than the upper limit thereof, it is not possible to prevent second-order longitudinal chromatic aberration at the telephoto end from being excessively corrected. In order to obtain more favorable characteristics, it is more preferable that the zoom lens satisfies Conditional Expression (27-1), and it is yet more preferable that the zoom lens satisfies Conditional Expression (27-2).

$$0.46 < \theta gF2 < 0.62 \tag{27}$$

$$0.48 < \theta gF2 < 0.57 \tag{27-1}$$

$$0.52 < \theta gF2 < 0.55 \tag{27-2}$$

Assuming that refractive indexes for the g line, F line, and C line of a certain lens are Ng, NF, and NC, respectively, and the partial dispersion ratio thereof between the g line and F line of the lens is θgF, θgF is defined by the following expression.

$$\theta gF = (Ng - NF)/(NF - NC)$$

Assuming that a partial dispersion ratio of the lens which is third from the object side in the first lens group G1 between a g line and an F line is θgF3, it is preferable that the zoom lens satisfies Conditional Expression (28). By not allowing the corresponding value of Conditional Expression (28) to be equal to or less than the lower limit thereof, there is an advantage in suppressing second-order longitudinal chromatic aberration at the telephoto end. By not allowing the corresponding value of Conditional Expression (28) to be equal to or greater than the upper limit thereof, it is possible to prevent second-order longitudinal chromatic aberration at the telephoto end from being excessively corrected. In order to obtain more favorable characteristics, it is more preferable that the zoom lens satisfies Conditional Expression (28-1), and it is yet more preferable that the zoom lens satisfies Conditional Expression (28-2).

$$0.46 < \theta gF3 < 0.62 \tag{28}$$

$$0.48 < \theta gF3 < 0.57 \tag{28-1}$$

$$0.52 < \theta gF3 < 0.55 \tag{28-2}$$

It is preferable that the zoom lens satisfies Conditional Expression (29). Here, it is assumed that a paraxial curvature radius of a surface having a minimum absolute value of the paraxial curvature radius among object side concave surfaces of lenses in the final lens group GE is REf. Further, it is assumed that the focal length of the final lens group GE is fE. By not allowing the corresponding value of Conditional Expression (29) to be equal to or less than the lower limit thereof, there is an advantage in suppressing astigmatism. By not allowing the corresponding value of Conditional Expression (29) to be equal to or greater than the upper limit thereof, there is an advantage in suppressing distortion. In order to obtain more favorable characteristics, it is more preferable that the zoom lens satisfies Conditional Expression (29-1), and it is yet more preferable that the zoom lens satisfies Conditional Expression (29-2).

$$-18 < REf/fE < -2 \tag{29}$$

$$-14 < REf/fE < -5 \tag{29-1}$$

$$-10.7 < REf/fE < -7 \tag{29-2}$$

Assuming that a paraxial curvature radius of a lens surface closest to the object side in the focus group is RfF, and a paraxial curvature radius of a lens surface closest to the image side in the focus group is RfR, it is preferable that the zoom lens satisfies Conditional Expression (30). By not allowing the corresponding value of Conditional Expression (30) to be equal to or less than the lower limit thereof, the refractive power of the focus group can be ensured. As a result, there is an advantage in suppressing the amount of movement of the focus group during focusing. By not allowing the corresponding value of Conditional Expression (30) to be equal to or greater than the upper limit thereof, there is an advantage in suppressing fluctuation in astigmatism during focusing. In order to obtain more favorable characteristics, it is more preferable that the zoom lens satisfies Conditional Expression (30-1), and it is yet more preferable that the zoom lens satisfies Conditional Expression (30-2).

$$1.5 < RfF/RfR < 6 \tag{30}$$

$$1.8 < RfF/RfR < 5 \tag{30-1}$$

$$2.09 < RfF/RfR < 4.02 \tag{30-2}$$

Assuming that a focal length of the focus group is ffoc, it is preferable that the zoom lens satisfies Conditional Expression (31). By not allowing the corresponding value of Conditional Expression (31) to be equal to or less than the lower limit thereof, the refractive power of the focus group can be ensured. As a result, there is an advantage in suppressing the amount of movement of the focus group during focusing. By not allowing the corresponding value of Conditional Expression (31) to be equal to or greater than the upper limit thereof, there is an advantage in suppressing fluctuations in various aberrations during focusing. In order to obtain more favorable characteristics, it is more preferable that the zoom lens satisfies Conditional Expression (31-1), and it is yet more preferable that the zoom lens satisfies Conditional Expression (31-2).

$$-0.35 < ffoc/ft < -0.02 \tag{31}$$

$$-0.28 < ffoc/ft < -0.05 \tag{31-1}$$

$$-0.2 < ffoc/ft < -0.08 \tag{31-2}$$

Assuming that a focal length of the vibration-proof group is fIS, it is preferable that the zoom lens satisfies Conditional Expression (32). By not allowing the corresponding value of Conditional Expression (32) to be equal to or less than the lower limit thereof, there is an advantage in suppressing fluctuations in various aberrations during image shake correction. By not allowing the corresponding value of Conditional Expression (32) to be equal to or greater than the upper limit thereof, the refractive power of the vibration-proof group can be ensured. As a result, there is an advantage in suppressing the amount of movement of the vibration-proof group during image shake correction. In order to obtain more favorable characteristics, it is more preferable that the zoom lens satisfies Conditional Expression (32-1), and it is yet more preferable that the zoom lens satisfies Conditional Expression (32-2).

$$0.01 < |fIS/ft| < 0.35 \tag{32}$$

$$0.03 < |fIS/ft| < 0.28 \tag{32-1}$$

$$0.05 < |fIS/ft| < 0.23 \tag{32-2}$$

Assuming that a focal length of the second lens group G2 is f2, and a focal length of a lens which is second from the object side in the second lens group G2 is fL22, it is preferable that the zoom lens satisfies Conditional Expression (33). By not allowing the corresponding value of Conditional Expression (33) to be equal to or less than the lower limit thereof, there is an advantage in suppressing lateral chromatic aberration. By not allowing the corresponding value of Conditional Expression (33) to be equal to or greater than the upper limit thereof, there is an advantage in suppressing distortion. In order to obtain more favorable characteristics, it is more preferable that the zoom lens satisfies Conditional Expression (33-1), and it is yet more preferable that the zoom lens satisfies Conditional Expression (33-2).

$$1.4 < fL22/f2 < 7 \tag{33}$$

$$3 < fL22/f2 < 6 \tag{33-1}$$

$$4 < fL22/f2 < 5.6 \tag{33-2}$$

It is preferable that the zoom lens satisfies Conditional Expression (34). Here, it is assumed that a lateral magnification of the focus group in a state where the infinite distance object is in focus at the wide angle end is $\beta$fw. Further, it is assumed that a combined lateral magnification of all lenses closer to the image side than the focus group in a state where the infinite distance object is in focus at the wide angle end is $\beta$fRw. By not allowing the corresponding value of Conditional Expression (34) to be equal to or less than the lower limit thereof, there is an advantage in suppressing fluctuations in various aberrations during focusing at the wide angle end. By not allowing the corresponding value of Conditional Expression (34) to be equal to or greater than the upper limit thereof, the amount of movement of the focus group during focusing at the wide angle end can be suppressed. As a result, there is an advantage in achieving reduction in total length of the lens system. In order to obtain more favorable characteristics, it is more preferable that the zoom lens satisfies Conditional Expression (34-1), and it is yet more preferable that the zoom lens satisfies Conditional Expression (34-2).

$$-6 < (1-\beta fw^2) \times \beta fRw^2 < -1 \tag{34}$$

$$-5.5 < (1-\beta fw^2) \times \beta fRw^2 < -1.5 \tag{34-1}$$

$$-4.7 < (1-\beta fw^2) \times \beta fRw^2 < -2.2 \tag{34-2}$$

It is preferable that the zoom lens satisfies Conditional Expression (35). Here, it is assumed that a lateral magnification of the focus group in a state where the infinite distance object is in focus at the telephoto end is Oft. Further, it is assumed that a combined lateral magnification of all lenses closer to the image side than the focus group in a state where the infinite distance object is in focus at the telephoto end is $\beta$fRt. By not allowing the corresponding value of Conditional Expression (35) to be equal to or less than the lower limit thereof, there is an advantage in suppressing fluctuations in various aberrations during focusing at the telephoto end. By not allowing the corresponding value of Conditional Expression (35) to be equal to or greater than the upper limit thereof, the amount of movement of the focus group during focusing at the telephoto end can be suppressed. As a result, there is an advantage in achieving reduction in total length of the lens system. In order to obtain more favorable characteristics, it is more preferable that the zoom lens satisfies Conditional Expression (35-1), and it is yet more preferable that the zoom lens satisfies Conditional Expression (35-2).

$$-25 < (1-\beta ft^2) \times \beta fRt^2 < -6.3 \tag{35}$$

$$-22 < (1-\beta ft^2) \times \beta fRt^2 < -7.5 \tag{35-1}$$

$$-19.3 < (1-\beta ft^2) \times \beta fRt^2 < -8.3 \tag{35-2}$$

It is preferable that the zoom lens satisfies Conditional Expression (36). Here, it is assumed that a lateral magnification of the vibration-proof group in a state where the infinite distance object is in focus at the wide angle end is $\beta$ISw. Further, it is assumed that a combined lateral magnification of all lenses closer to the image side than the vibration-proof group in a state where the infinite distance object is in focus at the wide angle end is $\beta$ISRw. By not allowing the corresponding value of Conditional Expression (36) to be equal to or less than the lower limit thereof, it is possible to suppress the amount of movement of the vibration-proof group during image shake correction at the wide angle end. As a result, there is an advantage in achieving reduction in size in a radial direction. By not allowing the corresponding value of Conditional Expression (36) to be equal to or greater than the upper limit thereof, there is an advantage in suppressing fluctuations in various aberrations during image shake correction at the wide angle end. In order to obtain more favorable characteristics, it is more preferable that the zoom lens satisfies Conditional Expression (36-1), and it is yet more preferable that the zoom lens satisfies Conditional Expression (36-2).

$$0.75 < |(1-\beta ISw) \times \beta ISRw| < 2.5 \tag{36}$$

$$0.9 < |(1-\beta ISw) \times \beta ISRw| < 2.1 \tag{36-1}$$

$$1.05 < |(1-\beta ISw) \times \beta ISRw| < 1.64 \tag{36-2}$$

It is preferable that the zoom lens satisfies Conditional Expression (37). Here, it is assumed that a lateral magnification of the vibration-proof group in a state where the infinite distance object is in focus at the telephoto end is $\beta$ISt. Further, it is assumed that a combined lateral magnification of all lenses closer to the image side than the vibration-proof group in a state where the infinite distance object is in focus at the telephoto end is $\beta$ISRt. By not allowing the corresponding value of Conditional Expression (37) to be equal to or less than the lower limit thereof, it is possible to suppress the amount of movement of the vibration-proof group during image shake correction at the telephoto end. As a result, there is an advantage in achieving reduction in size in the radial direction. By not allowing the corresponding value of Conditional Expression (37) to be equal to or greater than the upper limit thereof, there is an advantage in suppressing fluctuations in various aberrations during image shake correction at the telephoto end. In order to obtain more favorable characteristics, it is more preferable that the zoom lens satisfies Conditional Expression (37-1), and it is yet more preferable that the zoom lens satisfies Conditional Expression (37-2).

$$1.7 < |(1-\beta ISt) \times \beta ISRt| < 7 \tag{37}$$

$$2 < |(1-\beta ISt) \times \beta ISRt| < 6 \tag{37-1}$$

$$2.3 < |(1-\beta ISt) \times \beta ISRt| < 5.5 \tag{37-2}$$

It is preferable that the zoom lens satisfies Conditional Expression (38). Here, symbols are defined as follows. It is assumed that the lateral magnification of the focus group in a state where the infinite distance object is in focus at the wide angle end is βfw. It is assumed that the combined lateral magnification of all lenses closer to the image side than the focus group in a state where the infinite distance object is in focus at the wide angle end is βfRw. It is assumed that the focal length of the focus group is ffoc. It is assumed that a composite focal length of all lenses closer to the image side than the focus group in a state where the infinite distance object is in focus at the wide angle end is ffRw. It is assumed that a sum of a back focal length of the whole system at an air-equivalent distance and a distance on the optical axis from a paraxial exit pupil position Pexw to the lens surface closest to the image side in the final lens group GE in a state where the infinite distance object is in focus at the wide angle end is Dexw. For example, FIG. 2 shows the paraxial exit pupil position Pexw in a state where the infinite distance object is in focus at the wide angle end. Using the above-mentioned symbols, Tw and BRw are defined as follows.

$$\gamma w = (1-\beta f w^2) \times \beta f R w^2$$

$$BRw = \{\beta f w/(ffoc \times \gamma w) - 1/(\beta f R w \times ffRw) - (1/Dexw)\}$$

By not allowing the corresponding value of Conditional Expression (38) to be equal to or less than the lower limit thereof, there is an advantage in achieving reduction in total length of the lens system. By not allowing the corresponding value of Conditional Expression (38) to be equal to or greater than the upper limit thereof, there is an advantage in suppressing fluctuation in angle of view during focusing at the wide angle end. In order to obtain more favorable characteristics, it is more preferable that the zoom lens satisfies Conditional Expression (38-1), and it is yet more preferable that the zoom lens satisfies Conditional Expression (38-2).

$$0 < |BRw \times (fw \times \tan \omega w)| < 0.25 \tag{38}$$

$$0 < |BRw \times (fw \times \tan \omega w)| < 0.15 \tag{38-1}$$

$$0 < |BRw \times (fw \times \tan \omega w)| < 0.0755 \tag{38-2}$$

It is preferable that the zoom lens satisfies Conditional Expression (39). Here, symbols are defined as follows. It is assumed that the lateral magnification of the focus group in a state where the infinite distance object is in focus at the telephoto end is βft. It is assumed that the combined lateral magnification of all lenses closer to the image side than the focus group in a state where the infinite distance object is in focus at the telephoto end is βfRt. It is assumed that the focal length of the focus group is ffoc. It is assumed that a composite focal length of all lenses closer to the image side than the focus group in a state where the infinite distance object is in focus at the telephoto end is ffRt. It is assumed that a sum of a back focal length of the whole system at an air-equivalent distance and a distance on the optical axis from a paraxial exit pupil position Pext to the lens surface closest to the image side in the final lens group GE in a state where the infinite distance object is in focus at the telephoto end is Dext. For example, FIG. 2 shows the paraxial exit pupil position Pext in a state where the infinite distance object is in focus at the telephoto end. Using the above-mentioned symbols, γt and BRt are defined as follows.

$$\gamma t = (1-\beta f t^2) \times \beta f R t^2$$

$$BRt = \{\beta f t/(ffoc \times \gamma t) - 1/(\beta f R t \times ffRt) - (1/Dext)\}$$

By not allowing the corresponding value of Conditional Expression (39) to be equal to or less than the lower limit thereof, there is an advantage in achieving reduction in total length of the lens system. By not allowing the corresponding value of Conditional Expression (39) to be equal to or greater than the upper limit thereof, there is an advantage in suppressing fluctuation in angle of view during focusing at the telephoto end. In order to obtain more favorable characteristics, it is more preferable that the zoom lens satisfies Conditional Expression (39-1), and it is yet more preferable that the zoom lens satisfies Conditional Expression (39-2).

$$0 < |BRt \times (ft \times \tan \omega t)| < 0.034 \tag{39}$$

$$0 < |BRt \times (ft \times \tan \omega t)| < 0.015 \tag{39-1}$$

$$0 < |BRt \times (ft \times \tan \omega t)| < 0.0085 \tag{39-2}$$

Assuming that a focal length of the first lens group G1 is f1, and a focal length of the second lens group G2 is f2, it is preferable that the zoom lens satisfies Conditional Expression (40). By not allowing the corresponding value of Conditional Expression (40) to be equal to or less than the lower limit thereof, there is an advantage in suppressing spherical aberration at the telephoto end. By not allowing the corresponding value of Conditional Expression (40) to be equal to or greater than the upper limit thereof, there is an advantage in achieving an increase in zoom ratio. In order to obtain more favorable characteristics, it is more preferable that the zoom lens satisfies Conditional Expression (40-1), and it is yet more preferable that the zoom lens satisfies Conditional Expression (40-2).

$$-10 < f1/f2 < -5.6 \tag{40}$$

$$-9 < f1/f2 < -6.1 \tag{40-1}$$

$$-8.4 < f1/f2 < -6.5 \tag{40-2}$$

Assuming that a focal length of a lens group closest to the object side in the middle group GM is f3, it is preferable that the zoom lens satisfies Conditional Expression (41). By not allowing the corresponding value of Conditional Expression (41) to be equal to or less than the lower limit thereof, there is an advantage in suppressing fluctuation in spherical aberration during zooming. By not allowing the corresponding value of Conditional Expression (41) to be equal to or greater than the upper limit thereof, there is an advantage in suppressing fluctuation in distortion during zooming. In order to obtain more favorable characteristics, it is more preferable that the zoom lens satisfies Conditional Expression (41-1), and it is yet more preferable that the zoom lens satisfies Conditional Expression (41-2).

$$-0.9 < f2/f3 < -0.54 \tag{41}$$

$$-0.8 < f2/f3 < -0.6 \tag{41-1}$$

$$-0.77 < f2/f3 < -0.64 \tag{41-2}$$

In a case where the lens group which is fourth from the object side in the zoom lens is set as a fourth lens group G4, it is preferable that the zoom lens satisfies Conditional Expression (42). Here, it is assumed that an amount of movement of the fourth lens group G4 during zooming from the wide angle end to the telephoto end is M4. It is assumed that an amount of movement of the final lens group GE during zooming from the wide angle end to the telephoto end is ME. Further, it is assumed that signs of M4 and ME are positive in a case where the fourth lens group G4 and the final lens group ME move from the object side to the image side and are negative in a case where the fourth lens group G4 and the final lens group ME move from the image side to the object side. By not allowing the corresponding value of Conditional Expression (42) to be equal to or less than the lower limit thereof, it is possible to suppress narrowing of the spacing between the groups during zooming. As a result, there is an advantage in simplifying the driving mechanism. By not allowing the corresponding value of Conditional Expression (42) to be equal to or greater than the upper limit thereof, it is possible to suppress widening of the spacing between the groups during zooming. As a result, there is an advantage in simplifying the driving mechanism. In order to obtain more favorable characteristics, it is more preferable that the zoom lens satisfies Conditional Expression (42-1), and it is yet more preferable that the zoom lens satisfies Conditional Expression (42-2).

$$0.9<M4/ME<1.1 \tag{42}$$

$$0.99<M4/ME<1.01 \tag{42-1}$$

$$0.9999<M4/ME<1.0001 \tag{42-2}$$

Assuming that a focal length of the middle group GM in a state where the infinite distance object is in focus at the wide angle end is fMw, it is preferable that the zoom lens satisfies Conditional Expression (43). By not allowing the corresponding value of Conditional Expression (43) to be equal to or less than the lower limit thereof, there is an advantage in achieving reduction in total length of the lens system. By not allowing the corresponding value of Conditional Expression (43) to be equal to or greater than the upper limit thereof, there is an advantage in suppressing spherical aberration at the wide angle end. In order to obtain more favorable characteristics, it is more preferable that the zoom lens satisfies Conditional Expression (43-1), and it is yet more preferable that the zoom lens satisfies Conditional Expression (43-2).

$$0.54<fw/fMw<0.95 \tag{43}$$

$$0.6<fw/fMw<0.87 \tag{43-1}$$

$$0.64<fw/fMw<0.75 \tag{43-2}$$

Assuming that a focal length of the middle group GM in a state where the infinite distance object is in focus at the telephoto end is fMt, it is preferable that the zoom lens satisfies Conditional Expression (44). By not allowing the corresponding value of Conditional Expression (44) to be equal to or less than the lower limit thereof, there is an advantage in achieving reduction in total length of the lens system. By not allowing the corresponding value of Conditional Expression (44) to be equal to or greater than the upper limit thereof, there is an advantage in suppressing spherical aberration at the telephoto end. In order to obtain more favorable characteristics, it is more preferable that the zoom lens satisfies Conditional Expression (44-1), and it is yet more preferable that the zoom lens satisfies Conditional Expression (44-2).

$$5.1<ft/fMt<20 \tag{44}$$

$$6.3<ft/fMt<15 \tag{44-1}$$

$$7.3<ft/fMt<12.2 \tag{44-2}$$

It is preferable that the zoom lens satisfies Conditional Expression (45). Here, it is assumed that an amount of movement of a lens group adjacent to the object side in the focus group during zooming from the wide angle end to the telephoto end is MfF. Further, it is assumed that an amount of movement of a lens group adjacent to the image side in the focus group during zooming from the wide angle end to the telephoto end is MfR. It is assumed that signs of MfF and MfR are positive in a case where the lens groups move from the object side to the image side and are negative in a case where the lens groups move from the image side to the object side. By not allowing the corresponding value of Conditional Expression (45) to be equal to or less than the lower limit thereof, it is possible to suppress narrowing of the spacing between the groups during zooming. As a result, there is an advantage in simplifying the driving mechanism. By not allowing the corresponding value of Conditional Expression (45) to be equal to or greater than the upper limit thereof, it is possible to suppress widening of the spacing between the groups during zooming. As a result, there is an advantage in simplifying the driving mechanism. In order to obtain more favorable characteristics, it is more preferable that the zoom lens satisfies Conditional Expression (45-1), and it is yet more preferable that the zoom lens satisfies Conditional Expression (45-2).

$$0.9<MfF/MfR<1.1 \tag{45}$$

$$0.99<MfF/MfR<1.01 \tag{45-1}$$

$$0.9999<MfF/MfR<1.0001 \tag{45-2}$$

It is preferable that among movement loci of respective lens groups that move during zooming from the wide angle end to the telephoto end, different movement loci are only five. In other words, there may be a configuration in which there are five types of movement loci of each lens group that moves during zooming. For example, in a case where there are a plurality of lens groups that move on the same movement locus during zooming from the wide angle end to the telephoto end as in examples described later, the movement loci are assumed as one type for the plurality of lens groups. In addition, in the technique of the present disclosure, in a case where the movement loci are different from each other in a part of the zoom range in the entire zoom range, even in a case where the movement loci are the same in the other part of the zoom range, the movement loci are considered to be different from each other during zooming from the wide angle end to the telephoto end. Further, the above-mentioned "movement locus" naturally relates to a lens group that moves during zooming, and does not relate to a lens group that remains stationary during zooming.

The zoom lens may be configured to include a plurality of lens groups that move on the same movement locus during zooming from the wide angle end to the telephoto end. In such a case, the lens group moving on the same movement locus can be driven by one cam. Thus, the driving mechanism of the lens group can be simplified. It should be noted that the above-mentioned "same movement locus during zooming from the wide angle end to the telephoto end" means that the same movement locus is used in the entire zoom range from the wide angle end to the telephoto end.

For example, during zooming from the wide angle end to the telephoto end, the lens group which is fourth from the object side in the zoom lens and the final lens group GE may be configured to move on the same movement locus. In such a case, the lens group moving on the same movement locus can be driven by one cam. Thus, the driving mechanism of the lens group can be simplified, and the effects described below can be obtained. Here, the third and fourth lens groups of the zoom lens from the object side are referred to as the third lens group G3 and the fourth lens group G4, respectively. As shown in FIG. 2, in the third lens group G3, the on-axis luminous flux and a peripheral luminous flux are close to each other near the optical axis. In the final lens group GE, the on-axis luminous flux and the peripheral luminous flux are separated. By making the movement locus of the final lens group GE the same as the movement locus of the fourth lens group G4 while changing the spacing between the third lens group G3 and the fourth lens group G4 as described above, it is possible to simplify the driving mechanism of the lens group while maintaining a favorable balance between the spherical aberration and field curvature during zooming. In a case where the zoom lens satisfies Conditional Expression (42), it is preferable that the fourth lens group G4 and the final lens group GE are configured to move on the same movement locus during zooming from the wide angle end to the telephoto end.

In a case where the zoom lens includes a plurality of lens groups that move on the same movement locus during zooming from the wide angle end to the telephoto end, the focus group may be configured to be located between the plurality of lens groups that move on the same movement locus. In such a case, a mechanism, which is driven during focusing while driving a plurality of lens groups and a focus group that move on the same movement locus with one cam, can also be used even for driving during zooming. Therefore, the driving mechanism can be simplified. In a case where the zoom lens satisfies the above-mentioned Conditional Expression (45), it is preferable to configure the zoom lens such that the focus group is located between the plurality of lens groups moving on the same movement locus.

The zoom lens may be configured to include eight or more lens surfaces each having an aspherical shape. In such a case, there is an advantage in suppressing various aberrations.

A lens closest to the image side in the second lens group G2 may be configured to include an aspherical surface. In such a case, there is an advantage in suppressing astigmatism. A lens closest to the object side in the second lens group G2 may be configured to include an aspherical surface. In such a case, there is an advantage in suppressing distortion.

A lens closest to the image side in the lens group closest to the object side in the middle group GM may be configured to include an aspherical surface. In such a case, there is an advantage in suppressing field curvature. A lens closest to the object side in the lens group closest to the object side in the middle group GM may be configured to include an aspherical surface. In such a case, there is an advantage in suppressing spherical aberration.

An object side surface of a lens closest to the image side in the second lens group G2 may be configured to have an aspherical shape by which a refractive power at a position of a maximum effective diameter is weaker than a refractive power near an optical axis. In such a case, there is an advantage in suppressing astigmatism. The aspherical shape will be described below with reference to FIG. 4.

Figure 4:
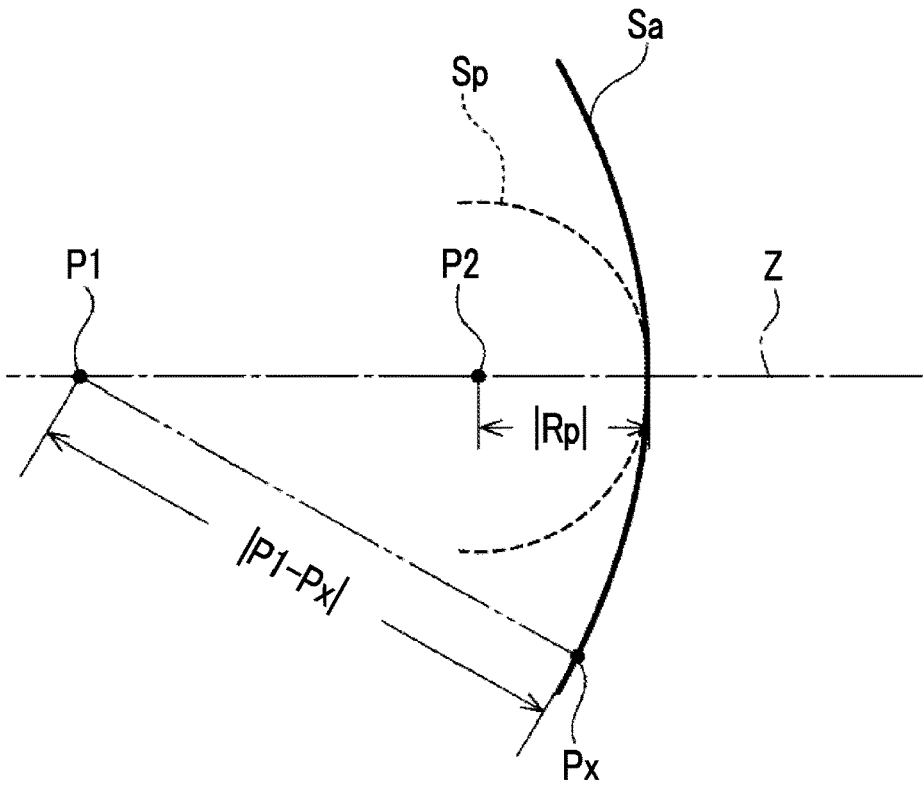
FIG. 4 is a diagram for explaining an aspherical shape.

The strengths of the refractive power at two different points on the same surface of the aspherical lens can be determined, for example, from the magnitude relationship of the absolute value of the curvature radius at each point. For example, FIG. 4 shows a cross-sectional view of an aspherical surface Sa of the object side surface of the lens, in which the refractive power is weak at a position Px of the maximum effective diameter as compared with a refractive power near the optical axis. In FIG. 4, a normal line of the aspherical surface Sa at the position Px of the maximum effective diameter is indicated by a two-point chain line, and the intersection of this normal line and the optical axis Z is set as a point P1. An absolute value of the curvature radius of the aspherical surface Sa at the position Px of the maximum effective diameter is a length |P1–Px| of a line segment connecting the position Px of the maximum effective diameter and the point P1. Meanwhile, a curvature radius of the aspherical surface Sa near the optical axis is a so-called paraxial curvature radius. In FIG. 4, a part of a paraxial spherical surface Sp of the aspherical surface Sa is shown by a dotted line. The paraxial spherical surface Sp is a spherical surface having a radius |Rp| that passes through an intersection between the aspherical surface Sa and the optical axis Z and that has a point P2 on the optical axis as a center. An absolute value of the curvature radius of the aspherical surface Sa near the optical axis is a radius |Rp| of the paraxial spherical surface Sp. In the example of FIG. 4, the phrase "the refractive power at the position Px of the maximum effective diameter is weaker than the refractive power near the optical axis" means that |P1–Px| is greater than |Rp|.

Likewise, a configuration in which the strength relationship of the refractive power is opposite to that of the example of FIG. 4 can be considered. That is, in a case where |P1–Px| and |Rp| are defined in the same manner as described above, the phrase "the refractive power at the position Px of the maximum effective diameter is stronger than the refractive power near the optical axis" means that |P1–Px| is less than |Rp|.

An image side surface of the lens closest to the object side in the second lens group G2 may be configured to have an aspherical shape by which a refractive power at a position of a maximum effective diameter is stronger than a refractive power near an optical axis. In such a case, there is an advantage in suppressing distortion.

An object side surface of a lens closest to the image side in a lens group closest to the object side in the middle group GM may be configured to have an aspherical shape by which a refractive power at a position of a maximum effective diameter is weaker than a refractive power near an optical axis. In such a case, there is an advantage in suppressing field curvature.

An image side surface of a lens closest to the object side in a lens group closest to the object side in the middle group GM may be configured to have an aspherical shape by which a refractive power at a position of a maximum effective diameter is weaker than a refractive power near an optical axis. In such a case, there is an advantage in suppressing spherical aberration.

It is preferable that the zoom lens satisfies Conditional Expression (46). Here, it is assumed that a paraxial curvature radius of an object side surface of the lens closest to the image side in the second lens group G2 is Rc2ef. It is assumed that a curvature radius of the object side surface of the lens closest to the image side in the second lens group G2 at a position of a maximum effective diameter is Ry2ef. By not allowing the corresponding value of Conditional Expression (46) to be equal to or less than the lower limit thereof, it is possible to suppress excessive correction of astigmatism. By not allowing the corresponding value of Conditional Expression (46) to be equal to or greater than the upper limit thereof, there is an advantage in suppressing astigmatism. In order to obtain more favorable characteristics, it is more preferable that the zoom lens satisfies Conditional Expression (46-1), and it is yet more preferable that the zoom lens satisfies Conditional Expression (46-2).

$$0.1 < Rc2ef/Ry2ef < 0.999 \tag{46}$$

$$0.45 < Rc2ef/Ry2ef < 0.95 \tag{46-1}$$

$$0.66 < Rc2ef/Ry2ef < 0.8 \tag{46-2}$$

It is preferable that the zoom lens satisfies Conditional Expression (47). Here, it is assumed that a paraxial curvature radius of an image side surface of the lens closest to the object side in the second lens group G2 is Rc21r. It is assumed that a curvature radius of the image side surface of the lens closest to the object side in the second lens group G2 at a position of a maximum effective diameter is Ry21r. By not allowing the corresponding value of Conditional Expression (47) to be equal to or less than the lower limit thereof, there is an advantage in suppressing distortion. By not allowing the corresponding value of Conditional Expression (47) to be equal to or greater than the upper limit thereof, it is possible to suppress excessive correction of distortion. In order to obtain more favorable characteristics, it is more preferable that the zoom lens satisfies Conditional Expression (47-1), and it is yet more preferable that the zoom lens satisfies Conditional Expression (47-2).

$$1.001 < Rc21r/Ry21r < 4.5 \tag{47}$$

$$1.05 < Rc21r/Ry21r < 2.5 \tag{47-1}$$

$$1.07 < Rc21r/Ry21r < 1.27 \tag{47-2}$$

It is preferable that the zoom lens satisfies Conditional Expression (48). Here, it is assumed that a paraxial curvature radius of an object side surface of a lens closest to the image side in a lens group closest to the object side in the middle group GM is Rc3ef. It is assumed that a curvature radius of the object side surface of the lens closest to the image side in the lens group closest to the object side in the middle group GM at a position of a maximum effective diameter is Ry3ef. By not allowing the corresponding value of Conditional Expression (48) to be equal to or less than the lower limit thereof, it is possible to suppress excessive correction of field curvature. By not allowing the corresponding value of Conditional Expression (48) to be equal to or greater than the upper limit thereof, there is an advantage in suppressing field curvature. In order to obtain more favorable characteristics, it is more preferable that the zoom lens satisfies Conditional Expression (48-1), and it is yet more preferable that the zoom lens satisfies Conditional Expression (48-2).

$$0.1 < Rc3ef/Ry3ef < 0.999 \tag{48}$$

$$0.5 < Rc3ef/Ry3ef < 0.95 \tag{48-1}$$

$$0.77 < Rc3ef/Ry3ef < 0.85 \tag{48-2}$$

It is preferable that the zoom lens satisfies Conditional Expression (49). Here, it is assumed that a paraxial curvature radius of an image side surface of a lens closest to the object side in a lens group closest to the object side in the middle group GM is Rc31r. It is assumed that a curvature radius of the image side surface of the lens closest to the object side in the lens group closest to the object side in the middle group GM at a position of a maximum effective diameter is Ry31r. By not allowing the corresponding value of Conditional Expression (49) to be equal to or less than the lower limit thereof, it is possible to suppress excessive correction of spherical aberration. By not allowing the corresponding value of Conditional Expression (49) to be equal to or greater than the upper limit thereof, there is an advantage in suppressing spherical aberration. In order to obtain more favorable characteristics, it is more preferable that the zoom lens satisfies Conditional Expression (49-1), and it is yet more preferable that the zoom lens satisfies Conditional Expression (49-2).

$$0 < Rc31r/Ry31r < 0.999 \tag{49}$$

$$0.08 < Rc31r/Ry31r < 0.92 \tag{49-1}$$

$$0.4 < Rc31r/Ry31r < 0.87 \tag{49-2}$$

It is preferable that the zoom lens satisfies Conditional Expression (50). Here, it is assumed that a paraxial curvature radius of an object side surface of the lens closest to the image side in the second lens group G2 is Rc2ef. It is assumed that a paraxial curvature radius of the image side surface of the lens closest to the image side in the second lens group G2 is Rc2er. It is assumed that a curvature radius of the object side surface of the lens closest to the image side in the second lens group G2 at a position of a maximum effective diameter is Ry2ef. It is assumed that a curvature radius of the image side surface of the lens closest to the image side in the second lens group G2 at the position of the maximum effective diameter is Ry2er. By not allowing the corresponding value of Conditional Expression (50) to be equal to or less than the lower limit thereof, it is possible to suppress excessive correction of astigmatism. By not allowing the corresponding value of Conditional Expression (50) to be equal to or greater than the upper limit thereof, there is an advantage in suppressing astigmatism. In order to obtain more favorable characteristics, it is more preferable that the zoom lens satisfies Conditional Expression (50-1), and it is yet more preferable that the zoom lens satisfies Conditional Expression (50-2).

$$1.05 < (1/Rc2ef - 1/Rc2er)/(1/Ry2ef - 1/Ry2er) < 5 \tag{50}$$

$$1.2 < (1/Rc2ef - 1/Rc2er)/(1/Ry2ef - 1/Ry2er) < 3.5 \tag{50-1}$$

$$1.4 < (1/Rc2ef - 1/Rc2er)/(1/Ry2ef - 1/Ry2er) < 2 \tag{50-2}$$

It is preferable that the zoom lens satisfies Conditional Expression (51). Here, it is assumed that a paraxial curvature radius of the object side surface of the lens closest to the object side in the second lens group G2 is Rc21f. It is assumed that a paraxial curvature radius of the image side surface of the lens closest to the object side in the second lens group G2 is Rc21r.

It is assumed that a curvature radius of the object side surface of the lens closest to the object side in the second lens group G2 at the position of the maximum effective diameter is Ry21f. It is assumed that a curvature radius of the image side surface of the lens closest to the object side in the second lens group G2 at a position of a maximum effective diameter is Ry21r. By not allowing the corresponding value of Conditional Expression (51) to be equal to or less than the lower limit thereof, there is an advantage in suppressing distortion. By not allowing the corresponding value of Conditional Expression (51) to be equal to or greater than the upper limit thereof, it is possible to suppress excessive correction of distortion. In order to obtain more favorable characteristics, it is more preferable that the zoom lens satisfies Conditional Expression (51-1), and it is yet more preferable that the zoom lens satisfies Conditional Expression (51-2).

$$0.4 < (1/Rc21f - 1/Rc21r)/(1/Ry21f - 1/Ry21r) < 0.99 \tag{51}$$

$$0.65 < (1/Rc21f - 1/Rc21r)/(1/Ry21f - 1/Ry21r) < 0.97 \tag{51-1}$$

$$0.75 < (1/Rc21f - 1/Rc21r)/(1/Ry21f - 1/Ry21r) < 0.95 \tag{51-2}$$

It is preferable that the zoom lens satisfies Conditional Expression (52). Here, it is assumed that a paraxial curvature radius of an object side surface of a lens closest to the image side in a lens group closest to the object side in the middle group GM is Rc3ef. It is assumed that a paraxial curvature radius of an image side surface of the lens closest to the image side in the lens group closest to the object side in the middle group GM is Rc3er. It is assumed that a curvature radius of the object side surface of the lens closest to the image side in the lens group closest to the object side in the middle group GM at a position of a maximum effective diameter is Ry3ef. It is assumed that a curvature radius of the image side surface of the lens closest to the image side in the lens group closest to the object side in the middle group GM at the position of the maximum effective diameter is Ry3er. By not allowing the corresponding value of Conditional Expression (52) to be equal to or less than the lower limit thereof, there is an advantage in suppressing field curvature. By not allowing the corresponding value of Conditional Expression (52) to be equal to or greater than the upper limit thereof, it is possible to suppress excessive correction of field curvature. In order to obtain more favorable characteristics, it is more preferable that the zoom lens satisfies Conditional Expression (52-1), and it is yet more preferable that the zoom lens satisfies Conditional Expression (52-2).

$$1.01 < (1/Rc3ef - 1/Rc3er)/(1/Ry3ef - 1/Ry3er) < 2 \qquad (52)$$

$$1.02 < (1/Rc3ef - 1/Rc3er)/(1/Ry3ef - 1/Ry3er) < 1.5 \qquad (52\text{-}1)$$

$$1.03 < (1/Rc3ef - 1/Rc3er)/(1/Ry3ef - 1/Ry3er) < 1.1 \qquad (52\text{-}2)$$

It is preferable that the zoom lens satisfies Conditional Expression (53). Here, it is assumed that a paraxial curvature radius of an object side surface of a lens closest to the object side in a lens group closest to the object side in the middle group GM is Rc31f. It is assumed that a paraxial curvature radius of an image side surface of the lens closest to the object side in the lens group closest to the object side in the middle group GM is Rc31r. It is assumed that a curvature radius of the object side surface of the lens closest to the object side in the lens group closest to the object side in the middle group GM at a position of a maximum effective diameter is Ry31f. It is assumed that a curvature radius of the image side surface of the lens closest to the object side in the lens group closest to the object side in the middle group GM at a position of a maximum effective diameter is Ry31r. By not allowing the corresponding value of Conditional Expression (53) to be equal to or less than the lower limit thereof, there is an advantage in suppressing spherical aberration. By not allowing the corresponding value of Conditional Expression (53) to be equal to or greater than the upper limit thereof, it is possible to suppress excessive correction of spherical aberration. In order to obtain more favorable characteristics, it is more preferable that the zoom lens satisfies Conditional Expression (53-1), and it is yet more preferable that the zoom lens satisfies Conditional Expression (53-2).

$$1.1 < (1/Rc31f - 1/Rc31r)/(1/Ry31f - 1/Ry31r) < 3 \qquad (53)$$

$$1.2 < (1/Rc31f - 1/Rc31r)/(1/Ry31f - 1/Ry31r) < 2.3 \qquad (53\text{-}1)$$

$$1.26 < (1/Rc31f - 1/Rc31r)/(1/Ry31f - 1/Ry31r) < 1.64 \qquad (53\text{-}2)$$

The example shown in FIG. 1 is an example, and various modifications can be made without departing from the scope of the technique of the present disclosure. For example, the number of lens groups included in the middle group GM, the number of lens groups constituting the whole system, and the number of lenses included in each lens group may be different from the examples in FIG. 1.

For example, the zoom lens may be configured to consist of six lens groups as a whole. In such a case, there is an advantage in achieving reduction in total length of the lens system. Alternatively, the zoom lens may be configured to consist of seven lens groups as a whole. Such a case is advantageous in suppressing fluctuations in various aberrations during zooming.

The middle group GM may be configured to consist of two lens groups. For example, the middle group GM may be configured to consist of a lens group that has a positive refractive power and a lens group that has a negative refractive power, in order from the object side to the image side.

The middle group GM may be configured to consist of three lens groups. For example, the middle group GM may be configured to consist of a lens group that has a positive refractive power, a lens group that has a positive refractive power, and a lens group that has a negative refractive power, in order from the object side to the image side. Alternatively, the middle group GM may be configured to consist of a lens group that has a negative refractive power, a lens group that has a positive refractive power, and a lens group that has a negative refractive power, in order from the object side to the image side.

The middle group GM may be configured to consist of four lens groups. For example, the middle group GM may be configured to consist of, in order from the object side to the image side, a lens group that has a positive refractive power, a lens group that has a positive refractive power, a lens group that has a negative refractive power, and a lens group that has a negative refractive power.

The middle group GM may be configured to include an aperture stop St. In such a case, there is an advantage in achieving reduction in size of the whole system. For example, the aperture stop St may be disposed at the position closest to the object side in the middle group GM.

The lens group closest to the image side in the middle group GM may be configured to be the focus group. In such a case, there is an advantage in suppressing fluctuation in angle of view during focusing.

In a case where the zoom lens includes a plurality of focus groups, it is preferable that at least one focus group among the plurality of focus groups has preferable and possible configurations relating to the above-mentioned focus group.

The vibration-proof group may be configured to be included in the middle group GM. The vibration-proof group may be configured to consist of a part of the lens group included in the middle group GM.

The final lens group GE may be configured to have a positive refractive power. The number of lenses included in the final lens group GE may be two or less. In such a case, there is an advantage in achieving reduction in size. The lens closest to the image side in the zoom lens may be configured to be a positive lens. The lens which is second from the image side in the zoom lens may be configured to be a negative lens.

The above-mentioned preferred configurations and available configurations may be optional combinations, and it is preferable to selectively adopt the configurations in accordance with required specifications. It should be noted that the conditional expressions that the zoom lens of the present disclosure preferably satisfies are not limited to the conditional expressions described in the form of expressions, and the lower limit and the upper limit are selected from the preferable, more preferable, and yet more preferable conditional expressions. The conditional expressions may include all conditional expressions obtained through optional combinations.

For example, according to one preferred embodiment, the zoom lens of the present disclosure consists of, in order from the object side to the image side, a first lens group G1 that has a positive refractive power, a second lens group G2 that has a negative refractive power, a middle group GM that includes at least one lens group, and a final lens group GE. The middle group GM has a positive refractive power as a whole throughout the entire zoom range. During zooming, the spacing between the first lens group G1 and the second lens group G2 changes, the spacing between the second lens group G2 and the middle group GM changes, and the spacing between the middle group GM and the final lens group GE changes. In a case where the middle group GM includes a plurality of lens groups, all the spacings of adjacent lens groups in the middle group GM change during zooming. Then, Conditional Expression (1) is satisfied.

Next, examples of the zoom lens of the present disclosure will be described with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are applied in the drawings of different examples, components do not necessarily have a common configuration.

Example 1

FIG. 1 shows a configuration and movement loci of a zoom lens of Example 1, and an illustration method and a configuration thereof are as described above. Therefore, some description is not repeated herein. The zoom lens shown in Example 1 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a negative refractive power. The middle group GM consists of the third lens group G3 and the fourth lens group G4. The final lens group GE consists of the fifth lens group G5. During zooming from the wide angle end to the telephoto end, the five lens groups move along the optical axis Z by changing the spacing between the five lens groups and adjacent lens groups on different movement loci. The focus group consists of the fourth lens group G4. The vibration-proof group consists of the second lens group G2.

Regarding the zoom lens of Example 1, Table 1 shows basic lens data, Table 2 shows specifications and variable surface spacings, and Table 3 shows aspherical coefficients thereof.

The table of basic lens data will be described as follows. The Sn column shows surface numbers in a case where the surface closest to the object side is the first surface, and the number is increased one by one toward the image side. The R column shows a curvature radius of each surface. The D column shows a surface spacing between each surface and the surface adjacent to the image side on the optical axis. The Nd column shows a refractive index of each constituent element at the d line. The vd column shows an Abbe number of each constituent element based on the d line. The θgF column shows a partial dispersion ratio of each constituent element between the g line and the F line. The ED column shows an effective diameter of each lens surface. The SG column shows a specific gravity of each component.

In the table of basic lens data, the sign of the curvature radius of the convex surface facing toward the object side is positive, and the sign of the curvature radius of the convex surface facing toward the image side is negative. Table 1 also shows the aperture stop St and the optical member PP. In a cell of a surface number of a surface corresponding to the aperture stop St, the surface number and a term of (St) are noted. A value at the bottom cell of the column of surface spacing in the table indicates a spacing between the image plane Sim and the surface closest to the image side in the table. The symbol DD [ ] is used for each variable surface spacing, and the object side surface number of the spacing is given in [ ] and is noted in the column of surface spacing.

Table 2 shows the zoom ratio Zr, the focal length f, the open F number FNo., the maximum total angle of view $2\omega$, and the variable surface spacing, based on the d line. The zoom ratio is synonymous with the zoom magnification. [° ] in the cell of $2\theta$ indicates that the unit thereof is a degree. In Table 2, the column labeled "WIDE" shows values in the wide angle end state, and the column labeled "TELE" shows values in the telephoto end state.

In basic lens data, a reference sign * is attached to surface numbers of aspherical surfaces, and values of the paraxial curvature radius are written into the column of the curvature radius of the aspherical surface. In Table 3, the SN row shows surface numbers of the aspherical surfaces, and the KA and Am rows show numerical values of the aspherical coefficients for each aspherical surface. It should be noted that m of Am is an integer of 3 or more, and differs depending on the surface. For example, on the sixth surface of Example 1, m=3, 4, 5, 6, 7, 8, 9, and 10. The "E±n" (n: an integer) in numerical values of the aspherical coefficients of Table 3 indicates "$\times 10^{\pm n}$". KA and Am are the aspherical coefficients in the aspherical surface expression represented by the following expression.

$$Zd=C \times h^2/\{1+(1-KA \times C^2 \times h^2)^{1/2}\}+\Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of the paraxial curvature radius, KA and Am are aspherical coefficients, and $\Sigma$ in the aspherical surface expression means the sum with respect to m.

In the data of each table, degrees are used as a unit of an angle, and millimeters are used as a unit of a length, but appropriate different units may be used since the optical system can be used even in a case where the system is enlarged or reduced in proportion. Each of the following tables shows numerical values rounded off to predetermined decimal places.

TABLE 1

| | | | Example 1 | | | | |
|---|---|---|---|---|---|---|---|
| Sn | R | D | Nd | vd | θgF | ED | SG |
| 1 | 103.0687 | 1.5000 | 1.88300 | 40.76 | 0.56679 | 48.8911 | 5.5200 |
| 2 | 57.9337 | 7.0188 | 1.49700 | 81.61 | 0.53887 | 47.4031 | 3.7000 |
| 3 | −1268.1206 | 0.1500 | | | | 46.9833 | |
| 4 | 55.7710 | 5.9050 | 1.43700 | 95.10 | 0.53364 | 45.0000 | 3.5300 |
| 5 | 530.7646 | DD[5] | | | | 44.4560 | |
| *6 | 62.8563 | 1.5034 | 1.85135 | 40.10 | 0.56954 | 24.9930 | 5.2500 |
| *7 | 13.3473 | 5.7552 | | | | 18.7585 | |
| 8 | −68.1263 | 1.1819 | 1.88300 | 40.76 | 0.56679 | 18.3623 | 5.5200 |
| 9 | 29.6240 | 0.1669 | | | | 17.8320 | |
| 10 | 32.5958 | 5.5842 | 1.74077 | 27.79 | 0.60961 | 17.8413 | 3.1000 |
| 11 | −18.8379 | 0.7936 | | | | 17.6188 | |
| *12 | −12.2843 | 1.1013 | 1.61881 | 63.85 | 0.54182 | 17.2000 | 3.5700 |
| *13 | −36.7681 | DD[13] | | | | 17.4611 | |
| 14 (St) | ∞ | 0.8000 | | | | 17.2213 | |
| *15 | 23.5706 | 3.6188 | 1.58313 | 59.38 | 0.54237 | 18.2038 | 3.0500 |
| *16 | −70.3476 | 0.1502 | | | | 18.1851 | |
| 17 | 80.7504 | 4.2354 | 1.62004 | 36.26 | 0.58800 | 18.1550 | 2.6900 |
| 18 | −21.9318 | 0.1749 | | | | 17.9644 | |
| 19 | −21.9389 | 0.6754 | 1.88100 | 40.14 | 0.57010 | 17.7737 | 5.4000 |
| 20 | 35.9523 | 0.1570 | | | | 17.8786 | |
| 21 | 32.5503 | 5.9718 | 1.51742 | 52.43 | 0.55649 | 18.0430 | 2.4600 |
| 22 | −17.4500 | 0.1507 | | | | 18.3297 | |
| 23 | 465.8347 | 0.6000 | 1.80610 | 33.27 | 0.58845 | 16.9915 | 3.4700 |
| 24 | 12.3450 | 4.8808 | 1.51680 | 64.20 | 0.53430 | 16.0372 | 2.5200 |
| 25 | 78.9859 | 0.1925 | | | | 16.0000 | |
| *26 | 19.0790 | 5.3268 | 1.49710 | 81.56 | 0.53848 | 16.8432 | 3.6400 |
| *27 | −24.8225 | DD[27] | | | | 17.0045 | |

TABLE 1-continued

| | | | Example 1 | | | | |
|---|---|---|---|---|---|---|---|
| Sn | R | D | Nd | vd | θgF | ED | SG |
| 28 | 46.2318 | 2.6068 | 1.84666 | 23.78 | 0.62054 | 13.4000 | 3.5400 |
| 29 | −38.7240 | 0.6100 | 1.83481 | 42.74 | 0.56490 | 13.0754 | 4.5800 |
| 30 | 13.5668 | DD[30] | | | | 12.5134 | |
| 31 | −32.4810 | 1.0002 | 1.61800 | 63.33 | 0.54414 | 18.8135 | 3.6700 |
| 32 | −1050.4881 | 0.1502 | | | | 20.1131 | |
| *33 | 89.0335 | 3.0000 | 1.51633 | 64.06 | 0.53345 | 20.8247 | 2.3800 |
| *34 | −158.2303 | DD[34] | | | | 21.6787 | |
| 35 | ∞ | 2.8500 | 1.51680 | 64.20 | 0.53430 | 26.7962 | 2.5200 |
| 36 | ∞ | 1.1138 | | | | 27.8028 | |

TABLE 2

| | Example 1 | |
|---|---|---|
| | WIDE | TELE |
| Zr | 1.0 | 15.7 |
| f | 18.55 | 291.44 |
| FNo. | 3.61 | 6.50 |
| 2ω[°] | 79.24 | 5.47 |
| DD[5] | 0.8006 | 69.9041 |
| DD[13] | 30.2547 | 1.3773 |
| DD[27] | 1.4333 | 1.4267 |
| DD[30] | 14.9665 | 11.2811 |
| DD[34] | 8.7335 | 52.3307 |

TABLE 3

| | | Example 1 | | |
|---|---|---|---|---|
| Sn | 6 | 7 | 12 | 3 |
| KA | 1.0000000000E+00 | 1.3131210926E+00 | 1.0000000000E+00 | 1.0000000000E+00 |
| A3 | 0.0000000000E+00 | 0.0000000000E+00 | 0.0000000000E+00 | 0.0000000000E+00 |
| A4 | 4.4565181314E−05 | 5.8575121035E−05 | 3.0726023413E−04 | 2.1785352946E−04 |
| A5 | −1.7787388432E−06 | −5.6431715687E−06 | −2.2852798014E−05 | −1.9596043760E−05 |
| A6 | −4.7007346009E−07 | 3.9117322992E−07 | 3.0865886543E−06 | −3.2369511730E−06 |
| A7 | 4.5317190700E−08 | −1.6677068100E−08 | 6.3592310646E−07 | 5.2803044009E−07 |
| A8 | 8.1185906270E−11 | −1.3273462207E−10 | 9.0557795298E−09 | −2.2294498339E−10 |
| A9 | −1.5373999700E−10 | 3.9016251571E−11 | −3.4328414528E−09 | −3.3976925044E−09 |
| A10 | 4.1949688930E−12 | 1.9497182629E−11 | 1.8654649619E−10 | 1.4235231242E−10 |

| Sn | 15 | 16 | 26 | 27 |
|---|---|---|---|---|
| KA | 1.0000000000E+00 | 1.0000000000E+00 | 1.0000000000E+00 | 1.0000000000E+00 |
| A3 | 0.0000000000E+00 | 0.0000000000E+00 | 0.0000000000E+00 | 0.0000000000E+00 |
| A4 | −2.6151978868E−05 | 2.7182802523E−05 | −2.5041576890E−05 | −7.2075860825E−06 |
| A5 | 9.7228037735E−06 | 8.3545831319E−06 | −1.3993406348E−05 | −3.8741876006E−06 |
| A6 | −2.4857483455E−06 | −2.2389319423E−06 | 8.7297680064E−06 | 4.7618667759E−06 |
| A7 | 2.4316374351E−07 | 2.5387278431E−07 | −2.5947046532E−06 | −1.7236011874E−06 |
| A8 | 7.1828451184E−09 | 5.1969986494E−09 | 3.9961782943E−07 | 2.8589090693E−07 |
| A9 | −2.6876433169E−09 | −2.7271248652E−09 | −3.1286033656E−08 | −2.3260524831E−08 |
| A10 | 1.0996194999E−10 | 1.2123059337E−10 | 9.7848211189E−10 | 7.4224696707E−10 |

| Sn | 33 | 34 |
|---|---|---|
| KA | 1.0000000000E+00 | 1.0000000000E+00 |
| A3 | 0.0000000000E+00 | 0.0000000000E+00 |
| A4 | −4.5758085753E−06 | −1.4534157841E−05 |
| A5 | 1.2268569325E−06 | −1.8099177836E−07 |
| A6 | −8.1537414848E−08 | 6.1611151590E−08 |
| A7 | −2.1271875476E−08 | −1.7635683798E−08 |
| A8 | 5.9481703881E−10 | −5.3934437730E−10 |
| A9 | 1.0461574218E−10 | 9.2628233562E−11 |
| A10 | 2.3943401957E−13 | 1.1635766751E−12 |

45

46

Figure 5:
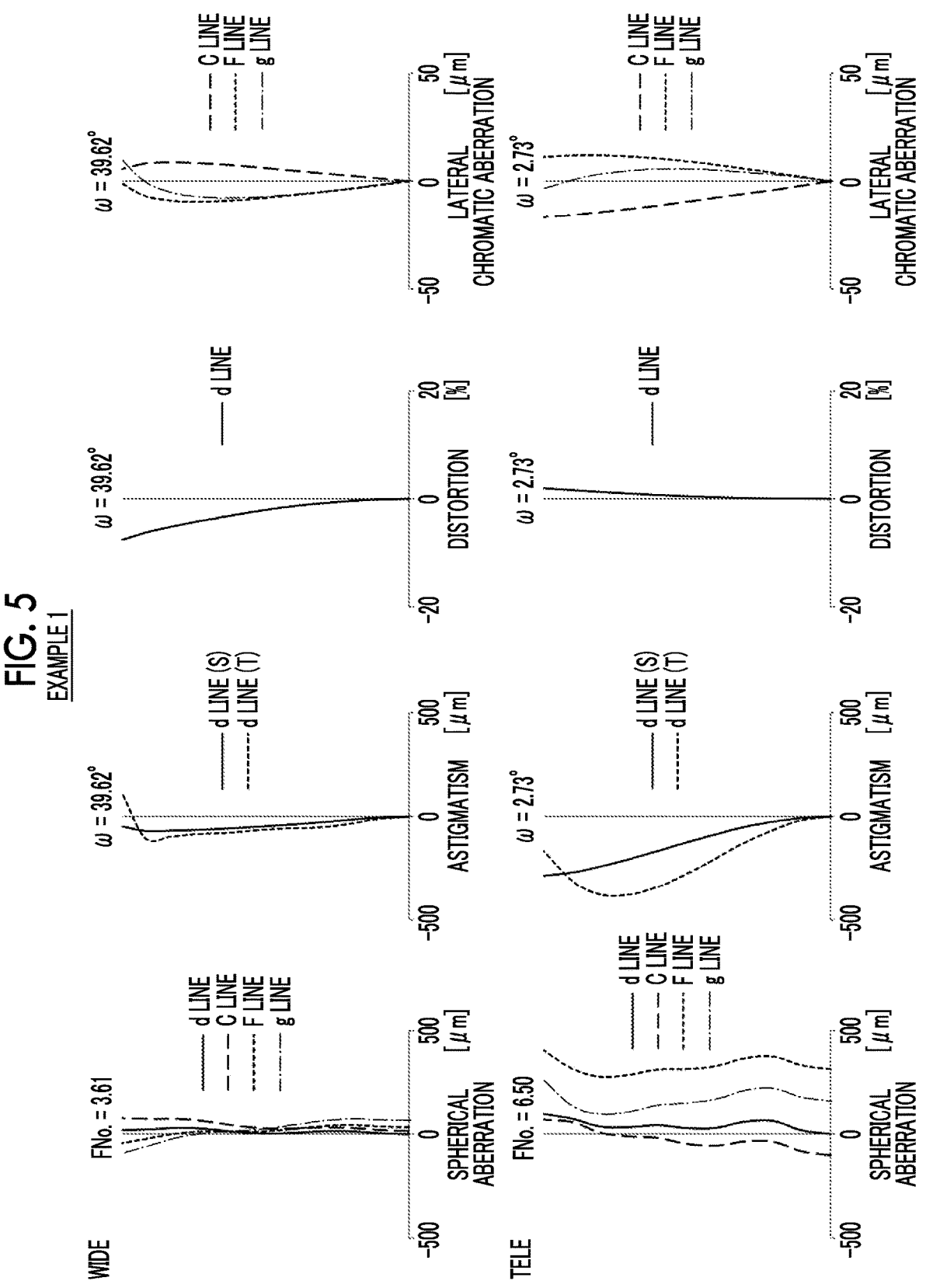
FIG. 5 is a diagram showing aberrations of the zoom lens of Example 1.

FIG. 5 is a diagram showing aberrations of the zoom lens of Example 1 in a state where the infinite distance object is in focus. FIG. 5 shows, in order from the left, spherical aberration, astigmatism, distortion, and lateral chromatic aberration. In FIG. 5, the upper part labeled "WIDE" shows aberrations at the wide angle end state, and the lower part labeled "TELE" shows aberrations at the telephoto end state. In the spherical aberration diagram, aberrations at the d line, the C line, the F line, and the g line are indicated by a solid line, a long broken line, a short broken line, and a chain line, respectively. In the astigmatism diagram, aberration in a sagittal direction at the d line is indicated by a solid line, and aberration in a tangential direction at the d line is indicated by a short broken line. In the distortion diagram, aberration at the d line is indicated by a solid line. In the lateral chromatic aberration diagram, aberrations at the C line, the F line, and the g line are respectively indicated by a long broken line, a short broken line, and a chain line. In the spherical aberration diagram, the value of the open F number is shown after FNo.=. In other aberration diagrams, the value of the maximum half angle of view is shown after ω=.

Symbols, meanings, description methods, and illustration methods of the respective data pieces according to Example 1 are generally similar to those in the following examples unless otherwise specified. Therefore, in the following description, repeated description will not be given.

Example 2

Figure 6:
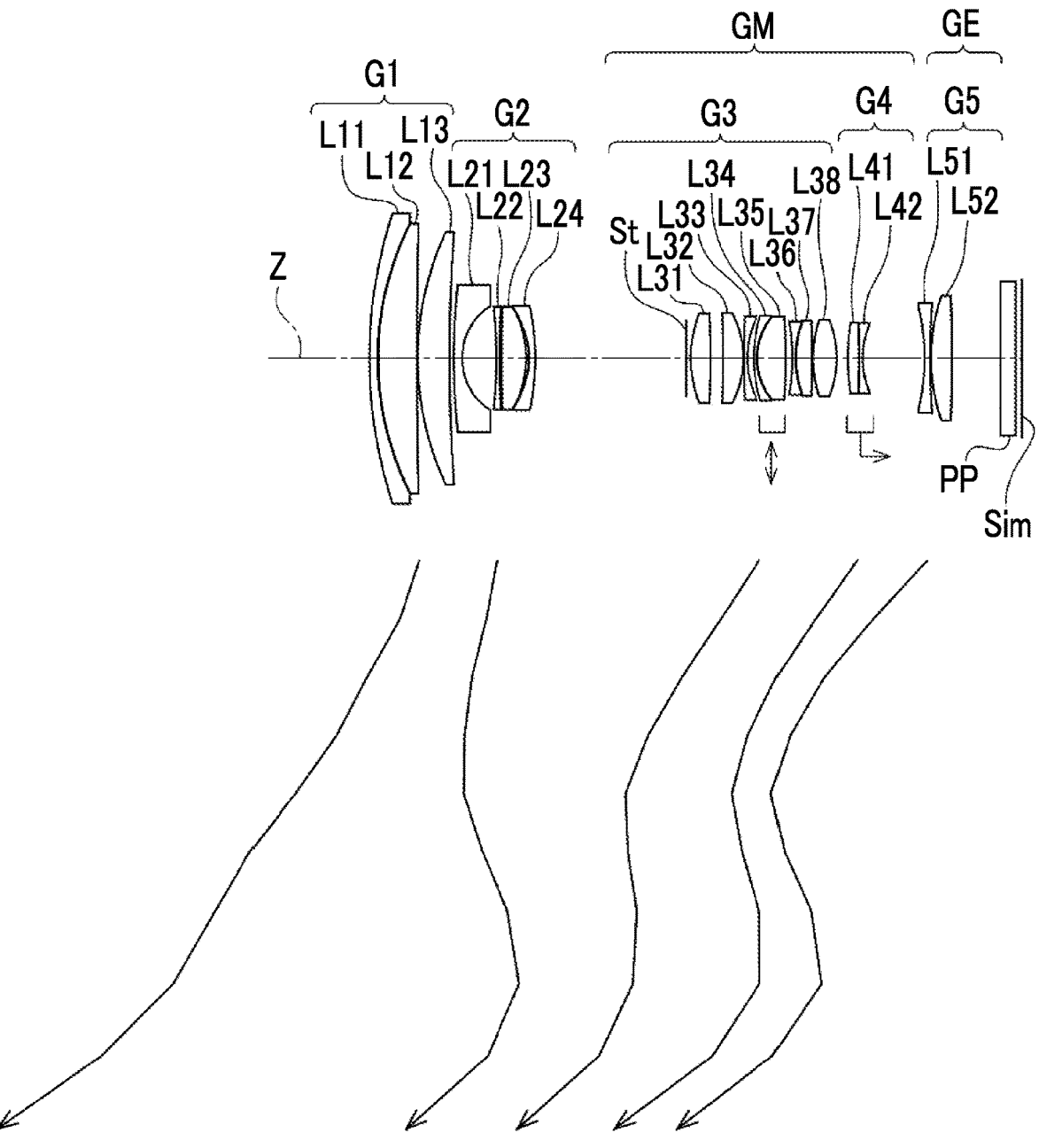
FIG. 6 is a cross-sectional view of a configuration of a zoom lens of Example 2 and a diagram showing movement loci thereof.

FIG. 6 shows a configuration and movement loci of the zoom lens of Example 2. The zoom lens shown in Example 2 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a negative refractive power. The middle group GM consists of the third lens group G3 and the fourth lens group G4. The final lens group GE consists of the fifth lens group G5. During zooming from the wide angle end to the telephoto end, the five lens groups move along the optical axis Z by changing the spacing between the five lens groups and adjacent lens groups on different movement loci.

The first lens group G1 consists of three lenses L11 to L13, in order from the object side to the image side. The second lens group G2 consists of four lenses L21 to L24, in order from the object side to the image side. The third lens group G3 consists of an aperture stop St and eight lenses L31 to L38, in order from the object side to the image side. The fourth lens group G4 consists of two lenses L41 and L42, in order from the object side to the image side. The fifth lens group G5 consists of two lenses L51 and L52, in order from the object side to the image side. The focus group consists of the fourth lens group G4. The vibration-proof group consists of two lenses L34 and L35.

Figure 7:
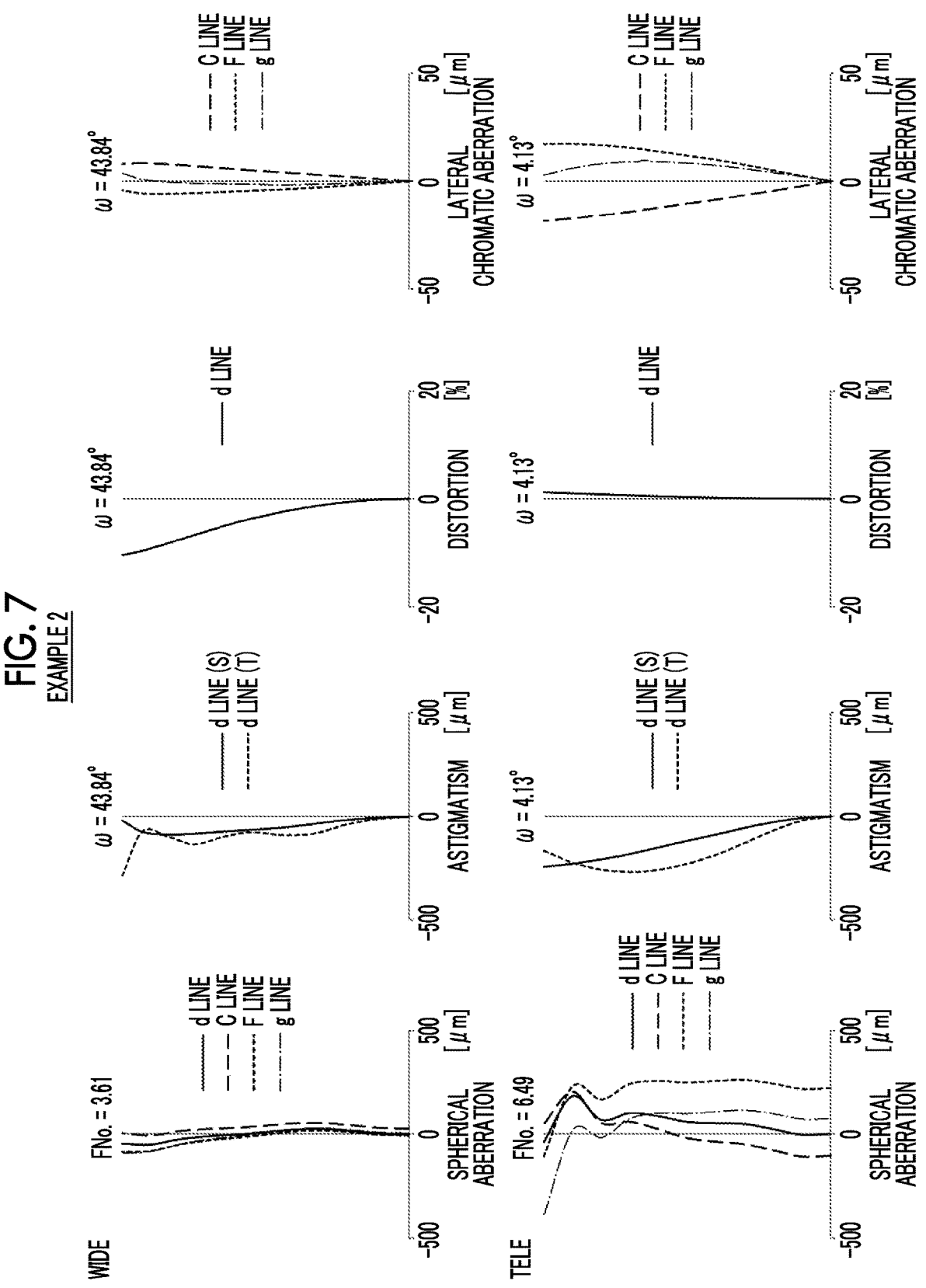
FIG. 7 is a diagram showing aberrations of the zoom lens of Example 2.

Regarding the zoom lens of Example 2, Table 4 shows basic lens data, Table 5 shows specifications and variable surface spacings, and Table 6 shows aspherical coefficients thereof. FIG. 7 shows aberration diagrams.

TABLE 4

| | | | Example 2 | | | | |
|---|---|---|---|---|---|---|---|
| Sn | R | D | Nd | vd | θgF | ED | SG |
| 1 | 84.1959 | 1.5000 | 1.91082 | 35.25 | 0.58224 | 51.4013 | 4.9700 |
| 2 | 53.6376 | 7.0856 | 1.49700 | 81.61 | 0.53887 | 48.6444 | 3.7000 |
| 3 | 995.3140 | 0.1500 | | | | 48.1032 | |
| 4 | 54.1290 | 5.7261 | 1.49700 | 81.61 | 0.53887 | 45.6000 | 3.7000 |
| 5 | 330.0817 | DD[5] | | | | 44.9738 | |
| *6 | 189.7126 | 1.5000 | 1.85135 | 40.10 | 0.56954 | 26.6785 | 5.2500 |
| *7 | 11.8499 | 6.1249 | | | | 18.7066 | |
| 8 | −97.4722 | 0.7000 | 1.90366 | 31.31 | 0.59481 | 18.5742 | 4.5100 |
| 9 | 169.4835 | 0.4160 | | | | 18.5374 | |
| 10 | 554.7322 | 4.4308 | 1.84666 | 23.78 | 0.61923 | 18.5492 | 3.5000 |
| 11 | −18.2941 | 0.5134 | | | | 18.5694 | |
| *12 | −12.9860 | 1.1000 | 1.75500 | 52.32 | 0.54757 | 18.4000 | 4.1700 |
| *13 | −37.4253 | DD[13] | | | | 18.7110 | |
| 14 (St) | ∞ | 0.8000 | | | | 15.1003 | |
| *15 | 20.0572 | 3.5744 | 1.58313 | 59.38 | 0.54237 | 16.0318 | 3.0500 |
| *16 | −94.0157 | 2.3057 | | | | 16.1230 | |
| 17 | −213.3357 | 3.6544 | 1.48749 | 70.44 | 0.53062 | 16.1409 | 2.4500 |
| 18 | −16.9922 | 0.1498 | | | | 16.1944 | |
| 19 | 236.6430 | 0.6000 | 1.72916 | 54.67 | 0.54534 | 14.9867 | 4.0500 |
| 20 | 16.8611 | 1.1998 | | | | 14.3232 | |
| 21 | 25.6229 | 0.6000 | 1.90366 | 31.31 | 0.59481 | 15.3391 | 4.5100 |
| 22 | 11.7801 | 5.0036 | 1.78590 | 44.20 | 0.56317 | 14.8599 | 4.4000 |
| 23 | −102.6036 | 1.2001 | | | | 14.5522 | |
| 24 | −40.6309 | 0.6000 | 1.90043 | 37.37 | 0.57668 | 13.2820 | 4.9000 |
| 25 | 18.7196 | 3.0004 | 1.48749 | 70.44 | 0.53062 | 13.1958 | 2.4500 |
| 26 | −151.0864 | 0.1498 | | | | 13.4653 | |
| *27 | 21.3556 | 4.2573 | 1.49710 | 81.56 | 0.53848 | 13.7452 | 3.6400 |
| *28 | −18.0138 | DD[28] | | | | 13.6000 | |
| 29 | 47.8566 | 2.0571 | 1.92286 | 18.90 | 0.64960 | 12.8000 | 3.5800 |
| 30 | −100.1493 | 0.6100 | 1.90043 | 37.37 | 0.57668 | 12.6731 | 4.9000 |
| 31 | 15.9187 | DD[31] | | | | 12.4851 | |
| 32 | −38.9928 | 0.9998 | 1.77250 | 49.62 | 0.55038 | 18.3545 | 4.2800 |
| 33 | 148.2664 | 0.1498 | | | | 19.7754 | |
| 34 | 35.0791 | 3.7842 | 1.71300 | 53.94 | 0.54424 | 21.8767 | 3.8100 |
| 35 | −250.0000 | DD[35] | | | | 22.4550 | |
| 36 | ∞ | 2.8500 | 1.51680 | 64.20 | 0.53430 | 26.9409 | 2.5200 |
| 37 | ∞ | 1.1093 | | | | 27.8622 | |

TABLE 5

| | Example 2 | |
|---|---|---|
| | WIDE | TELE |
| Zr | 1.0 | 11.8 |
| f | 16.49 | 194.14 |
| FNo. | 3.61 | 6.49 |
| 2ω[°] | 87.68 | 8.26 |
| DD[5] | 0.7998 | 57.4514 |
| DD[13] | 27.2569 | 1.2881 |
| DD[28] | 2.0413 | 1.9831 |
| DD[31] | 11.1890 | 9.9484 |
| DD[35] | 8.7479 | 51.5642 |

TABLE 6

| | | Example 2 | | |
|---|---|---|---|---|
| Sn | 6 | 7 | 12 | 13 |
| KA | 1.0000000000E+00 | 9.8798480044E−01 | 1.0000000000E+00 | 1.0000000000E+00 |
| A3 | 0.0000000000E+00 | 0.0000000000E+00 | 0.0000000000E+00 | 0.0000000000E+00 |
| A4 | 5.9084304542E−05 | 6.7235973191E−05 | 2.2432316761E−04 | 1.5463863974E−04 |
| A5 | −5.4446908637E−06 | 3.1895386964E−06 | −8.9866062406E−05 | −9.2403573038E−06 |
| A6 | −3.9017637987E−07 | −3.4359676196E−06 | −2.6630314280E−06 | −3.0311370775E−06 |
| A7 | 5.9669206855E−08 | 5.0353660290E−07 | −2.1924145366E−07 | 2.9578763104E−07 |
| A8 | 1.6074478836E−09 | −1.2014604333E−09 | 2.2040398755E−07 | 2.6570291484E−08 |
| A9 | −5.3075936626E−10 | −5.1445494115E−09 | −3.5142318202E−08 | −4.7381059929E−09 |
| A10 | 3.4295099785E−11 | 2.6368682844E−10 | 1.6093042061E−09 | 1.1458082784E−10 |
| A11 | −1.5566665010E−12 | 1.8863062209E−11 | 2.5170187526E−10 | 2.2292949553E−11 |
| A12 | 8.3027960093E−14 | −2.9659587630E−13 | −4.3285819268E−11 | −2.0044988709E−12 |
| A13 | −6.0363190704E−15 | −2.6003984752E−13 | 1.8566361365E−12 | −1.3686143390E−13 |
| A14 | 3.8956944385E−16 | 3.4533929271E−14 | 1.0856490793E−13 | 3.3744267135E−14 |
| A15 | −1.4284497621E−17 | −1.8842899775E−15 | −1.3103090575E−14 | −2.1640516271E−15 |
| A16 | 2.1446135613E−19 | 3.9582337383E−17 | 3.6007207687E−16 | 4.9229226984E−17 |

| Sn | 15 | 16 | 27 | 28 |
|---|---|---|---|---|
| KA | 1.0000000000E+00 | 1.0000000000E+00 | 1.0000000000E+00 | 1.0000000000E+00 |
| A3 | 0.0000000000E+00 | 0.0000000000E+00 | 0.0000000000E+00 | 0.0000000000E+00 |
| A4 | −2.6882246590E−05 | 5.8554685290E−05 | 6.3452936546E−05 | 3.1626686454E−05 |
| A5 | 5.9776966891E−07 | 2.1886773687E−06 | −2.5218980777E−05 | −1.8644106903E−05 |
| A6 | 1.3344842884E−06 | 1.2881632297E−07 | 9.7524037722E−06 | 6.6087650881E−06 |
| A7 | −4.2218732981E−07 | −7.2414054143E−08 | −2.0479121785E−06 | −1.1845190680E−06 |
| A8 | 4.5945319216E−08 | 1.3219750939E−10 | 2.4598923221E−07 | 4.6469636572E−08 |
| A9 | −2.6789495536E−09 | 1.5049115858E−09 | −2.5955384815E−08 | 3.0396831416E−08 |
| A10 | 2.1820839174E−10 | −4.2111419606E−11 | 7.6088910883E−09 | −7.6515238736E−09 |
| A11 | −3.0809201555E−11 | −5.2332264536E−11 | −2.0151022399E−09 | 7.9706592358E−10 |
| A12 | 4.5934212449E−12 | 6.7441227253E−12 | 2.6152164976E−10 | −3.3997936289E−11 |
| A13 | −1.2232744451E−12 | −2.5574626704E−13 | −9.7746347222E−12 | 9.4485825437E−13 |
| A14 | 1.6140624734E−13 | −2.3472000783E−14 | −1.3679160559E−12 | −2.9276689756E−13 |
| A15 | −1.0133019070E−14 | 2.7398288543E−15 | 1.7118152858E−13 | 3.6978756335E−14 |
| A16 | 2.5038457133E−16 | −8.1478954656E−17 | −5.8182879657E−15 | −1.4161329599E−15 |

Example 3

Figure 8:
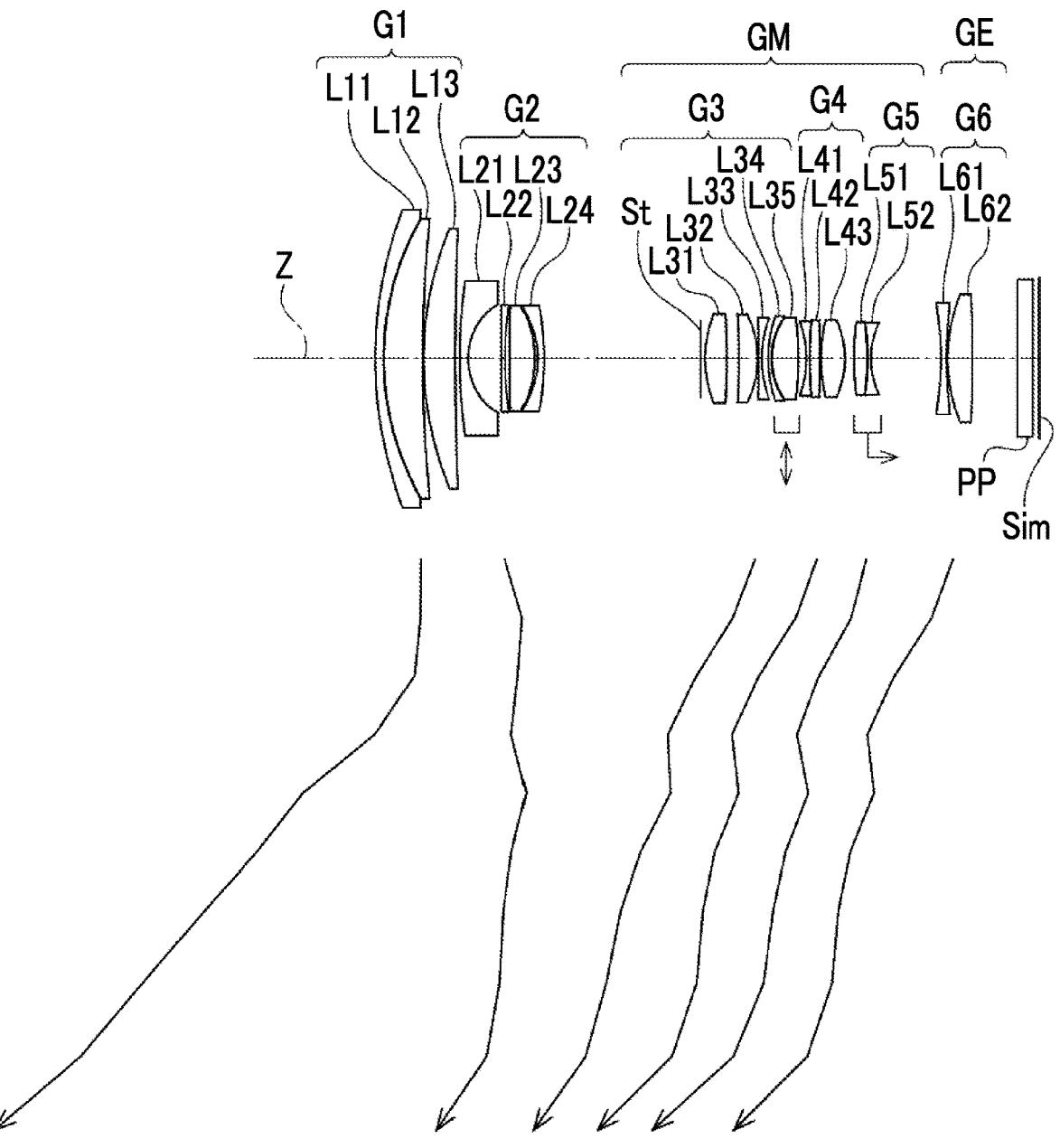
FIG. 8 is a cross-sectional view of a configuration of a zoom lens of Example 3 and a diagram showing movement loci thereof.
Figure 9:
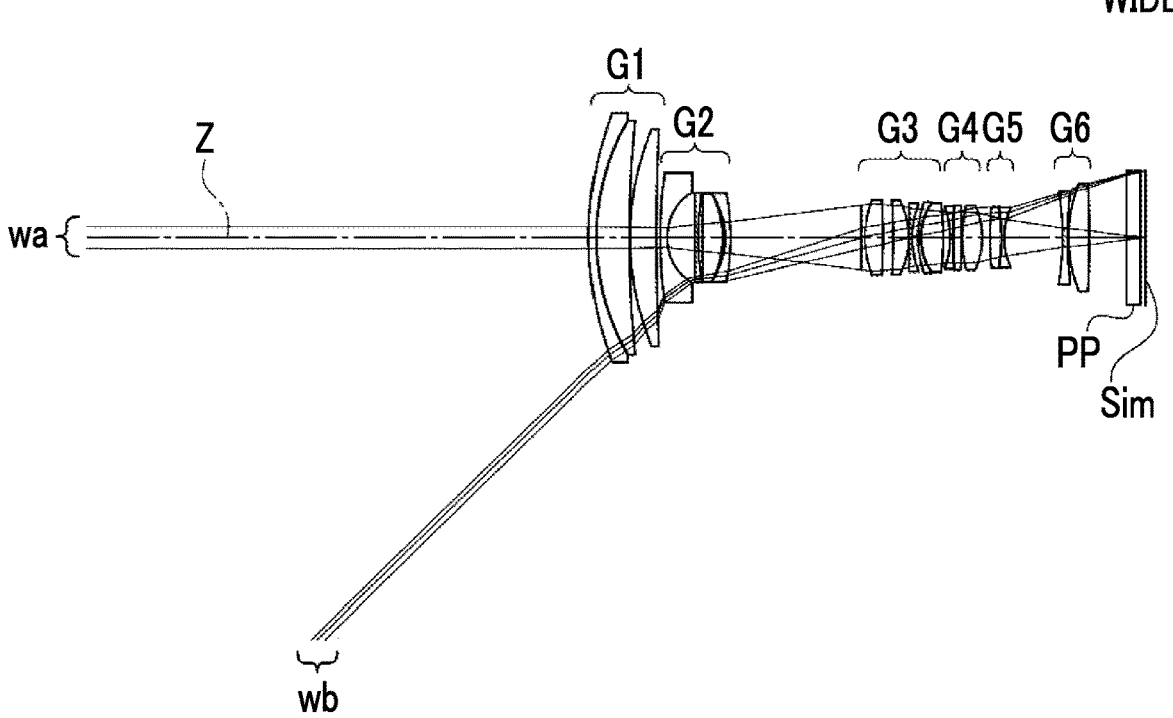
FIG. 9 is a diagram showing a configuration and luminous flux of the zoom lens of Example 3 in each zooming state.
Figure 9:
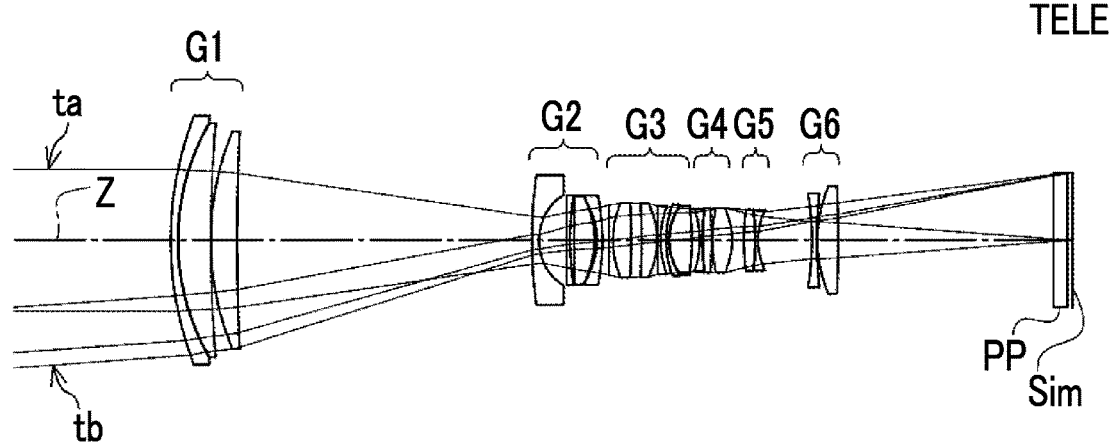

FIG. 8 shows a configuration and movement loci of the zoom lens of Example 3, and FIG. 9 shows a configuration and luminous flux in each zooming state. The zoom lens of Example 3 consists of, in order from the object side to the image side, a first lens group G1 that has a positive refractive power, a second lens group G2 that has a negative refractive power, a third lens group G3 that has a positive refractive power, a fourth lens group G4 that has a positive refractive power, a fifth lens group G5 that has a negative refractive power, and a sixth lens group G6 that has a negative refractive power. The middle group GM consists of the third lens group G3, the fourth lens group G4, and the fifth lens group G5. The final group GE consists of the sixth lens group G6. During zooming from the wide angle end to the telephoto end, the fourth lens group G4 and the sixth lens group G6 move along the optical axis Z on the same movement locus, and the first lens group G1, the second lens group G2, the third lens group G3, the fourth lens group G4, and the fifth lens group G5 move along the optical axis Z by changing the spacing between adjacent lens groups on different movement loci.

The first lens group G1 consists of three lenses L11 to L13, in order from the object side to the image side. The second lens group G2 consists of four lenses L21 to L24, in order from the object side to the image side. The third lens group G3 consists of an aperture stop St and five lenses L31 to L35, in order from the object side to the image side. The fourth lens group G4 consists of three lenses L41 to L43, in order from the object side to the image side. The fifth lens group G5 consists of two lenses L51 and L52, in order from the object side to the image side. The sixth lens group G6 consists of two lenses L61 and L62, in order from the object side to the image side. The focus group consists of the fifth lens group G5. The vibration-proof group consists of two lenses L34 and L35.

Figure 10:
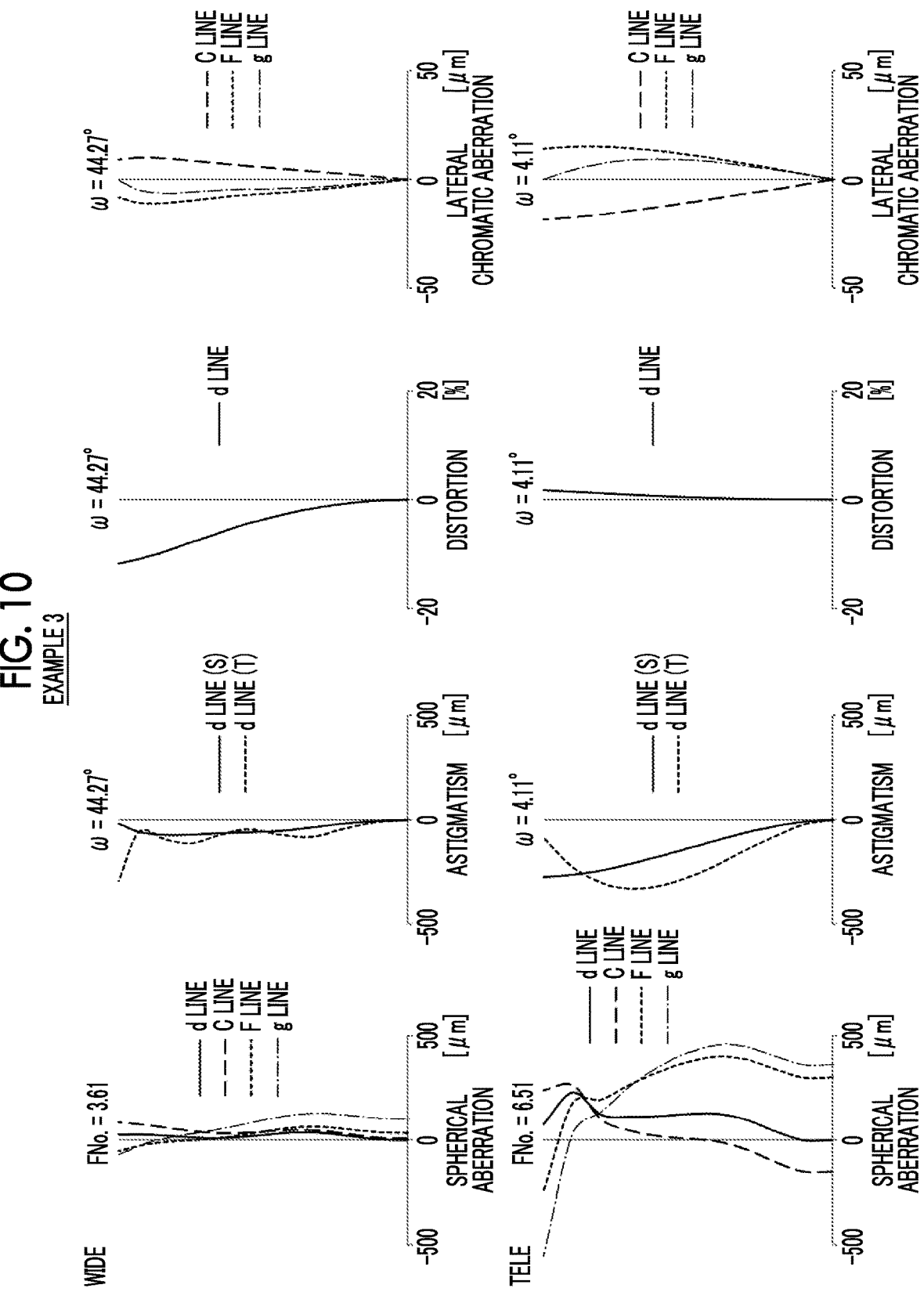
FIG. 10 is a diagram showing aberrations of the zoom lens of Example 3.

Regarding the zoom lens of Example 3, Table 7 shows basic lens data, Table 8 shows specifications and variable surface spacings, and Table 9 shows aspherical coefficients thereof. FIG. 10 shows aberration diagrams.

TABLE 7

| | | | Example 3 | | | | |
|---|---|---|---|---|---|---|---|
| Sn | R | D | Nd | νd | θgF | ED | SG |
| 1 | 72.9414 | 1.5000 | 1.90525 | 35.04 | 0.58486 | 51.4720 | 4.8300 |
| 2 | 49.2858 | 6.9158 | 1.49700 | 81.61 | 0.53887 | 49.1106 | 3.7000 |
| 3 | 249.8202 | 0.1500 | | | | 48.2613 | |
| 4 | 59.4999 | 5.5634 | 1.49700 | 81.61 | 0.53887 | 45.6000 | 3.7000 |
| 5 | 565.7889 | DD[5] | | | | 45.0380 | |
| *6 | 117.2495 | 1.5000 | 1.85135 | 40.10 | 0.56954 | 27.2103 | 5.2500 |
| *7 | 12.1703 | 5.7704 | | | | 18.9534 | |
| 8 | 6948.4527 | 0.7000 | 1.90001 | 24.18 | 0.61784 | 18.7970 | 4.0858 |
| 9 | 56.0778 | 0.8885 | | | | 18.5850 | |
| 10 | 343.8017 | 4.2863 | 1.88308 | 20.85 | 0.62784 | 18.5915 | 3.6058 |
| 11 | −19.6861 | 0.5696 | | | | 18.5716 | |
| *12 | −13.5546 | 1.1000 | 1.79544 | 45.89 | 0.55829 | 18.4000 | 4.4383 |
| *13 | −40.6904 | DD[13] | | | | 18.7008 | |
| 14 (St) | ∞ | 0.8000 | | | | 14.6886 | |
| *15 | 19.2587 | 3.8458 | 1.58313 | 59.38 | 0.54237 | 15.6245 | 3.0500 |
| *16 | −74.4487 | 2.1455 | | | | 15.6570 | |
| 17 | −139.8757 | 3.2868 | 1.51599 | 64.39 | 0.53805 | 15.5259 | 2.6734 |
| 18 | −17.4434 | 0.1498 | | | | 15.5229 | |
| 19 | −1610.0730 | 0.6000 | 1.87435 | 39.36 | 0.57072 | 14.3946 | 4.9203 |
| 20 | 19.5366 | 1.2001 | | | | 13.8398 | |
| 21 | 22.1332 | 0.6000 | 1.92119 | 23.96 | 0.62025 | 14.8865 | 3.8400 |
| 22 | 12.6770 | 4.7362 | 1.67003 | 47.23 | 0.56276 | 14.4384 | 3.4800 |
| 23 | −56.4453 | DD[23] | | | | 14.1974 | |
| 24 | −18.6848 | 0.6000 | 1.83837 | 43.51 | 0.56115 | 12.9088 | 4.7383 |

TABLE 7-continued

| | | | Example 3 | | | | |
|---|---|---|---|---|---|---|---|
| Sn | R | D | Nd | vd | θgF | ED | SG |
| 25 | 79.2400 | 1.8559 | 1.73800 | 32.26 | 0.58963 | 13.2055 | 3.1900 |
| 26 | −108.7247 | 0.1502 | | | | 13.4286 | |
| *27 | 29.0265 | 4.2145 | 1.49710 | 81.56 | 0.53848 | 13.6496 | 3.6400 |
| *28 | −15.2632 | DD[28] | | | | 13.6000 | |
| 29 | 51.8795 | 2.3841 | 1.66382 | 27.35 | 0.63195 | 12.8000 | 2.8900 |
| 30 | −44.7651 | 0.6100 | 1.65160 | 58.54 | 0.53901 | 12.7318 | 3.2400 |
| 31 | 14.9311 | DD[31] | | | | 12.6176 | |
| 32 | −55.9816 | 0.9998 | 1.88099 | 36.07 | 0.58047 | 18.5724 | 4.9315 |
| 33 | 89.4123 | 0.1501 | | | | 19.6552 | |
| 34 | 29.2051 | 4.3649 | 1.51599 | 61.91 | 0.54156 | 21.8601 | 2.6352 |
| 35 | −250.0225 | DD[35] | | | | 22.5961 | |
| 36 | ∞ | 2.8500 | 1.51680 | 64.20 | 0.53430 | 26.8853 | 2.5200 |
| 37 | ∞ | 1.0952 | | | | 27.8471 | |

TABLE 8

| | Example 3 | |
|---|---|---|
| | WIDE | TELE |
| Zr | 1.0 | 11.8 |
| f | 16.49 | 194.13 |
| FNo. | 3.61 | 6.51 |
| 2ω[°] | 88.55 | 8.22 |
| DD[5] | 0.7998 | 61.9849 |
| DD[13] | 27.5695 | 1.4399 |
| DD[23] | 1.4010 | 1.7153 |
| DD[28] | 1.5907 | 2.4652 |
| DD[31] | 12.3479 | 11.4734 |
| DD[35] | 7.9669 | 45.4182 |

TABLE 9

| | | Example 3 | | |
|---|---|---|---|---|
| Sn | 6 | 7 | 12 | 13 |
| KA | 1.0000000000E+00 | 1.0971266803E+00 | 1.0000000000E+00 | 1.0000000000E+00 |
| A3 | 0.0000000000E+00 | 0.0000000000E+00 | 0.0000000000E+00 | 0.0000000000E+00 |
| A4 | 2.5155174768E−05 | 3.2861552012E−05 | 2.1353855142E−04 | 1.4483157368E−04 |
| A5 | −2.7278418076E−06 | 2.2863712719E−06 | −5.2399158211E−06 | −6.1741583373E−06 |
| A6 | −3.8697136765E−07 | −1.9448622095E−06 | −3.9984254367E−06 | −3.5024600960E−06 |
| A7 | 9.9489559954E−08 | 4.5402654111E−08 | 2.7240405977E−07 | 3.1507841138E−07 |
| A8 | −6.7035529408E−09 | 9.4971570160E−08 | 4.8745587992E−08 | 1.8979479177E−08 |
| A9 | −1.1615640854E−11 | −1.6257497839E−08 | 2.4108055469E−09 | −3.0934831425E−09 |
| A10 | 5.1429755945E−11 | 6.7092638938E−10 | −3.1136811175E−09 | 1.5551216898E−10 |
| A11 | −4.9677424090E−12 | 3.7999502580E−11 | 5.1883181229E−10 | −1.0227318476E−11 |
| A12 | −9.8611298407E−14 | 9.4333168920E−12 | −3.0329937455E−11 | −2.9686458420E−13 |
| A13 | 5.3990426289E−14 | −3.2619728759E−12 | −1.7545448515E−12 | 1.7233918105E−13 |
| A14 | −4.3346400701E−15 | 3.5757498957E−13 | 3.9209869569E−13 | −1.8211772034E−14 |
| A15 | 1.5488373117E−16 | −1.8179152262E−14 | −2.3713011126E−14 | 8.8736458641E−16 |
| A16 | −2.1740522369E−18 | 3.6555176317E−16 | 5.1915272509E−16 | −1.7303141652E−17 |

| Sn | 15 | 16 | 27 | 28 |
|---|---|---|---|---|
| KA | 1.0000000000E+00 | 1.0000000000E+00 | 1.0000000000E+00 | 1.0000000000E+00 |
| A3 | 0.0000000000E+00 | 0.0000000000E+00 | 0.0000000000E+00 | 0.0000000000E+00 |
| A4 | −2.4420528939E−05 | 5.5160823570E−05 | 9.1429215953E−06 | 5.6055932657E−05 |
| A5 | −1.5594649584E−06 | 5.9613328000E−07 | −2.6752711897E−05 | −1.5270842111E−05 |
| A6 | 1.9819545479E−06 | 3.3397614359E−07 | 1.2358178110E−05 | 5.8010908625E−06 |
| A7 | −6.1549422399E−07 | −1.0030598435E−07 | −3.6307019494E−06 | −1.0480871621E−06 |
| A8 | 9.0839759608E−08 | −2.4863303787E−09 | 7.7651469854E−07 | 6.7562521936E−08 |
| A9 | −5.0170316419E−09 | 9.4530674816E−09 | −1.1653888334E−07 | 1.6130305655E−09 |
| A10 | −1.1109341401E−09 | −3.0250509444E−09 | 9.3406888355E−09 | 3.3923840669E−09 |
| A11 | 2.1046734960E−10 | 4.3705024186E−10 | 3.6515263016E−10 | −1.3124256764E−09 |
| A12 | 1.9303886041E−11 | −1.9683358965E−11 | −1.6588411153E−10 | 1.3916488323E−10 |
| A13 | −1.0662624192E−11 | −3.8220802099E−12 | 9.6672260373E−12 | 8.4770762148E−12 |
| A14 | 1.4387382052E−12 | 6.9720947258E−13 | 1.0672791071E−12 | −3.2653551984E−12 |
| A15 | −8.8779710355E−14 | −4.6177217236E−14 | −1.6023425549E−13 | 2.8606372118E−13 |
| A16 | 2.1651086332E−15 | 1.1569064662E−15 | 5.8825018608E−15 | −8.8304051883E−15 |

Example 4

Figure 11:
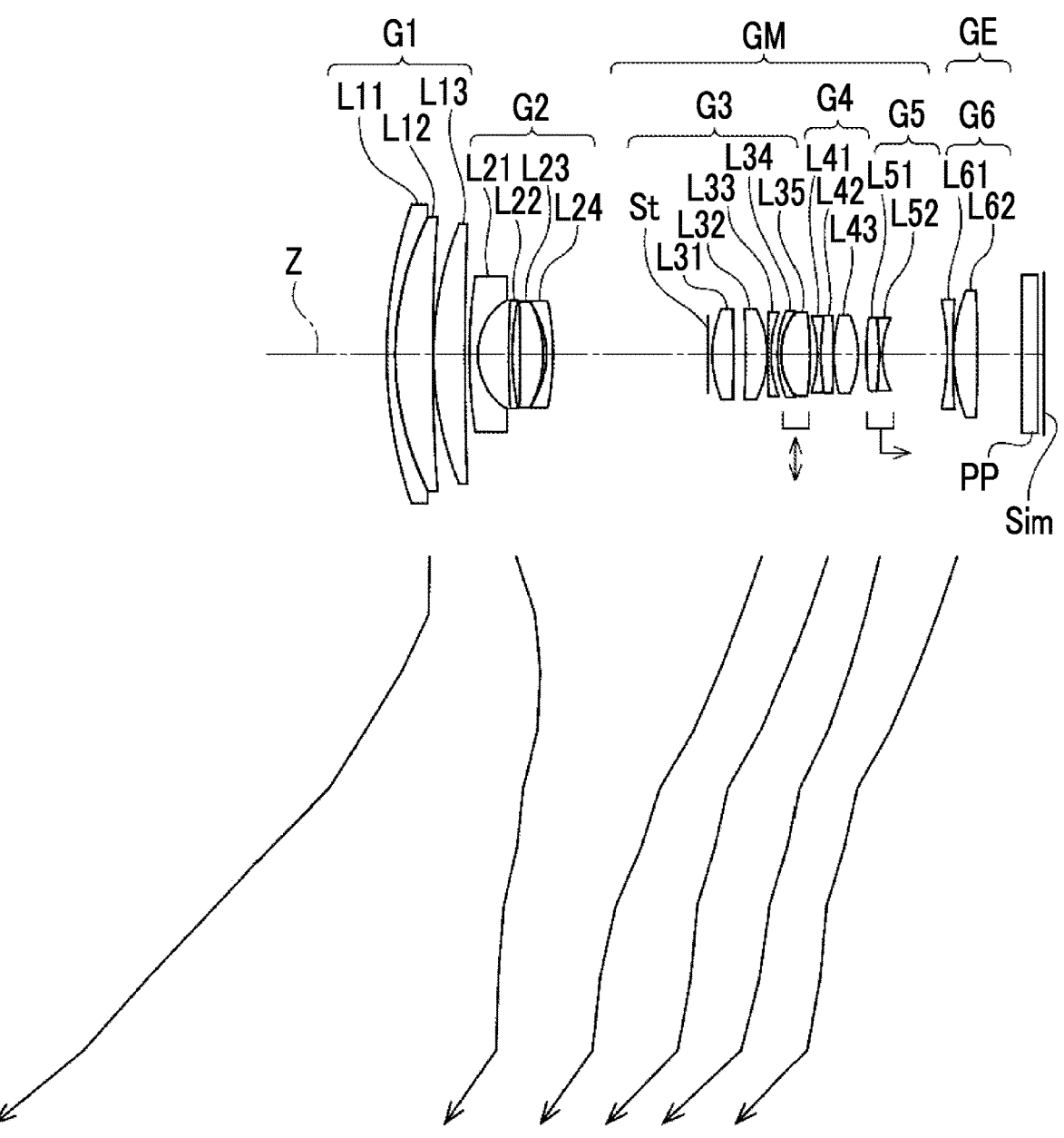
FIG. 11 is a cross-sectional view of a configuration of a zoom lens of Example 4 and a diagram showing movement loci thereof.

FIG. 11 shows a configuration and movement loci of the zoom lens of Example 4. The zoom lens of Example 4 consists of, in order from the object side to the image side, a first lens group G1 that has a positive refractive power, a second lens group G2 that has a negative refractive power, a third lens group G3 that has a positive refractive power, a fourth lens group G4 that has a positive refractive power, a fifth lens group G5 that has a negative refractive power, and a sixth lens group G6 that has a negative refractive power. The middle group GM consists of the third lens group G3, the fourth lens group G4, and the fifth lens group G5. The final lens group GE consists of the sixth lens group G6. During zooming from the wide angle end to the telephoto end, the fourth lens group G4 and the sixth lens group G6 move along the optical axis Z on the same movement locus, and the first lens group G1, the second lens group G2, the third lens group G3, the fourth lens group G4, and the fifth lens group G5 move along the optical axis Z by changing the spacing between adjacent lens groups on different movement loci.

The first lens group G1 consists of three lenses L11 to L13, in order from the object side to the image side. The second lens group G2 consists of four lenses L21 to L24, in order from the object side to the image side. The third lens group G3 consists of an aperture stop St and five lenses L31 to L35, in order from the object side to the image side. The fourth lens group G4 consists of three lenses L41 to L43, in order from the object side to the image side. The fifth lens group G5 consists of two lenses L51 and L52, in order from the object side to the image side. The sixth lens group G6 consists of two lenses L61 and L62, in order from the object side to the image side. The focus group consists of the fifth lens group G5. The vibration-proof group consists of two lenses L34 and L35.

Figure 12:
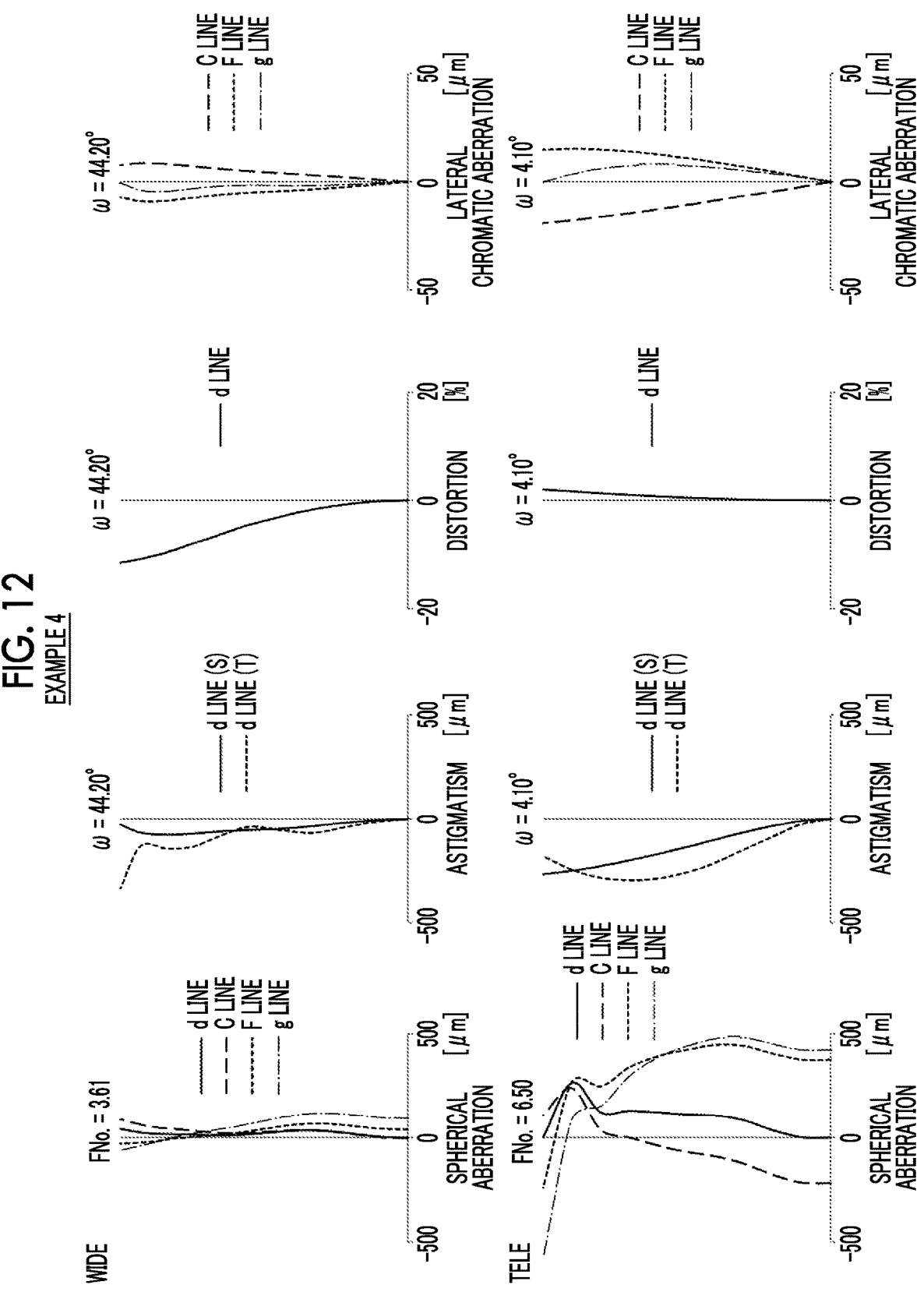
FIG. 12 is a diagram showing aberrations of the zoom lens of Example 4.

Regarding the zoom lens of Example 4, Table 10 shows basic lens data, Table 11 shows specifications and variable surface spacings, and Table 12 shows aspherical coefficients thereof. FIG. 12 shows aberration diagrams.

TABLE 10

Example 4

| Sn | R | D | Nd | vd | θgF | ED | SG |
|---|---|---|---|---|---|---|---|
| 1 | 81.4182 | 1.5000 | 1.90525 | 35.04 | 0.58486 | 51.6560 | 4.8300 |
| 2 | 53.1488 | 6.5656 | 1.49700 | 81.61 | 0.53887 | 48.0211 | 3.7000 |
| 3 | 346.5410 | 0.1500 | | | | 47.4271 | |
| 4 | 60.3642 | 5.4751 | 1.49700 | 81.61 | 0.53887 | 45.6000 | 3.7000 |
| 5 | 627.8865 | DD[5] | | | | 45.0761 | |
| *6 | 94.6332 | 1.5000 | 1.85135 | 40.10 | 0.56954 | 27.2132 | 5.2500 |
| *7 | 12.3505 | 5.4307 | | | | 19.0584 | |
| 8 | 135.1513 | 0.7000 | 1.90001 | 32.78 | 0.59014 | 18.8750 | 4.9729 |
| 9 | 45.8481 | 1.3576 | | | | 18.5789 | |
| 10 | −357.3822 | 4.0818 | 1.85875 | 22.06 | 0.62308 | 18.5630 | 3.6465 |
| 11 | −19.3574 | 0.5855 | | | | 18.5522 | |
| *12 | −13.4243 | 1.1000 | 1.76036 | 51.12 | 0.54851 | 18.4000 | 4.2795 |
| *13 | −40.9147 | DD[13] | | | | 18.7224 | |
| 14 (St) | ∞ | 0.8000 | | | | 14.8485 | |
| *15 | 19.1941 | 3.7607 | 1.58313 | 59.38 | 0.54237 | 15.8197 | 3.0500 |
| *16 | −99.9961 | 2.0810 | | | | 15.8606 | |
| 17 | −152.7439 | 3.7677 | 1.51676 | 64.36 | 0.53812 | 15.8015 | 2.6785 |
| 18 | −17.5693 | 0.1498 | | | | 15.8349 | |
| 19 | 357.9543 | 0.6000 | 1.84328 | 43.64 | 0.56035 | 14.6654 | 4.7436 |
| 20 | 19.1053 | 1.2000 | | | | 14.0811 | |
| 2 | 20.2262 | 0.6000 | 1.92119 | 23.96 | 0.62025 | 15.1122 | 3.8400 |
| 22 | 12.3008 | 4.9185 | 1.62846 | 59.17 | 0.55582 | 14.5984 | 4.0500 |
| 23 | −54.0265 | DD[23] | | | | 14.3379 | |

TABLE 10-continued

Example 4

| Sn | R | D | Nd | vd | θgF | ED | SG |
|---|---|---|---|---|---|---|---|
| 24 | −20.5741 | 0.6000 | 1.78119 | 47.69 | 0.55494 | 13.1538 | 4.3585 |
| 25 | 38.4219 | 2.0977 | 1.65475 | 33.23 | 0.59059 | 13.3544 | 2.7360 |
| 26 | −335.0126 | 0.1498 | | | | 13.5295 | |
| *27 | 23.8255 | 4.2811 | 1.49710 | 81.56 | 0.53848 | 13.7391 | 3.6400 |
| *28 | −16.1971 | DD[28] | | | | 13.6000 | |
| 29 | 52.5612 | 2.1873 | 1.71338 | 26.04 | 0.62965 | 12.8000 | 3.0900 |
| 30 | −56.0030 | 0.6100 | 1.67790 | 55.35 | 0.54339 | 12.7058 | 3.5900 |
| 31 | 14.2118 | DD[31] | | | | 12.5336 | |
| 32 | −42.5401 | 1.0000 | 1.89001 | 38.28 | 0.57306 | 17.9776 | 5.0593 |
| 33 | 162.8451 | 0.1500 | | | | 19.1549 | |
| 34 | 30.2765 | 4.1293 | 1.51599 | 61.93 | 0.54153 | 21.5053 | 2.6354 |
| 35 | −249.9872 | DD[35] | | | | 22.2571 | |
| 36 | ∞ | 2.8500 | 1.51680 | 64.20 | 0.53430 | 26.7842 | 2.5200 |
| 37 | ∞ | 1.0917 | | | | 27.8142 | |

TABLE 11

Example 4

| | WIDE | TELE |
|---|---|---|
| Zr | 1.0 | 11.8 |
| f | 16.49 | 194.09 |
| FNo. | 3.61 | 6.50 |
| 2ω[°] | 88.39 | 8.20 |
| DD[5] | 0.8000 | 63.1552 |
| DD[13] | 27.1362 | 1.4676 |
| DD[23] | 1.2872 | 1.2872 |
| DD[28] | 1.4784 | 2.3529 |
| DD[31] | 11.3651 | 10.4906 |
| DD[35] | 7.8335 | 45.8165 |

TABLE 12

Example 4

| Sn | 6 | 7 | 12 | 13 |
|---|---|---|---|---|
| KA | 1.0000000000E+00 | 1.1023167629E+00 | 1.0000000000E+00 | 1.0000000000E+00 |
| A3 | 0.0000000000E+00 | 0.0000000000E+00 | 0.0000000000E+00 | 0.0000000000E+00 |
| A4 | 1.6673907089E−05 | 2.3438800212E−05 | 2.1026168559E−04 | 1.4221287506E−04 |
| A5 | −4.0777529306E−06 | 3.3854523229E−06 | −6.9010442757E−07 | −7.3799357281E−06 |
| A6 | −1.3547182324E−07 | −3.0200568705E−06 | −8.3885288755E−06 | −3.5489705937E−06 |
| A7 | 7.5293543116E−08 | 4.6488578391E−07 | 1.9764354265E−06 | 3.6025863616E−07 |
| A8 | −2.8726722109E−09 | −7.2135834069E−09 | −2.7735439229E−07 | 8.9119043561E−09 |
| A9 | −1.7836223031E−10 | −4.6507049073E−10 | 1.3182925102E−08 | −9.1888155736E−10 |
| A10 | 1.4802062107E−11 | −9.2540100843E−10 | 5.7450173388E−09 | −1.2761539679E−10 |
| A11 | −1.1337207780E−12 | 2.0195608299E−10 | −1.4086842432E−09 | 1.4161309643E−12 |
| A12 | 8.6192449437E−14 | −1.7390404080E−11 | 1.2070671367E−10 | 1.9687617885E−12 |
| A13 | −2.6592028107E−15 | 6.0246218997E−13 | 2.2726946274E−13 | −2.8364713644E−13 |
| A14 | −3.0579232857E−17 | 2.2527265186E−14 | −8.2040089463E−13 | 1.9919522457E−14 |
| A15 | 4.2337000634E−18 | −2.7031106644E−15 | 5.8555193845E−14 | −7.3984871210E−16 |
| A16 | −8.1712785671E−20 | 6.9202037666E−17 | −1.3772397484E−15 | 1.1647906964E−17 |

| Sn | 15 | 16 | 27 | 28 |
|---|---|---|---|---|
| KA | 1.0000000000E+00 | 1.0000000000E+00 | 1.0000000000E+00 | 1.0000000000E+00 |
| A3 | 0.0000000000E+00 | 0.0000000000E+00 | 0.0000000000E+00 | 0.0000000000E+00 |
| A4 | −2.6150782317E−05 | 5.3915860517E−05 | 5.6364234031E−06 | 5.8573493350E−05 |
| A5 | 1.5155585768E−06 | 2.8021648017E−06 | −2.3409854115E−05 | −1.6012179073E−05 |
| A6 | 1.1954404721E−06 | 7.3380523440E−08 | 8.3063377229E−06 | 6.2224452644E−06 |
| A7 | −4.0884187445E−07 | −1.3503427306E−07 | −1.1405116982E−06 | −1.2753306963E−06 |
| A8 | 4.6118819928E−08 | 2.5518617789E−08 | −1.3526032321E−07 | 1.2275831637E−07 |
| A9 | −4.9955210068E−09 | −3.3704453254E−09 | 8.1996428099E−08 | 1.7031874549E−09 |
| A10 | 1.1791734113E−09 | 4.6135317122E−10 | −1.3388277023E−08 | −2.0627659335E−10 |
| A11 | −2.0156789869E−10 | −5.4305236767E−11 | 9.4733351303E−10 | −4.4272824477E−10 |
| A12 | 1.7295068423E−11 | −8.3774824871E−13 | −7.1693841647E−11 | 8.2886887873E−11 |
| A13 | −8.2933756711E−13 | 8.4332051240E−13 | 2.3150960383E−11 | −2.3275305471E−12 |
| A14 | 9.3992416671E−15 | −9.9473707365E−14 | −4.1002601745E−12 | −7.8790628960E−13 |

TABLE 12-continued

| | Example 4 | | | |
|---|---|---|---|---|
| A15 | 9.7938042297E−16 | 5.3909629178E−15 | 3.2331590852E−13 | 9.0776081290E−14 |
| A16 | −3.5110258541E−17 | −1.1773271996E−16 | 9.7131775235E−15 | −3.0949208516E−15 |

Example 5

Figure 13:
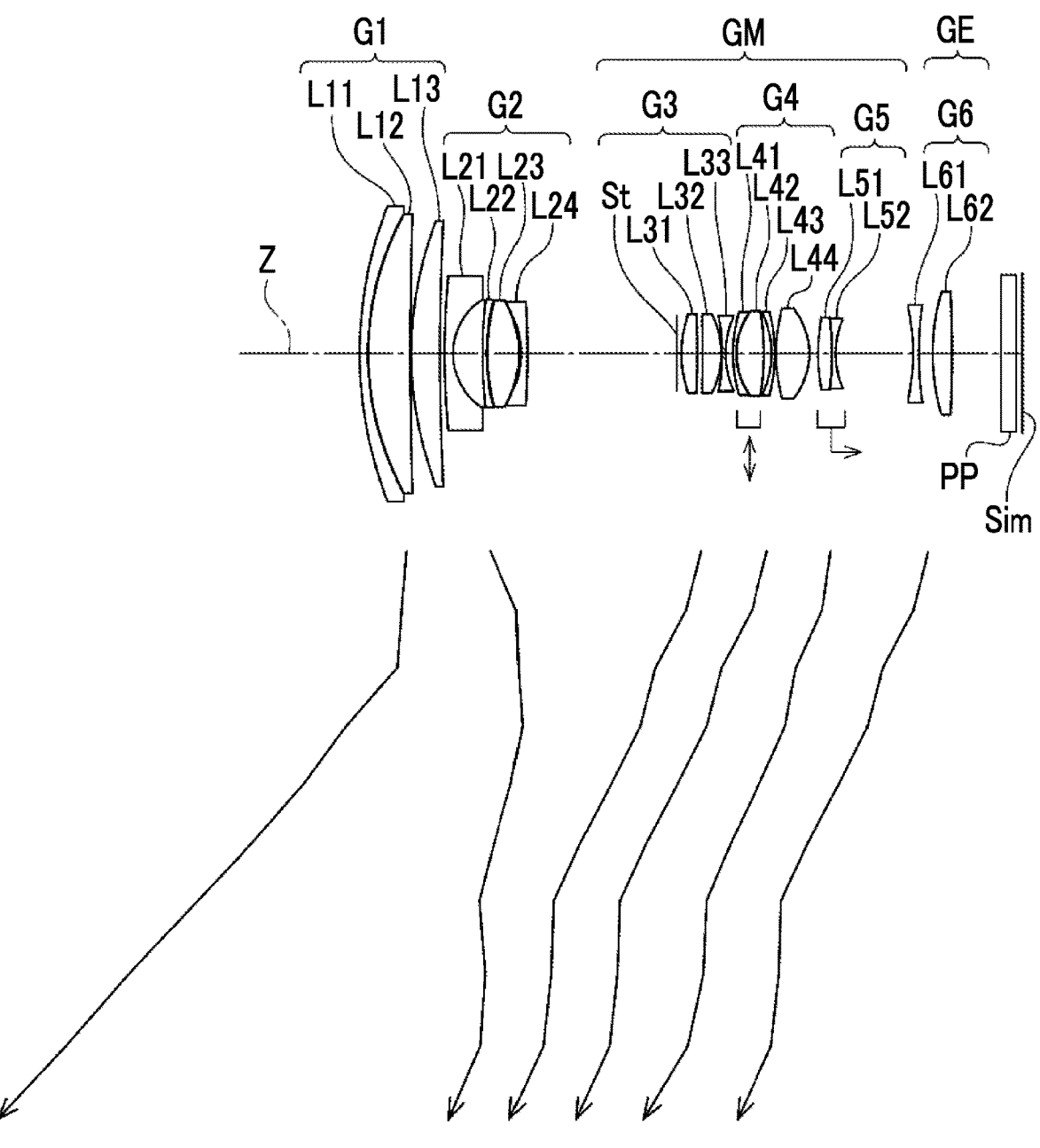
FIG. 13 is a cross-sectional view of a configuration of a zoom lens of Example 5 and a diagram showing movement loci thereof.

FIG. 13 shows a configuration and movement loci of the zoom lens of Example 5. The zoom lens of Example 5 consists of, in order from the object side to the image side, a first lens group G1 that has a positive refractive power, a second lens group G2 that has a negative refractive power, a third lens group G3 that has a negative refractive power, a fourth lens group G4 that has a positive refractive power, a fifth lens group G5 that has a negative refractive power, and a sixth lens group G6 that has a negative refractive power. The middle group GM consists of the third lens group G3, the fourth lens group G4, and the fifth lens group G5. The final lens group GE consists of the sixth lens group G6. During zooming from the wide angle end to the telephoto end, the fourth lens group G4 and the sixth lens group G6 move along the optical axis Z on the same movement locus, and the first lens group G1, the second lens group G2, the third lens group G3, the fourth lens group G4, and the fifth lens group G5 move along the optical axis Z by changing the spacing between adjacent lens groups on different movement loci.

The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of four lenses L41 to L44, in order from the object side to the image side. The fifth lens group G5 consists of two lenses L51 and L52, in order from the object side to the image side. The sixth lens group G6 consists of two lenses L61 and L62, in order from the object side to the image side. The focus group consists of the fifth lens group G5. The vibration-proof group consists of two lenses L41 and L42.

Figure 14:
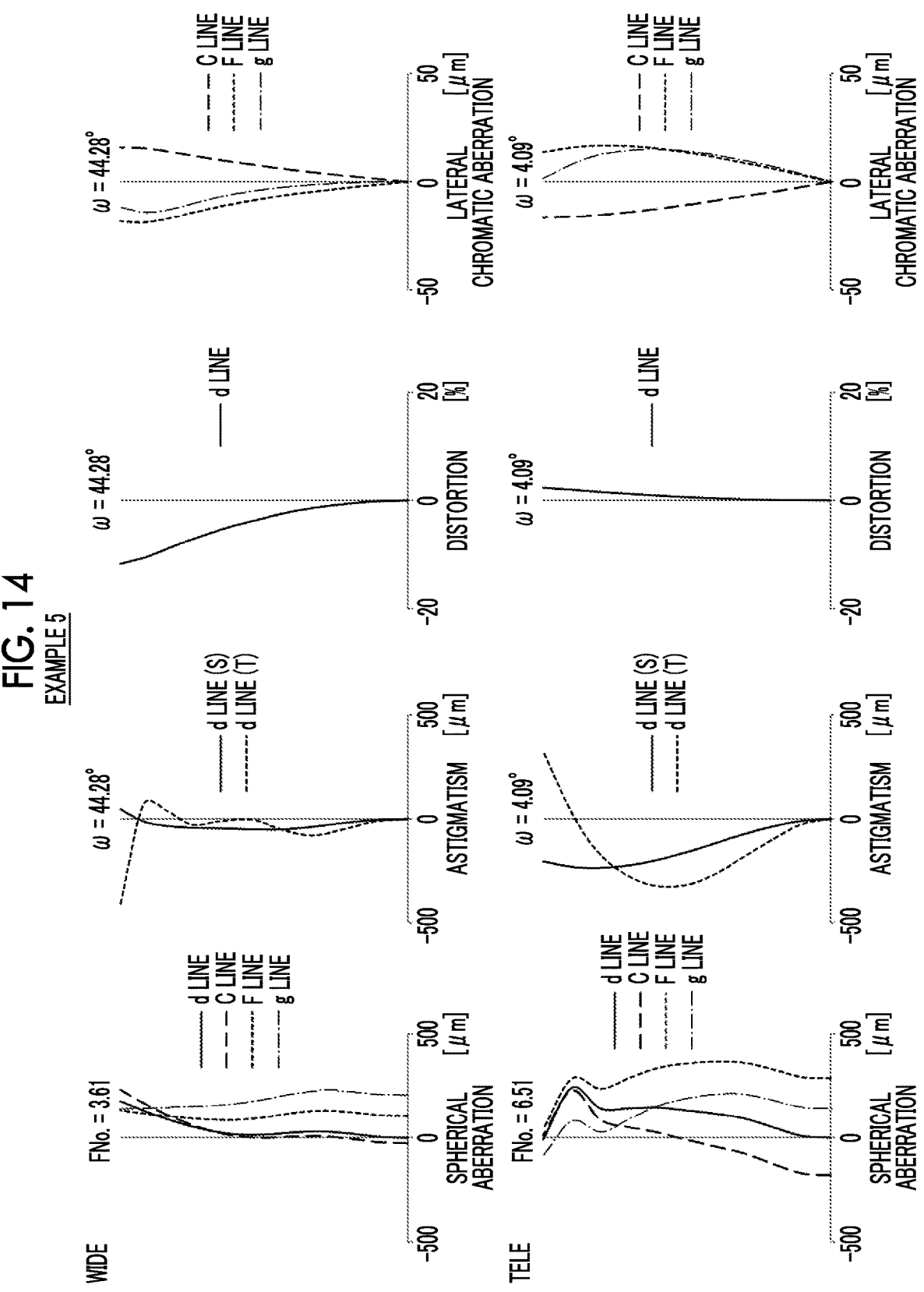
FIG. 14 is a diagram showing aberrations of the zoom lens of Example 5.

Regarding the zoom lens of Example 5, Table 13 shows basic lens data, Table 14 shows specifications and variable surface spacings, and Table 15 shows aspherical coefficients thereof. FIG. 14 shows aberration diagrams.

TABLE 13

| | Example 5 | | | | | | |
|---|---|---|---|---|---|---|---|
| Sn | R | D | Nd | vd | θgF | ED | SG |
| 1 | 72.0742 | 1.5000 | 1.80610 | 33.27 | 0.58845 | 52.4000 | 3.4700 |
| 2 | 51.5587 | 7.5100 | 1.41390 | 100.82 | 0.53373 | 49.5329 | 3.6400 |
| 3 | 846.9726 | 0.1500 | | | | 49.0436 | |
| 4 | 65.0177 | 5.1205 | 1.49700 | 81.61 | 0.53887 | 47.2000 | 3.7000 |
| 5 | 462.1110 | DD[5] | | | | 46.6882 | |
| *6 | 100.7928 | 1.5000 | 1.85135 | 40.10 | 0.56954 | 27.4226 | 5.2500 |

TABLE 13-continued

| | Example 5 | | | | | | |
|---|---|---|---|---|---|---|---|
| Sn | R | D | Nd | vd | θgF | ED | SG |
| *7 | 11.1297 | 5.2795 | | | | 19.1959 | |
| 8 | 94.7101 | 0.7000 | 1.90001 | 37.85 | 0.57381 | 19.1231 | 5.1267 |
| 9 | 38.3341 | 0.1502 | | | | 18.8716 | |
| 10 | 36.9763 | 5.6164 | 1.75575 | 24.71 | 0.62909 | 18.8940 | 3.1900 |
| 11 | −19.5669 | 0.3256 | | | | 18.5613 | |
| *12 | −14.6514 | 1.1000 | 1.80169 | 47.83 | 0.55263 | 18.4000 | 4.4798 |
| *13 | −100.0033 | DD[13] | | | | 18.3356 | |
| 14 (St) | ∞ | 0.8000 | | | | 13.1836 | |
| *15 | 18.7643 | 2.8259 | 1.58313 | 59.38 | 0.54237 | 13.8797 | 3.0500 |
| *16 | −93.0530 | 0.9178 | | | | 13.9597 | |
| 17 | −296.4868 | 3.3816 | 1.54757 | 46.08 | 0.56588 | 13.9711 | 2.4716 |
| 18 | −15.1461 | 0.1498 | | | | 14.0129 | |
| 19 | −32.5785 | 0.6000 | 1.87520 | 40.48 | 0.56721 | 13.2978 | 4.9573 |
| 20 | 16.3053 | DD[20] | | | | 13.0195 | |
| 21 | 26.4620 | 0.6000 | 1.92119 | 23.96 | 0.62025 | 14.5321 | 3.8400 |
| 22 | 12.5501 | 4.9842 | 1.72342 | 37.95 | 0.58370 | 14.5981 | 3.6700 |
| 23 | −47.1727 | 1.3531 | | | | 15.0207 | |
| 24 | −16.7801 | 0.6000 | 1.78461 | 30.36 | 0.59864 | 14.1803 | 3.7815 |
| 25 | −28.7536 | 0.1500 | | | | 14.7586 | |
| *26 | 23.8711 | 5.9999 | 1.49710 | 81.56 | 0.53848 | 15.7236 | 3.6400 |
| *27 | −11.9871 | DD[27] | | | | 16.0000 | |
| 28 | 34.5062 | 2.5023 | 1.84666 | 23.78 | 0.62054 | 12.8000 | 3.5400 |
| 29 | −48.2152 | 0.6000 | 1.88300 | 40.76 | 0.56679 | 12.4814 | 5.5200 |
| 30 | 15.7021 | DD[30] | | | | 12.0345 | |
| 31 | −36.1191 | 1.0000 | 1.90000 | 38.00 | 0.57333 | 16.2494 | 5.1200 |
| 32 | 60.0960 | 2.5002 | | | | 17.2920 | |
| 33 | 39.4944 | 3.4132 | 1.71155 | 55.92 | 0.54269 | 21.4671 | 4.0571 |
| 34 | −250.0101 | DD[34] | | | | 22.0484 | |
| 35 | ∞ | 2.8500 | 1.51680 | 64.20 | 0.53430 | 26.8424 | 2.5200 |
| 36 | ∞ | 1.0932 | | | | 27.8328 | |

TABLE 14

| | Example 5 | |
|---|---|---|
| | WIDE | TELE |
| Zr | 1.0 | 11.8 |
| f | 16.49 | 194.06 |
| FNo. | 3.61 | 6.51 |
| 2ω[°] | 88.55 | 8.17 |
| DD[5] | 0.8000 | 63.7273 |
| DD[13] | 26.5927 | 1.0527 |
| DD[20] | 1.3039 | 1.3116 |
| DD[27] | 1.5593 | 2.1879 |
| DD[30] | 13.7941 | 13.1655 |
| DD[34] | 8.6828 | 41.4431 |

TABLE 15

Example 5

| Sn | 6 | 7 | 12 | 13 |
|---|---|---|---|---|
| KA | 1.0000000000E+00 | 5.4319918210E−01 | 1.0000000000E+00 | 1.0000000000E+00 |
| A3 | 0.0000000000E+00 | 0.0000000000E+00 | 0.0000000000E+00 | 0.0000000000E+00 |
| A4 | −5.1848438877E−05 | −2.4146783536E−05 | 2.2755287832E−04 | 1.6316405151E−04 |
| A5 | 4.4294831171E−05 | 8.4729716617E−06 | −2.1141016693E−05 | −2.0464053262E−05 |
| A6 | −1.3106901695E−07 | −2.4426430953E−06 | −3.9365786171E−06 | −2.9415493986E−06 |
| A7 | 5.8469598245E−09 | 4.2154898944E−07 | 9.9092144252E−07 | 5.6184910457E−07 |
| A8 | 1.9654628558E−09 | −1.4635626600E−08 | −4.8417594019E−08 | 5.6514606742E−08 |
| A9 | −2.8431430690E−10 | −1.5354880914E−09 | −4.1448521989E−09 | −2.6379919993E−08 |
| A10 | 1.9823756334E−12 | −3.5892931051E−11 | 1.1835276130E−09 | 4.6892422170E−09 |
| A11 | 1.5938173905E−12 | 4.6021461081E−11 | −1.9159446347E−10 | −5.5570388718E−10 |
| A12 | −1.1165875241E−13 | −6.3733087953E−12 | 1.4692682219E−11 | 3.6501956637E−11 |
| A13 | 2.2936079360E−16 | 7.2130534641E−13 | 2.2703260407E−13 | −2.3187491928E−13 |
| A14 | 3.4895314237E−16 | −5.3835950000E−14 | −1.2019403132E−13 | −1.4923743923E−13 |
| A15 | −1.7564749685E−17 | 2.2762619924E−15 | 8.0201668555E−15 | 1.0212766598E−14 |
| A16 | 2.8467434750E−19 | −4.1207744904E−17 | −1.8282787798E−16 | −2.2717463043E−16 |

| Sn | 15 | 16 | 26 | 27 |
|---|---|---|---|---|
| KA | 1.0000000000E+00 | 1.0000000000E+00 | 1.0000000000E+00 | 1.0000000000E+00 |
| A3 | 0.0000000000E+00 | 0.0000000000E+00 | 0.0000000000E+00 | 0.0000000000E+00 |
| A4 | −4.6652038019E−05 | 4.4444139597E−05 | −6.0607243087E−05 | 5.7315808621E−05 |
| A5 | −1.3389447451E−05 | −1.1932666602E−05 | −1.3091780659E−05 | −9.1743516728E−06 |
| A6 | 5.4119464361E−06 | 3.6845972909E−06 | 7.5342104586E−06 | 6.6049787138E−06 |
| A7 | −1.4035064114E−06 | −3.3819863511E−07 | −1.7254763769E−06 | −1.8462186665E−06 |
| A8 | 3.5141782870E−07 | 4.3658484050E−08 | 9.9856416618E−08 | 2.3485242069E−07 |
| A9 | −7.3558942118E−08 | −8.9313274841E−09 | 2.8492911990E−08 | −3.7451644668E−09 |
| A10 | 8.1818495837E−09 | −4.0831718360E−10 | −5.0295185743E−09 | −2.5209326544E−09 |
| A11 | −1.6192913006E−10 | 3.4327834384E−10 | −2.1824382806E−11 | 1.7337773264E−10 |
| A12 | −4.6974414635E−11 | −4.1336867716E−11 | 7.8534869534E−11 | 4.7625165125E−11 |
| A13 | −3.1735297358E−12 | −1.1557014526E−12 | −8.0943920877E−12 | −1.1972638173E−11 |
| A14 | 1.6923788677E−12 | 7.1078830090E−13 | 2.1645483184E−13 | 1.2381461891E−12 |
| A15 | −1.6210876134E−13 | 6.3731168248E−14 | 1.2703499200E−14 | −6.4437060402E−14 |
| A16 | 5.2188788073E−15 | 1.9498677040E−15 | −6.9403093837E−16 | 1.3827271418E−15 |

Example 6

Figure 15:
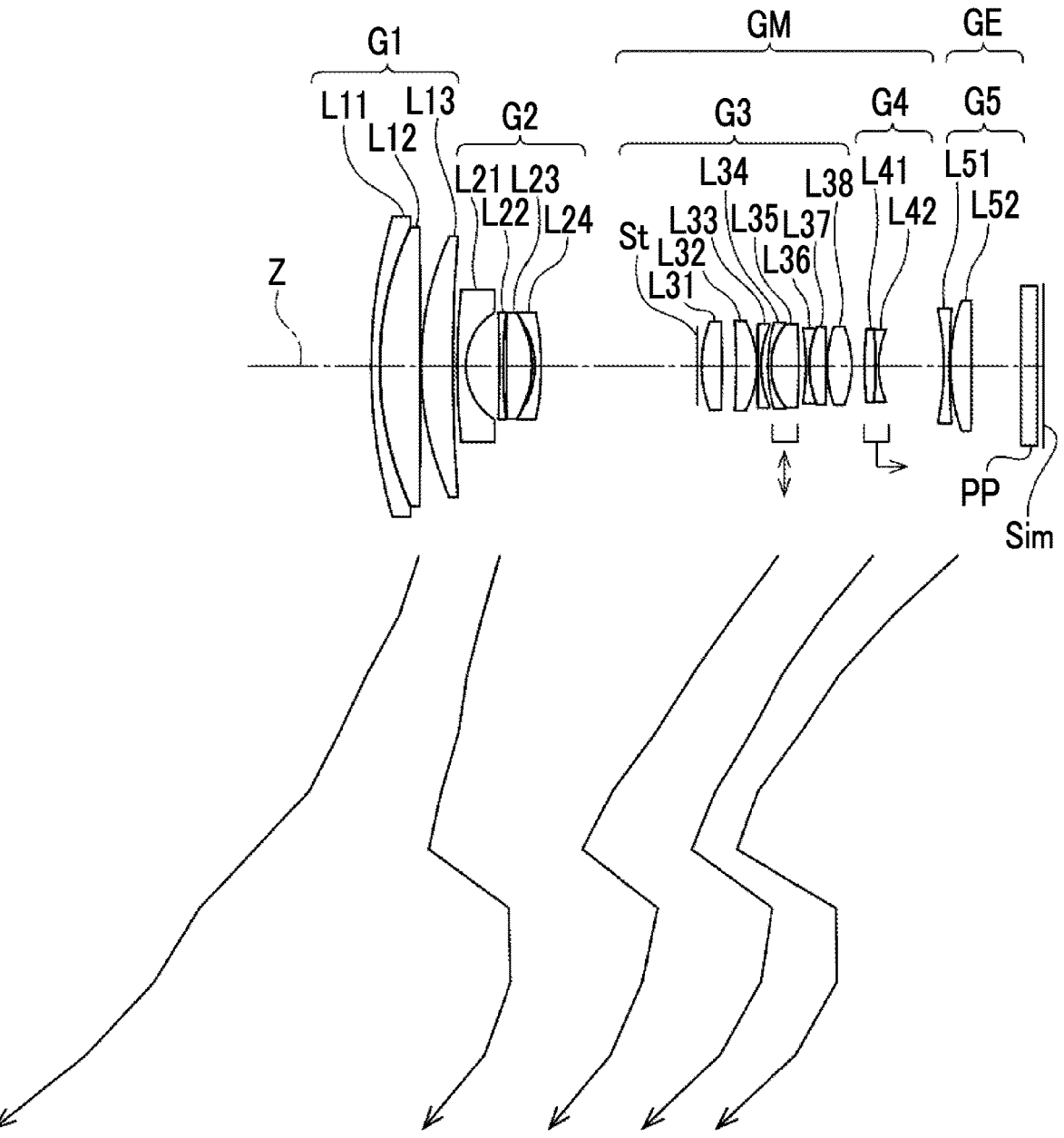
FIG. 15 is a cross-sectional view of a configuration of a zoom lens of Example 6 and a diagram showing movement loci thereof.

FIG. 15 shows a configuration and movement loci of the zoom lens of Example 6. The zoom lens shown in Example 6 consists of, in order from the object side to the image side, a first lens group G1 that has a positive refractive power, a second lens group G2 that has a negative refractive power, a third lens group G3 that has a negative refractive power, a fourth lens group G4 that has a positive refractive power, and a fifth lens group G5 that has a positive refractive power. The middle group GM consists of the third lens group G3 and the fourth lens group G4. The final lens group GE consists of the fifth lens group G5. During zooming from the wide angle end to the telephoto end, the five lens groups move along the optical axis Z by changing the spacing between the five lens groups and adjacent lens groups on different movement loci. The first lens group G1 consists of three lenses L11 to L13, in order from the object side to the image side. The second lens group G2 consists of four lenses L21 to L24, in order from the object side to the image side. The third lens group G3 consists of an aperture stop St and eight lenses L31 to L38, in order from the object side to the image side. The fourth lens group G4 consists of two lenses L41 and L42, in order from the object side to the image side. The fifth lens group G5 consists of two lenses L51 and L52, in order from the object side to the image side. The focus group consists of the fourth lens group G4. The vibration-proof group consists of two lenses L34 and L35.

Figure 16:
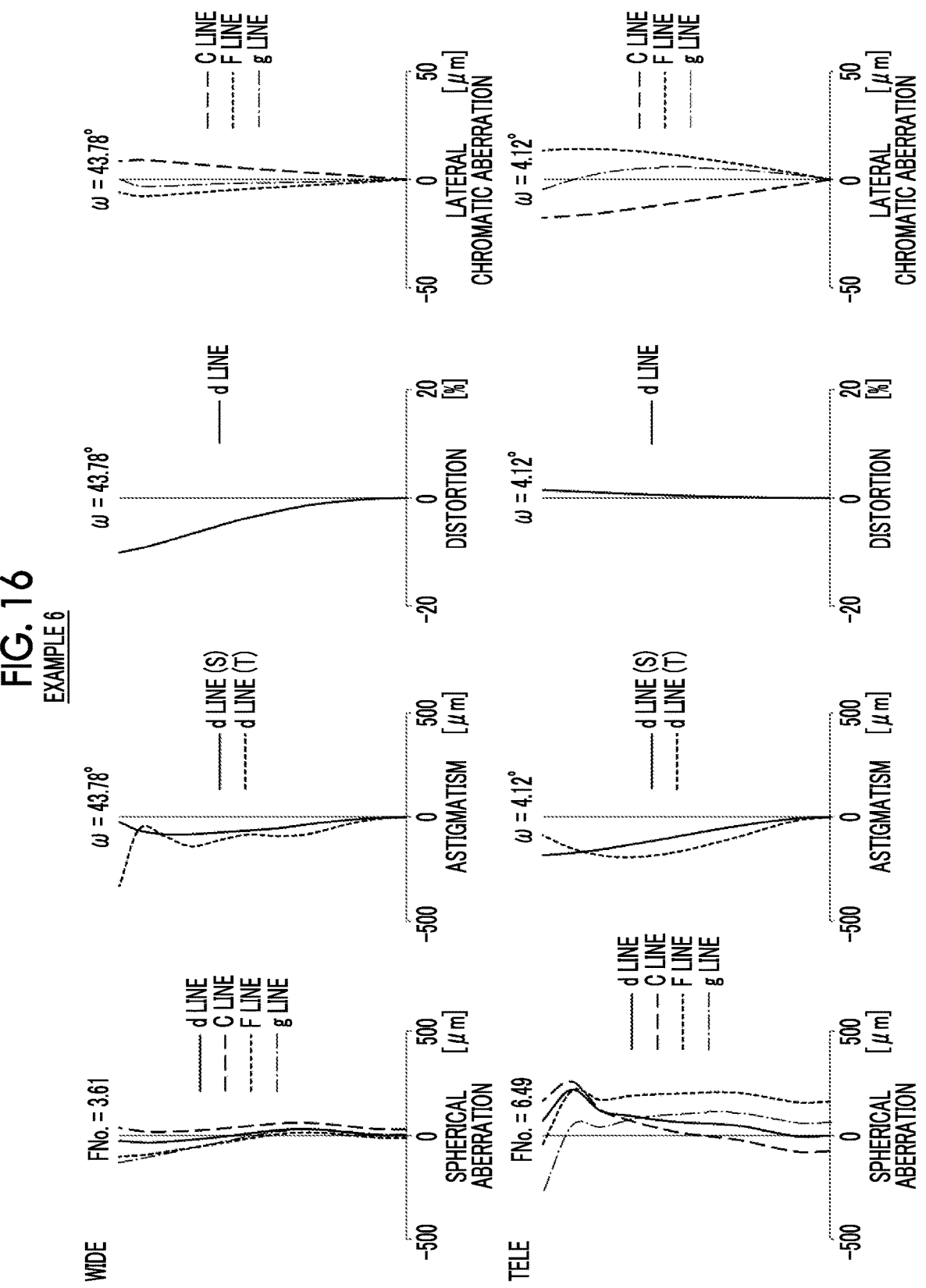
FIG. 16 is a diagram showing aberrations of the zoom lens of Example 6.

Regarding the zoom lens of Example 6, Table 16 shows basic lens data, Table 17 shows specifications and variable surface spacings, and Table 18 shows aspherical coefficients thereof. FIG. 16 shows aberration diagrams.

TABLE 16

Example 6

| Sn | R | D | Nd | vd | θgF | ED | SG |
|---|---|---|---|---|---|---|---|
| 1 | 94.1659 | 1.5000 | 1.91082 | 35.25 | 0.58224 | 51.3918 | 4.9700 |
| 2 | 57.7796 | 7.0852 | 1.49700 | 81.61 | 0.53887 | 48.7981 | 3.7000 |
| 3 | −3224.5689 | 0.1500 | | | | 48.2747 | |
| 4 | 54.7220 | 5.5668 | 1.49700 | 81.61 | 0.53887 | 45.6000 | 3.7000 |
| 5 | 295.6634 | DD[5] | | | | 44.9889 | |
| *6 | 158.1799 | 1.5000 | 1.85135 | 40.10 | 0.56954 | 26.5891 | 5.2500 |
| *7 | 11.8025 | 5.8649 | | | | 18.7526 | |
| 8 | −202.6784 | 0.7000 | 1.89999 | 26.98 | 0.60884 | 18.6157 | 4.4470 |
| 9 | 92.7344 | 0.5417 | | | | 18.5112 | |
| 10 | 303.1618 | 4.3930 | 1.83959 | 23.02 | 0.61954 | 18.5191 | 3.6396 |
| 11 | −18.8208 | 0.5341 | | | | 18.5041 | |
| *12 | −13.0972 | 1.1000 | 1.74793 | 53.21 | 0.54487 | 18.4000 | 4.1936 |
| *13 | −38.5550 | DD[13] | | | | 18.6946 | |
| 14 (St) | ∞ | 0.8000 | | | | 14.4732 | |
| *15 | 20.4266 | 3.5679 | 1.58313 | 59.38 | 0.54237 | 15.3750 | 3.0500 |
| *16 | −90.7823 | 2.4998 | | | | 15.4705 | |
| 17 | −116.6875 | 3.6258 | 1.51617 | 62.07 | 0.54133 | 15.5562 | 2.6369 |
| 18 | −16.6472 | 0.1502 | | | | 15.6892 | |
| 19 | 588.1000 | 0.6000 | 1.73605 | 54.33 | 0.54359 | 14.6298 | 4.1409 |
| 20 | 17.5129 | 1.2000 | | | | 14.0466 | |
| 21 | 24.9730 | 0.6000 | 1.90366 | 31.31 | 0.59481 | 15.0013 | 4.5100 |
| 22 | 11.5034 | 4.9211 | 1.78590 | 44.20 | 0.56317 | 14.5279 | 4.4000 |
| 23 | −96.1897 | 1.2000 | | | | 14.2233 | |
| 24 | −40.2999 | 0.6000 | 1.89961 | 34.46 | 0.58475 | 13.1502 | 5.0395 |
| 25 | 17.4916 | 3.0173 | 1.52522 | 50.27 | 0.55861 | 13.1052 | 2.5033 |
| 26 | −190.9308 | 0.1500 | | | | 13.3930 | |
| *27 | 20.0558 | 4.2819 | 1.49710 | 81.56 | 0.53848 | 13.7281 | 3.6400 |
| *28 | −18.2955 | DD[28] | | | | 13.6000 | |
| 29 | 60.5012 | 1.8516 | 1.95906 | 17.47 | 0.65993 | 12.8000 | 3.5900 |
| 30 | −175.7995 | 0.6100 | 1.88300 | 40.76 | 0.56679 | 12.6923 | 5.5200 |
| 31 | 15.8070 | DD[31] | | | | 12.5271 | |
| 32 | −44.8123 | 1.0002 | 1.78375 | 49.62 | 0.54980 | 18.7846 | 4.3772 |

TABLE 16-continued

Example 6

| Sn | R | D | Nd | vd | θgF | ED | SG |
|----|-----|-----|-----|-----|-----|-----|-----|
| 33 | 152.0513 | 0.1500 | | | | 20.1111 | |
| 34 | 34.4896 | 3.6855 | 1.74859 | 53.14 | 0.54496 | 22.2893 | 4.1968 |
| 35 | −986.8811 | DD[35] | | | | 22.7826 | |
| 36 | ∞ | 2.8500 | 1.51680 | 64.20 | 0.53430 | 27.0003 | 2.5200 |
| 37 | ∞ | 1.1098 | | | | 27.8850 | |

TABLE 17

Example 6

| | WIDE | TELE |
|----|-----|-----|
| Zr | 1.0 | 11.8 |
| f | 16.49 | 194.15 |
| FNo. | 3.61 | 6.49 |
| 2ω[°] | 87.55 | 8.24 |
| DD[5] | 0.8000 | 59.9834 |
| DD[13] | 27.3123 | 1.3139 |
| DD[28] | 2.2660 | 2.0901 |
| DD[31] | 11.4428 | 9.5954 |
| DD[35] | 8.7505 | 49.7256 |

TABLE 18

Example 6

| Sn | 6 | 7 | 12 | 13 |
|----|-----|-----|-----|-----|
| KA | 1.0000000000E+00 | 9.5735483151E−01 | 1.0000000000E+00 | 1.0000000000E+00 |
| A3 | 0.0000000000E+00 | 0.0000000000E+00 | 0.0000000000E+00 | 0.0000000000E+00 |
| A4 | 2.4341277005E−05 | 2.7806951329E−05 | 2.1861788511E−04 | 1.4946392741E−04 |
| A5 | −1.3803282088E−06 | 7.9386989079E−06 | −5.1051463368E−06 | −7.8678193729E−06 |
| A6 | −2.6750735054E−07 | −3.7306944947E−06 | −4.2199291464E−06 | −3.2950628427E−06 |
| A7 | 1.1719336236E−08 | 5.4470216184E−07 | 2.9890355912E−07 | 4.1405057194E−07 |
| A8 | 5.3411140307E−09 | 5.0730455686E−08 | 1.0424959395E−07 | −1.5523050554E−08 |
| A9 | −6.5140835822E−10 | −3.8783928291E−08 | −2.4281095260E−08 | 2.1608043505E−09 |
| A10 | 2.0945241061E−11 | 9.2786065596E−09 | 2.8244381828E−09 | −2.9824544737E−10 |
| A11 | 2.6375061947E−13 | −1.3007248335E−09 | −2.0658756712E−10 | −3.5543579763E−12 |
| A12 | 1.3534568551E−13 | 1.0375217807E−10 | 7.2691909444E−12 | 2.8394740781E−12 |
| A13 | −3.0689750225E−14 | −2.9635413648E−12 | 1.0448200084E−13 | −1.4157673648E−13 |
| A14 | 2.4049996075E−15 | −1.8665990633E−13 | −1.1707817079E−14 | −8.6773270764E−15 |
| A15 | −8.7835449153E−17 | 1.7937378081E−14 | −2.7731172065E−16 | 1.0649593458E−15 |
| A16 | 1.2683148399E−18 | −4.3569257840E−16 | 2.3524490847E−17 | −2.9357583954E−17 |

| Sn | 15 | 16 | 27 | 28 |
|----|-----|-----|-----|-----|
| KA | 1.0000000000E+00 | 1.0000000000E+00 | 1.0000000000E+00 | 1.0000000000E+00 |
| A3 | 0.0000000000E+00 | 0.0000000000E+00 | 0.0000000000E+00 | 0.0000000000E+00 |
| A4 | −2.1295706919E−05 | 6.3419710526E−05 | 2.6986792179E−06 | 3.4173600121E−05 |
| A5 | −1.9737152341E−06 | 8.7777847425E−08 | −2.4913547787E−05 | −1.8793980114E−05 |
| A6 | 1.7102721316E−06 | 6.7865072728E−07 | 9.2706163431E−06 | 6.1646151442E−06 |
| A7 | −3.8279636967E−07 | −1.7192095723E−07 | −1.6773116430E−06 | −9.9772140011E−07 |
| A8 | 2.8876951844E−08 | 2.0799985431E−08 | 4.6502180377E−08 | 2.9134561817E−08 |
| A9 | −9.0471612770E−10 | −1.4444812747E−09 | 4.5654215087E−08 | 1.4950581817E−08 |
| A10 | 2.1447889587E−10 | 4.0371982954E−12 | −9.2550624454E−09 | −1.0639153685E−10 |
| A11 | −4.3316896705E−11 | −8.5686987638E−12 | 4.5080028021E−10 | −7.4173961036E−10 |
| A12 | 1.6949128327E−12 | 3.8168087691E−12 | 8.6020276924E−11 | 9.3924987972E−11 |
| A13 | −6.9258579322E−14 | −1.0354316245E−12 | −1.5072741434E−11 | 7.6021227597E−12 |
| A14 | 1.5130875844E−14 | 1.2853082924E−13 | 8.5564503517E−13 | −2.7277718829E−12 |
| A15 | −1.4917979351E−15 | −7.8038972687E−15 | −5.5502373351E−15 | 2.4083108948E−13 |
| A16 | 4.8130861234E−17 | 1.9017703799E−16 | −8.0551735390E−16 | −7.5021421937E−15 |

Example 7

Figure 17:
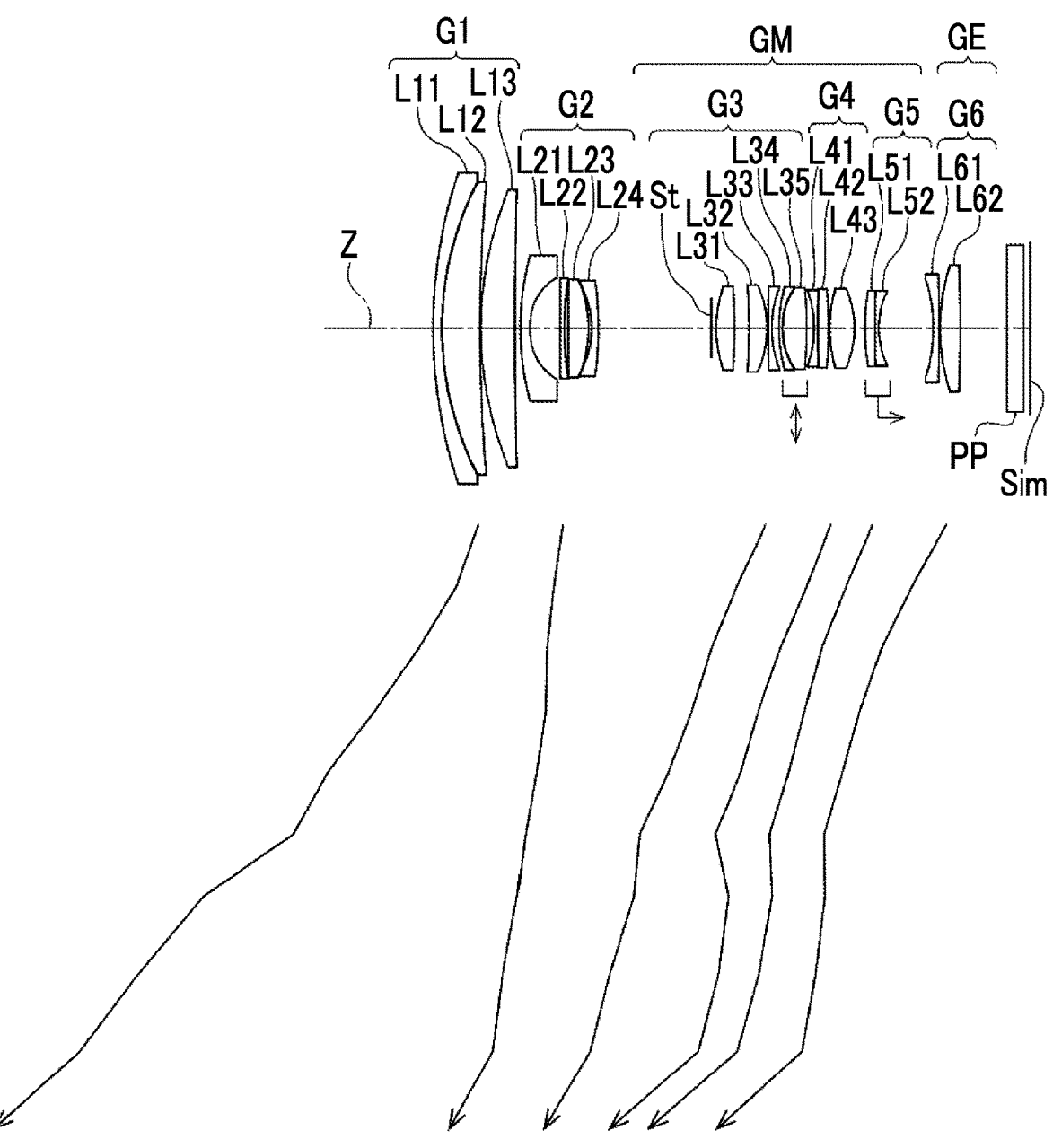
FIG. 17 is a cross-sectional view of a configuration of a zoom lens of Example 7 and a diagram showing movement loci thereof.

FIG. 17 shows a configuration and movement loci of the zoom lens of Example 7. The zoom lens of Example 7 consists of, in order from the object side to the image side, a first lens group G1 that has a positive refractive power, a second lens group G2 that has a negative refractive power, a third lens group G3 that has a positive refractive power, a fourth lens group G4 that has a positive refractive power, a fifth lens group G5 that has a negative refractive power, and a sixth lens group G6 that has a negative refractive power. The middle group GM consists of the third lens group G3, the fourth lens group G4, and the fifth lens group G5. The final lens group GE consists of the sixth lens group G6. During zooming from the wide angle end to the telephoto end, the six lens groups move along the optical axis Z by changing the spacing between the adjacent lens groups on different movement loci.

The first lens group G1 consists of three lenses L11 to L13, in order from the object side to the image side. The second lens group G2 consists of four lenses L21 to L24, in order from the object side to the image side. The third lens group G3 consists of an aperture stop St and five lenses L31 to L35, in order from the object side to the image side. The fourth lens group G4 consists of three lenses L41 to L43, in order from the object side to the image side. The fifth lens group G5 consists of two lenses L51 and L52, in order from the object side to the image side. The sixth lens group G6 consists of two lenses L61 and L62, in order from the object side to the image side. The focus group consists of the fifth lens group G5. The vibration-proof group consists of two lenses L34 and L35.

Figure 18:
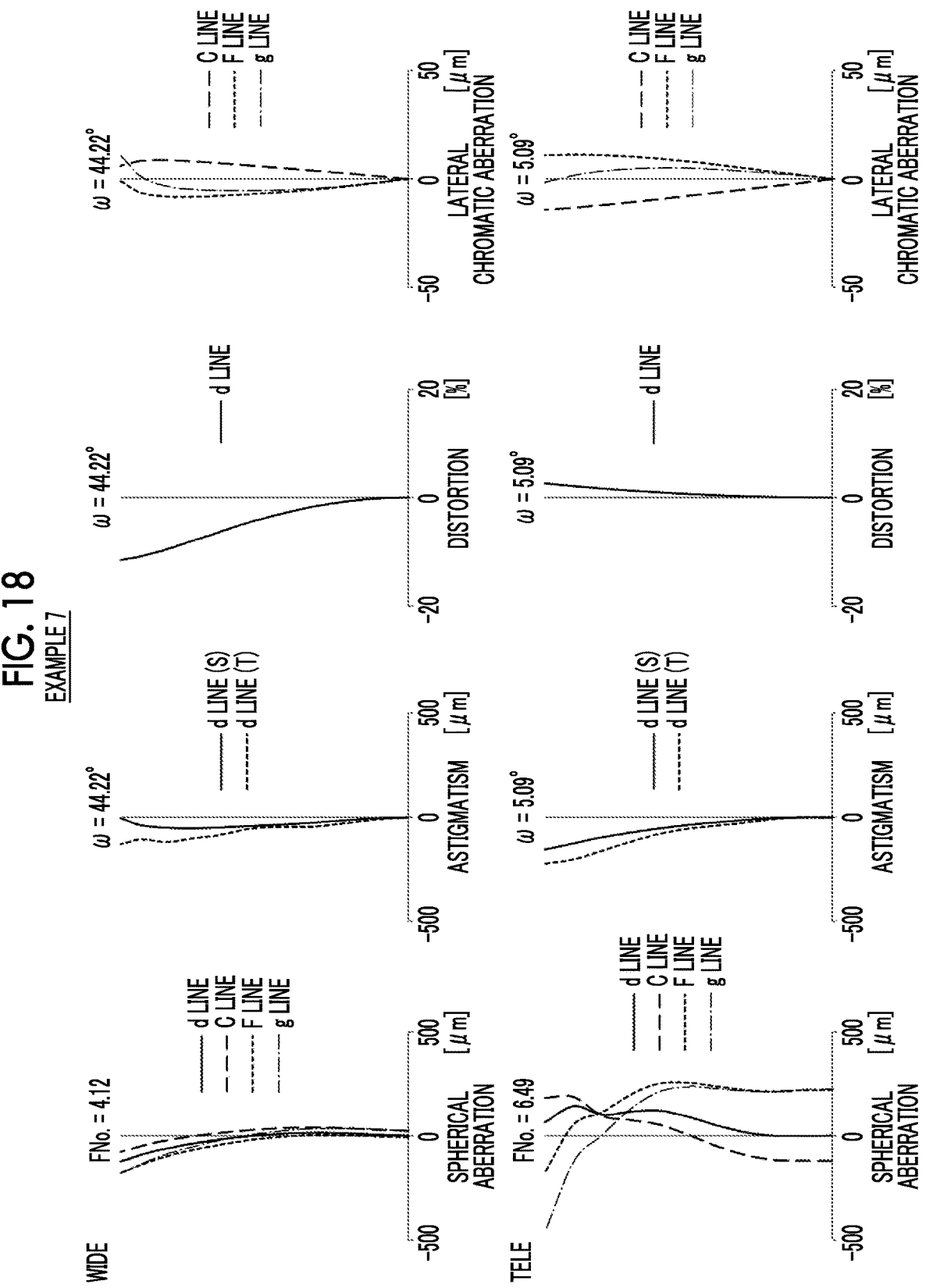
FIG. 18 is a diagram showing aberrations of the zoom lens of Example 7.

Regarding the zoom lens of Example 7, Table 19 shows basic lens data, Table 20 shows specifications and variable surface spacings, and Table 21 shows aspherical coefficients thereof. FIG. 18 shows aberration diagrams.

TABLE 19

Example 7

| Sn | R | D | Nd | vd | θgF | ED | SG |
|---|---|---|---|---|---|---|---|
| 1 | 81.4385 | 1.5000 | 1.91082 | 35.25 | 0.58224 | 50.6656 | 4.9700 |
| 2 | 52.8569 | 6.2896 | 1.49700 | 81.61 | 0.53887 | 48.4836 | 3.7000 |
| 3 | 279.2706 | 0.1500 | | | | 47.9201 | |
| 4 | 59.4033 | 5.7384 | 1.49700 | 81.61 | 0.53887 | 46.0000 | 3.7000 |
| 5 | 767.2622 | DD[5] | | | | 45.4351 | |
| *6 | 56.9362 | 1.5000 | 1.85135 | 40.10 | 0.56954 | 24.2222 | 5.2500 |
| *7 | 11.6230 | 5.0801 | | | | 16.9747 | |
| 8 | 2037.1184 | 0.7000 | 1.87259 | 40.01 | 0.56884 | 16.7144 | 4.9067 |
| 9 | 57.8320 | 0.6248 | | | | 16.3636 | |
| 10 | 636.7919 | 3.3575 | 1.87479 | 21.30 | 0.62606 | 16.3378 | 3.6264 |
| 11 | −20.4663 | 0.5407 | | | | 16.0802 | |
| *12 | −13.8377 | 1.1000 | 1.77422 | 50.38 | 0.54888 | 16.0000 | 4.3317 |
| *13 | −58.4193 | DD[13] | | | | 15.8333 | |
| 14 (St) | ∞ | 0.8000 | | | | 12.5830 | |
| *15 | 19.5147 | 3.0301 | 1.58313 | 59.38 | 0.54237 | 13.7205 | 3.0500 |
| *16 | −72.8459 | 2.4056 | | | | 13.9493 | |
| 17 | −104.3885 | 3.1108 | 1.52236 | 63.78 | 0.53913 | 14.2779 | 2.7103 |
| 18 | −16.2606 | 0.1498 | | | | 14.5046 | |
| 19 | 371.4017 | 0.6000 | 1.76091 | 43.52 | 0.56676 | 13.8795 | 4.0570 |
| 20 | 18.7517 | 1.1998 | | | | 13.5210 | |
| 21 | 24.5742 | 0.6000 | 1.85896 | 22.73 | 0.62844 | 13.7405 | 3.7100 |
| 22 | 12.6026 | 4.0125 | 1.69350 | 50.81 | 0.55471 | 13.5153 | 4.0300 |
| 23 | −83.1822 | DD[23] | | | | 13.4529 | |
| 24 | −19.4206 | 0.6000 | 1.74922 | 46.08 | 0.56146 | 12.5349 | 4.0054 |
| 25 | 116.3440 | 1.8189 | 1.64126 | 37.69 | 0.58205 | 12.8193 | 2.7960 |
| 26 | −80.5555 | 0.1946 | | | | 13.0563 | |
| *27 | 22.4185 | 4.1115 | 1.49710 | 81.56 | 0.53848 | 13.3098 | 3.6400 |
| *28 | −15.8140 | DD[28] | | | | 13.2000 | |

TABLE 19-continued

Example 7

| Sn | R | D | Nd | vd | θgF | ED | SG |
|---|---|---|---|---|---|---|---|
| 29 | 40.9176 | 1.6619 | 1.95906 | 17.47 | 0.65993 | 12.6000 | 3.5900 |
| 30 | 581.9000 | 0.6100 | 1.83481 | 42.74 | 0.56490 | 12.4752 | 4.5800 |
| 31 | 14.2331 | DD[31] | | | | 12.2644 | |
| 32 | −27.2632 | 0.9998 | 1.81973 | 40.40 | 0.57116 | 16.5557 | 4.4336 |
| 33 | −379.9328 | 0.1498 | | | | 17.9913 | |
| 34 | 34.6354 | 3.3607 | 1.54121 | 62.51 | 0.54135 | 20.3240 | 2.8596 |
| 35 | −249.9781 | DD[35] | | | | 21.0623 | |
| 36 | ∞ | 2.8500 | 1.51680 | 64.20 | 0.53430 | 26.4248 | 2.5200 |
| 37 | ∞ | 1.1117 | | | | 27.6556 | |

TABLE 20

Example 7

| | WIDE | TELE |
|---|---|---|
| Zr | 1.0 | 9.4 |
| f | 16.49 | 155.30 |
| FNo. | 4.12 | 6.49 |
| 2ω[°] | 88.43 | 10.18 |
| DD[5] | 0.7998 | 60.4504 |
| DD[13] | 18.7487 | 1.3423 |
| DD[23] | 1.2011 | 1.2011 |
| DD[28] | 1.7452 | 1.2910 |
| DD[31] | 9.0374 | 8.1920 |
| DD[35] | 7.7118 | 44.6273 |

TABLE 21

Example 7

| Sn | 6 | 7 | 12 | 13 |
|---|---|---|---|---|
| KA | 1.0000000000E+00 | 1.2239737962E+00 | 1.0000000000E+00 | 1.0000000000E+00 |
| A3 | 0.0000000000E+00 | 0.0000000000E+00 | 0.0000000000E+00 | 0.0000000000E+00 |
| A4 | 3.3135649053E−05 | 4.8453941375E−05 | 1.2061483257E−04 | 4.0346129036E−05 |
| A5 | −1.5034658675E−06 | 4.1859657710E−06 | 2.4059429797E−06 | 3.7470005583E−06 |
| A6 | −6.8229747397E−07 | −2.8067805153E−06 | −3.6328175344E−06 | −3.5299496573E−06 |
| A7 | 1.7128359614E−07 | 4.1300304416E−07 | 4.9961526917E−07 | 5.4907814582E−07 |
| A8 | −1.7534830662E−08 | 6.9767708636E−08 | −1.2644609337E−08 | −9.9689555176E−08 |
| A9 | 1.4808831548E−09 | −2.3910093829E−08 | 5.9658022393E−09 | 2.4427828349E−08 |
| A10 | −1.3338111787E−10 | 2.3761833978E−09 | −2.1159321062E−09 | −3.2290263740E−09 |
| A11 | 9.1814583120E−12 | 5.4611479995E−11 | 2.6135113876E−10 | 1.3614441342E−10 |
| A12 | −8.0670107387E−13 | −3.9761092238E−11 | −4.2653238288E−12 | 1.3398358293E−11 |
| A13 | 9.1183139318E−14 | 5.4056767411E−12 | −3.0550353078E−12 | −1.9126590803E−12 |
| A14 | −6.7522806173E−15 | −3.7922683804E−13 | 4.2525356472E−13 | 4.3521345115E−14 |
| A15 | 2.6253647684E−16 | 1.4073776144E−14 | −2.4819480126E−14 | 4.5653306497E−15 |
| A16 | −4.1547742725E−18 | −2.1814520742E−16 | 5.6685209418E−16 | −2.2281244338E−16 |

| Sn | 15 | 16 | 27 | 28 |
|---|---|---|---|---|
| KA | 1.0000000000E+00 | 1.0000000000E+00 | 1.0000000000E+00 | 1.0000000000E+00 |
| A3 | 0.0000000000E+00 | 0.0000000000E+00 | 0.0000000000E+00 | 0.0000000000E+00 |
| A4 | −4.4208832988E−05 | 5.4586880924E−05 | −8.6079141546E−06 | 7.7575206747E−05 |
| A5 | 5.1328159662E−06 | 2.5141850610E−07 | −2.1736448993E−05 | −3.1394396916E−05 |
| A6 | 4.9543293809E−07 | 1.6370692517E−06 | 1.0600118239E−05 | 1.8865167180E−05 |
| A7 | −3.8740930480E−07 | −4.3745585635E−07 | −3.1851573622E−06 | −5.4224114555E−06 |
| A8 | 3.7933759029E−08 | 2.4897639485E−08 | 5.9959693046E−07 | −4.0833556688E−07 |
| A9 | −4.1531661321E−10 | 1.5993939614E−09 | −5.9673095466E−08 | 8.2788927659E−07 |
| A10 | 3.2370989350E−10 | 4.0661138261E−10 | −5.9848866028E−10 | −2.2570408096E−07 |
| A11 | −9.8355543652E−11 | −1.7519178143E−10 | 6.9562518850E−10 | 1.0058546355E−09 |
| A12 | −2.7561497575E−12 | 1.1211506170E−11 | 9.9665044847E−11 | 1.3309397187E−08 |
| A13 | 2.7350064849E−12 | 1.5848085889E−12 | −5.8342372976E−11 | −3.4878708268E−09 |
| A14 | −3.9190323079E−13 | −3.6754790074E−13 | 9.1727830672E−12 | 4.3511006437E−10 |
| A15 | 2.5553126502E−14 | 2.8007609706E−14 | −6.6346930465E−13 | −2.7947719521E−11 |
| A16 | −6.6426228710E−16 | −7.9232961246E−16 | 1.8984452644E−14 | 7.4378804500E−13 |

Example 8

Figure 19:
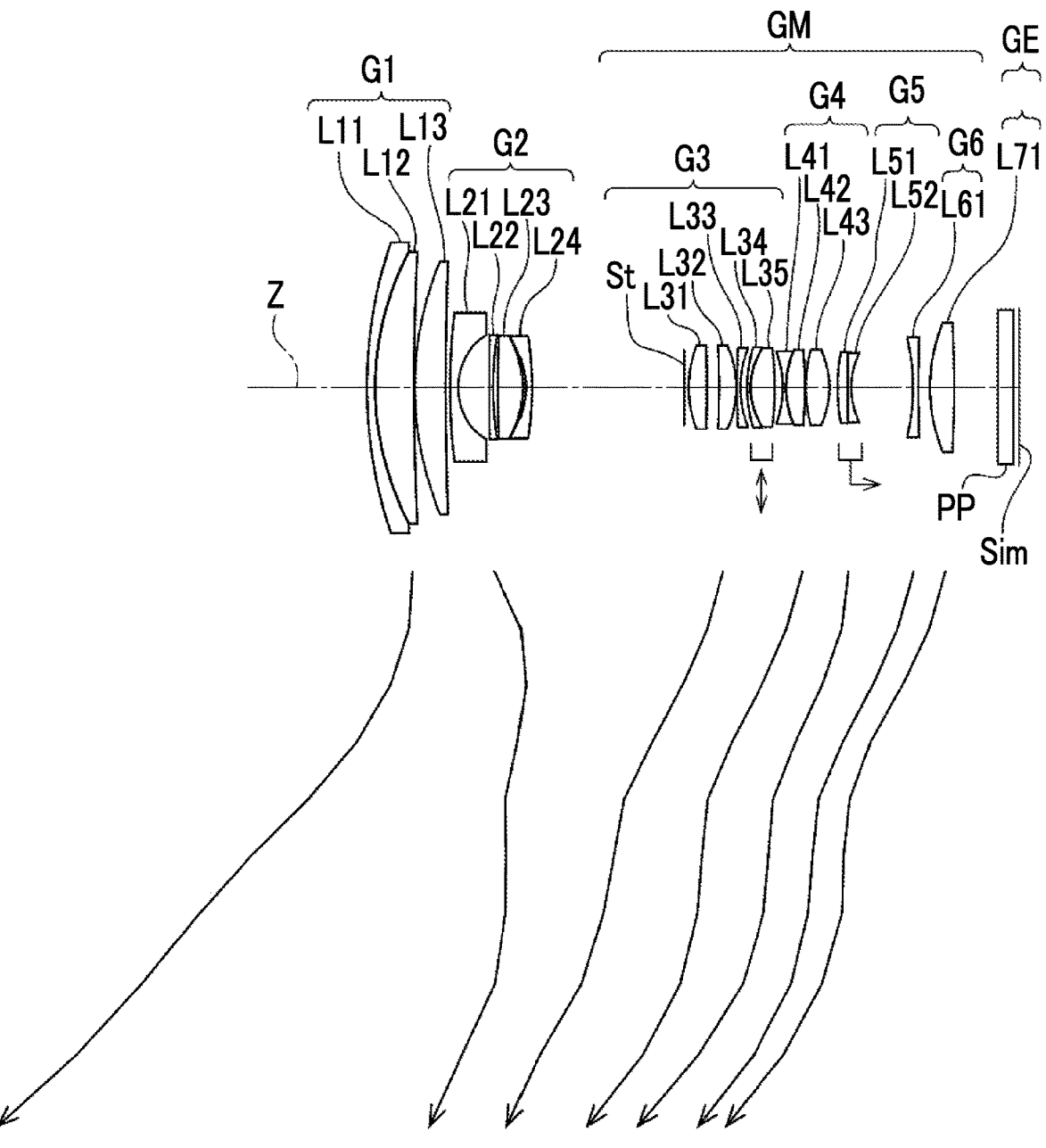
FIG. 19 is a cross-sectional view of a configuration of a zoom lens of Example 8 and a diagram showing movement loci thereof.
Figure 20:
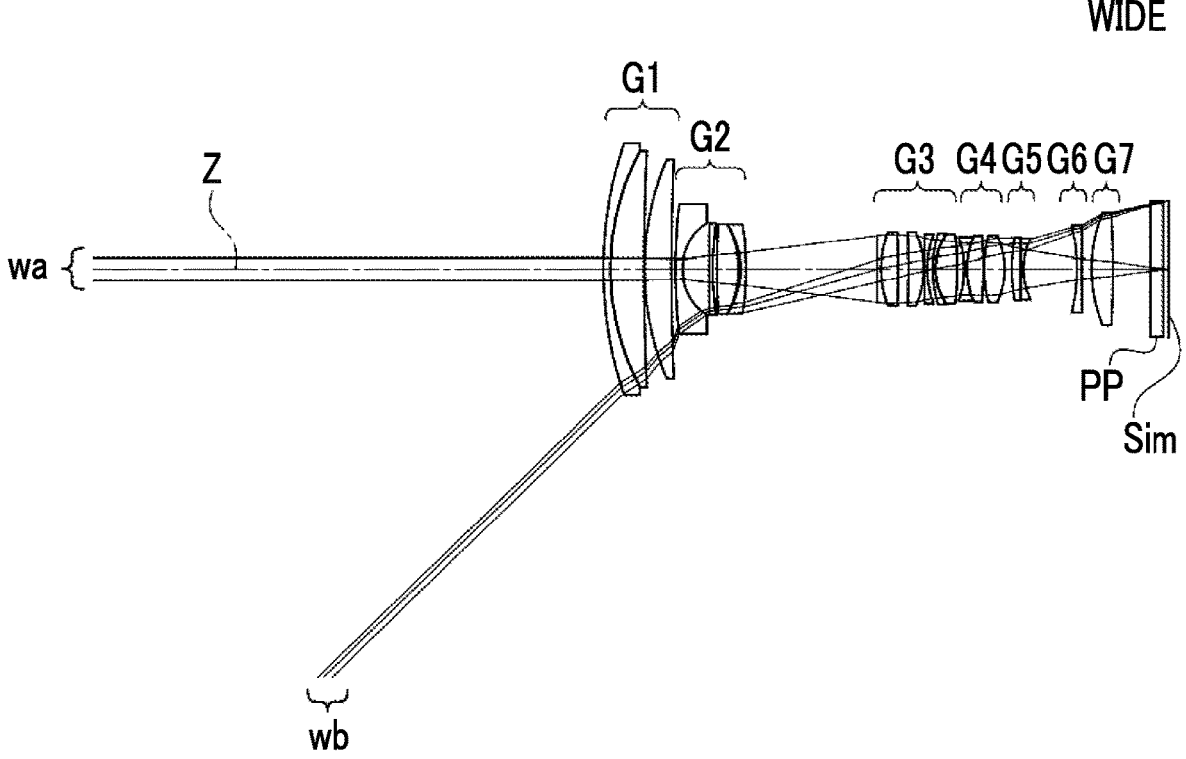
FIG. 20 is a diagram showing a configuration and luminous flux of the zoom lens of Example 8 in each zooming state.
Figure 20:
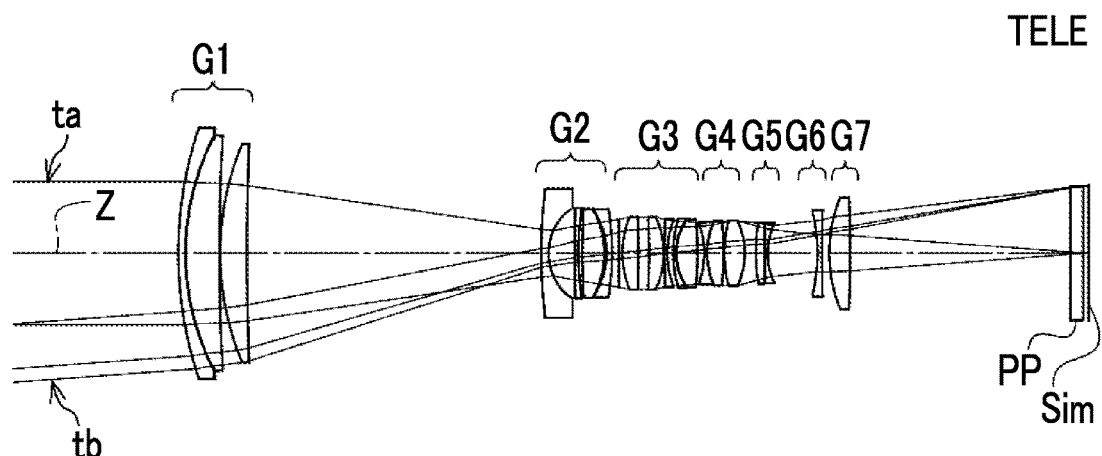

FIG. 19 shows a configuration and movement loci of the zoom lens of Example 8, and FIG. 20 shows a configuration and luminous flux in each zooming state. The zoom lens of Example 8 consists of, in order from the object side to the image side, a first lens group G1 that has a positive refractive power, a second lens group G2 that has a negative refractive power, a third lens group G3 that has a positive refractive power, a fourth lens group G4 that has a positive refractive power, a fifth lens group G5 that has a negative refractive power, a sixth lens group G6 that has a negative refractive power, and a seventh lens group G7 that has a positive refractive power. The middle group GM consists of the third lens group G3, the fourth lens group G4, the fifth lens group G5, and the sixth lens group G6. The final lens group GE consists of the seventh lens group G7. During zooming from the wide angle end to the telephoto end, the fourth lens group G4 and the sixth lens group G6 move along the optical axis Z on the same movement locus, and the first lens group G1, the second lens group G2, the third lens group G3, the fourth lens group G4, the fifth lens group G5, and the seventh lens group G7 move along the optical axis Z by changing the spacing between adjacent lens groups on different movement loci.

The first lens group G1 consists of three lenses L11 to L13, in order from the object side to the image side. The second lens group G2 consists of four lenses L21 to L24, in order from the object side to the image side. The third lens group G3 consists of an aperture stop St and five lenses L31 to L35, in order from the object side to the image side. The fourth lens group G4 consists of three lenses L41 to L43, in order from the object side to the image side. The fifth lens group G5 consists of two lenses L51 and L52, in order from the object side to the image side. The sixth lens group G6 consists of one lens L61. The seventh lens group G7 consists of one lens L71. The focus group consists of the fifth lens group G5. The vibration-proof group consists of two lenses L34 and L35.

Figure 21:
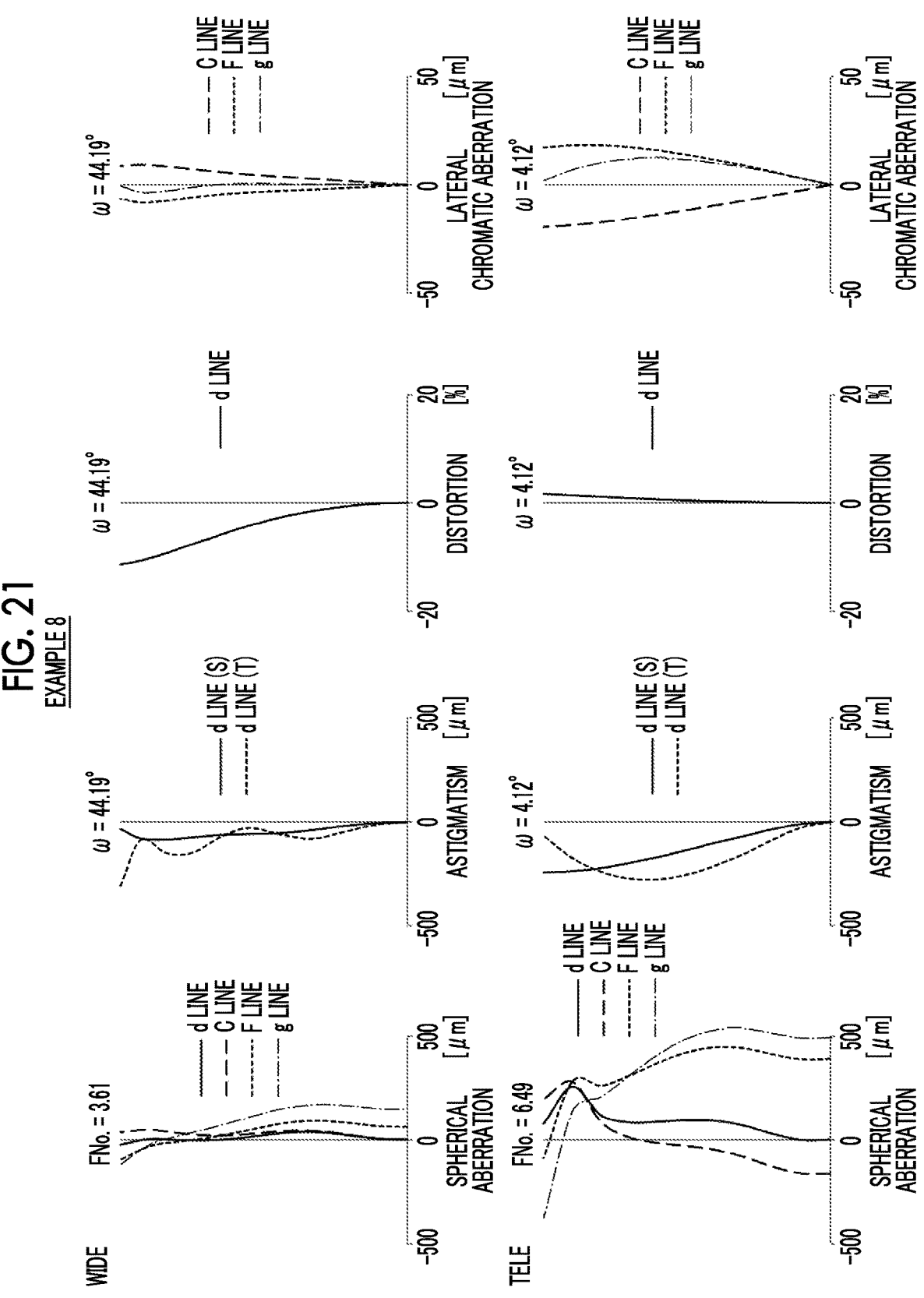
FIG. 21 is a diagram showing aberrations of the zoom lens of Example 8.

Regarding the zoom lens of Example 8, Table 22 shows basic lens data, Table 23 shows specifications and variable surface spacings, and Table 24 shows aspherical coefficients thereof. FIG. 21 shows aberration diagrams.

TABLE 22

Example 8

| Sn | R | D | Nd | vd | θgF | ED | SG |
|---|---|---|---|---|---|---|---|
| 1 | 81.6698 | 1.5000 | 1.90525 | 35.04 | 0.58486 | 52.4400 | 4.8300 |
| 2 | 52.4781 | 6.9727 | 1.49700 | 81.61 | 0.53887 | 49.0696 | 3.7000 |
| 3 | 450.5839 | 0.1500 | | | | 48.0974 | |

TABLE 22-continued

Example 8

| Sn | R | D | Nd | vd | θgF | ED | SG |
|---|---|---|---|---|---|---|---|
| 4 | 58.5840 | 5.5929 | 1.49700 | 81.61 | 0.53887 | 45.6000 | 3.7000 |
| 5 | 582.0760 | DD[5] | | | | 45.0546 | |
| *6 | 115.7400 | 1.5000 | 1.85135 | 40.10 | 0.56954 | 26.9768 | 5.2500 |
| *7 | 12.0209 | 5.5829 | | | | 18.9811 | |
| 8 | 708.6655 | 0.7000 | 1.90001 | 38.00 | 0.57332 | 18.8484 | 5.1200 |
| 9 | 58.8669 | 0.8676 | | | | 18.6490 | |
| 10 | 192.9084 | 4.5289 | 1.83423 | 23.29 | 0.61858 | 18.6536 | 3.6316 |
| 11 | −19.1401 | 0.5013 | | | | 18.5840 | |
| *12 | −13.4456 | 1.1000 | 1.77323 | 50.68 | 0.54826 | 18.4000 | 4.3202 |
| *13 | −47.7592 | DD[13] | | | | 18.5959 | |
| 14 | ∞ | 0.8000 | | | | 14.2556 | |
| (St) | | | | | | | |
| *15 | 19.3984 | 3.3400 | 1.58313 | 59.38 | 0.54237 | 15.1481 | 3.0500 |
| *16 | −100.0036 | 2.1772 | | | | 15.1662 | |
| 17 | −177.8535 | 3.1318 | 1.51620 | 64.30 | 0.53818 | 15.0862 | 2.6699 |
| 18 | −18.0855 | 0.1500 | | | | 15.0937 | |
| 19 | 255.7322 | 0.6000 | 1.83604 | 42.33 | 0.56468 | 14.3033 | 4.7413 |
| 20 | 19.3596 | 1.2002 | | | | 13.8648 | |
| 21 | 25.0871 | 0.6000 | 1.92119 | 23.96 | 0.62025 | 14.5993 | 3.8400 |
| 22 | 12.6497 | 4.4829 | 1.74320 | 49.34 | 0.55312 | 14.1984 | 4.0600 |
| 23 | −61.6208 | DD[23] | | | | 13.9548 | |
| 24 | −18.5906 | 0.6000 | 1.77696 | 48.20 | 0.55406 | 12.7700 | 4.3378 |
| 25 | 16.8006 | 3.4312 | 1.64013 | 43.25 | 0.57191 | 13.0905 | 2.9893 |
| 26 | −76.4055 | 0.1500 | | | | 13.4254 | |
| *27 | 26.0829 | 4.2622 | 1.49710 | 81.56 | 0.53848 | 13.6823 | 3.6400 |
| *28 | −15.4120 | DD[28] | | | | 13.6000 | |
| 29 | 37.3046 | 1.8652 | 1.95906 | 17.47 | 0.65993 | 12.8000 | 3.5900 |
| 30 | 408.6286 | 0.6100 | 1.87070 | 40.73 | 0.56825 | 12.5850 | 4.8400 |
| 31 | 14.5370 | DD[31] | | | | 12.2744 | |
| 32 | −37.4434 | 1.0000 | 1.90001 | 30.19 | 0.59850 | 17.1064 | 4.7805 |
| 33 | 518.5232 | DD[33] | | | | 18.1657 | |
| 34 | 31.1969 | 4.3626 | 1.51599 | 62.14 | 0.54123 | 22.8377 | 2.6380 |
| 35 | −249.9995 | DD[35] | | | | 23.4614 | |
| 36 | ∞ | 2.8500 | 1.51680 | 64.20 | 0.53430 | 27.1035 | 2.5200 |
| 37 | ∞ | 1.0885 | | | | 27.9343 | |

TABLE 23

Example 8

| | WIDE | TELE |
|---|---|---|
| Zr | 1.0 | 11.8 |
| f | 16.49 | 194.06 |
| FNo. | 3.61 | 6.49 |
| 2ω[°] | 88.37 | 8.24 |
| DD[5] | 0.8000 | 61.5544 |
| DD[13] | 27.4755 | 1.3776 |
| DD[23] | 1.4395 | 1.3840 |
| DD[28] | 1.4905 | 2.3417 |
| DD[31] | 11.1352 | 10.2840 |
| DD[33] | 2.0922 | 1.4402 |
| DD[35] | 7.8644 | 45.9650 |

TABLE 24

Example 8

| Sn | 6 | 7 | 12 | 13 |
|---|---|---|---|---|
| KA | 1.0000000000E+00 | 7.9518396542E−01 | 1.0000000000E+00 | 1.0000000000E+00 |
| A3 | 0.0000000000E+00 | 0.0000000000E+00 | 0.0000000000E+00 | 0.0000000000E+00 |
| A4 | 1.7767490108E−05 | 4.4452783241E−05 | 2.2819247958E−04 | 1.5787864921E−04 |
| A5 | −2.4422455659E−06 | 3.1779674180E−06 | −6.6573218979E−06 | −9.4003603781E−06 |
| A6 | −2.9646864305E−07 | −2.6989991343E−06 | −5.3313777795E−06 | −3.6631545165E−06 |
| A7 | 6.1412233850E−08 | 4.4720249025E−07 | 7.2684568312E−07 | 4.5019023900E−07 |
| A8 | −1.5466044807E−09 | −4.5482453785E−09 | 1.1513271878E−08 | 2.0473342248E−09 |
| A9 | −1.0844123491E−10 | −3.4780914469E−09 | −9.4784004416E−09 | −1.8158581337E−09 |
| A10 | −2.8898811469E−12 | −3.6984657499E−11 | 1.3320080661E−09 | 1.1507051625E−10 |
| A11 | 8.6196123719E−13 | 8.0479798328E−11 | −1.2942206073E−10 | −3.7769225367E−11 |

TABLE 24-continued

| | | Example 8 | | |
|---|---|---|---|---|
| A12 | −5.4461528951E−14 | −1.0775454178E−11 | 2.9305777350E−12 | 6.4434853768E−12 |
| A13 | 2.6567752798E−15 | 9.4491352988E−13 | 1.1346703519E−12 | −5.7278918426E−13 |
| A14 | −9.8380638896E−17 | −5.3120399306E−14 | −1.4982239391E−13 | 2.8714849656E−14 |
| A15 | 2.4427466360E−18 | 1.7468490519E−15 | 7.9681343212E−15 | −7.3986841405E−16 |
| A16 | −2.9273541770E−20 | −2.5651519828E−17 | −1.6373075844E−16 | 6.9238679189E−18 |

| Sn | 15 | 16 | 27 | 28 |
|---|---|---|---|---|
| KA | 1.0000000000E+00 | 1.0000000000E+00 | 1.0000000000E+00 | 1.0000000000E+00 |
| A3 | 0.0000000000E+00 | 0.0000000000E+00 | 0.0000000000E+00 | 0.0000000000E+00 |
| A4 | −2.8437638947E−05 | 4.8276507777E−05 | 8.7698915926E−06 | 4.9846326349E−05 |
| A5 | 3.7236848328E−06 | 5.6343559032E−06 | −2.3105301893E−05 | −1.3047319533E−05 |
| A6 | 8.7015172466E−08 | −1.0773016448E−06 | 1.1064549176E−05 | 5.5380155324E−06 |
| A7 | −4.8627832788E−08 | 1.9266690905E−07 | −2.8588118797E−06 | −8.9624228217E−07 |
| A8 | −4.2408743797E−08 | −5.8484369476E−08 | 3.1177876307E−07 | −7.5806171816E−08 |
| A9 | 1.3510864293E−08 | 1.5344667908E−08 | 5.8476567892E−08 | 5.8714808990E−08 |
| A10 | −1.7716906936E−09 | −2.5211714716E−09 | −3.1916207627E−08 | −9.3529911134E−09 |
| A11 | 1.3224971793E−10 | 2.4124554002E−10 | 6.3176494814E−09 | 2.2085226037E−10 |
| A12 | −1.7741420781E−11 | −2.0320901777E−11 | −5.9647416399E−10 | 1.1756707308E−10 |
| A13 | 3.5269976801E−12 | 2.3105159083E−12 | 2.8504059782E−12 | −1.5047050548E−11 |
| A14 | −4.4454961348E−13 | −2.5742587701E−13 | 5.2407406649E−12 | 4.0581149589E−13 |
| A15 | 2.8590123109E−14 | 1.6753661849E−14 | −4.8555896649E−13 | 4.0638735225E−14 |
| A16 | −7.3865966340E−16 | −4.4613347316E−16 | 1.4735118777E−14 | −2.3493576501E−15 |

Tables 25 to 28 each show corresponding values of Conditional Expressions (1) to (53) of the zoom lenses of Examples 1 to 8. Preferable ranges of the conditional expressions may be set by using the corresponding values of the examples shown in Tables 25 to 28 as the upper limits or the lower limits of the conditional expressions.

TABLE 25

| Expression Number | | Example 1 | Example 2 | Example 3 | Example 4 |
|---|---|---|---|---|---|
| (1) | ft/fw | 15.7099 | 11.7718 | 11.7718 | 11.7718 |
| (2) | vd1 | 40.76 | 35.25 | 35.04 | 35.04 |
| (3) | (vd2 + vd3)/2 | 88.35 | 81.61 | 81.61 | 81.61 |
| (4) | FNot × (ft/fw) | 101.9417 | 76.3875 | 76.3875 | 76.3875 |
| (5) | TLw/fw | 6.6908 | 7.0921 | 7.0517 | 6.9383 |
| (6) | TLt/ft | 0.7007 | 0.9743 | 0.9741 | 0.9741 |
| (7) | TLt/(ft × tanωt) | 14.6714 | 13.4873 | 13.5566 | 13.5855 |
| (8) | Bfw/(fw × tanωw) | 0.7622 | 0.7409 | 0.6805 | 0.6738 |
| (9) | Denw/fw | 1.5217 | 1.5724 | 1.5905 | 1.5698 |
| (10) | DG4/TLw | 0.0259 | 0.0228 | 0.0587 | 0.0623 |
| (11) | Gfave | 4.0600 | 4.2400 | 3.0650 | 3.3400 |
| (12) | Gfn | 4.5800 | 4.9000 | 3.2400 | 3.5900 |
| (13) | GlSave | 4.3600 | 4.4550 | 3.6600 | 3.9450 |
| (14) | GlSp | 3.1000 | 4.4000 | 3.4800 | 4.0500 |
| (15) | −M1/TLt | 0.3922 | 0.3817 | 0.3851 | 0.3949 |
| (16) | −M2/TLt | 0.0538 | 0.0822 | 0.0615 | 0.0651 |
| (17) | −M3/TLt | 0.1953 | 0.2195 | 0.1997 | 0.2009 |
| (18) | −M4/TLt | 0.1953 | 0.2198 | 0.1980 | 0.2009 |
| (19) | −M5/TLt | 0.2133 | 0.2263 | 0.1934 | 0.1963 |
| (20) | d1/ED1 | 0.0307 | 0.0292 | 0.0291 | 0.0290 |
| (21) | d1/(Denw × tanωw) | 0.0642 | 0.0602 | 0.0587 | 0.0596 |
| (22) | d2 × (1/R2f − 1/R2r) | 0.1265 | 0.1248 | 0.1125 | 0.1044 |
| (23) | d1/f1 | 0.0139 | 0.0154 | 0.0143 | 0.0141 |
| (24) | d1/DG1 | 0.1029 | 0.1037 | 0.1062 | 0.1096 |
| (25) | vd2 | 81.61 | 81.61 | 81.61 | 81.61 |
| (26) | vd3 | 95.10 | 81.61 | 81.61 | 81.61 |
| (27) | θgF2 | 0.5389 | 0.5389 | 0.5389 | 0.5389 |
| (28) | θgF3 | 0.5336 | 0.5389 | 0.5389 | 0.5389 |

TABLE 26

| Expression Number | | Example 1 | Example 2 | Example 3 | Example 4 |
|---|---|---|---|---|---|
| (29) | REf/fE | −7.8260 | −7.9032 | −10.1512 | −8.0580 |
| (30) | RfF/RfR | 3.4077 | 3.0063 | 3.4746 | 3.6984 |
| (31) | ffoc/ft | −0.0838 | −0.1449 | −0.1742 | −0.1589 |
| (32) | |fIS/ft| | 0.0527 | 0.1589 | 0.1559 | 0.1572 |

TABLE 26-continued

| Expression Number | | Example 1 | Example 2 | Example 3 | Example 4 |
|---|---|---|---|---|---|
| (33) | fL22/f2 | 1.5150 | 4.8160 | 4.3996 | 5.3520 |
| (34) | $(1-\beta fw^2) \times \beta fRw^2$ | −4.4319 | −2.6800 | −2.3888 | −2.5820 |
| (35) | $(1-\beta ft^2) \times \beta fRt^2$ | −18.3486 | −10.8334 | −8.7656 | −10.2531 |
| (36) | $|(1-\beta ISw) \times \beta ISRw|$ | 1.1085 | 1.3956 | 1.4142 | 1.3895 |
| (37) | $|(1-\beta ISt) \times \beta ISRt|$ | 5.2535 | 3.0017 | 2.9950 | 3.0178 |
| (38) | $|\beta Rw \times (fw \times tan\omega w)|$ | 0.0248 | 0.0479 | 0.0406 | 0.0488 |
| (39) | $|BRt \times (ft \times tan\omega t)|$ | 0.0003 | 0.0017 | 0.0006 | 0.0010 |
| (40) | f1/f2 | −7.0311 | −6.8763 | −7.3227 | −7.3624 |
| (41) | f2/f3 | −0.7698 | −0.6643 | −0.6628 | −0.6824 |
| (42) | M4/ME | 0.9154 | 0.9710 | 1.0000 | 1.0000 |
| (43) | fw/fMw | 0.7418 | 0.6842 | 0.6767 | 0.6935 |
| (44) | ft/fMt | 11.6501 | 8.0353 | 8.2427 | 8.4269 |
| (45) | MfF/MfR | 0.9153 | 0.9697 | 1.0000 | 1.0000 |
| (46) | Rc2ef/Ry2ef | 0.7263 | 0.7184 | 0.7074 | 0.7188 |
| (47) | Rc21r/Ry21r | 1.1508 | 1.0920 | 1.1277 | 1.1393 |
| (48) | Rc3ef/Ry3ef | 0.8137 | 0.9383 | 1.0000 | 1.0000 |
| (49) | Rc31r/Ry31r | 0.0913 | 0.6738 | 0.6887 | 0.6544 |
| (50) | (1/Rc2ef − 1/Rc2er)/ (1/Ry2ef − 1/Ry2er) | 1.4860 | 1.7535 | 1.8410 | 1.9042 |
| (51) | (1/Rc21f − 1/Rc21r)/ (1/Ry21f − 1/Ry21r) | 0.8387 | 0.9188 | 0.8812 | 0.8569 |
| (52) | (1/Rc3ef − 1/Rc3er)/ (1/Ry3ef − 1/Ry3er) | 1.0517 | 1.0474 | 1.0000 | 1.0000 |
| (53) | (1/Rc31f − 1/Rc31r)/ (1/Ry31f − 1/Ry31r) | 1.5489 | 1.5289 | 1.3876 | 1.4166 |

TABLE 27

| Expression Number | | Example 5 | Example 6 | Example 7 | Example 8 |
|---|---|---|---|---|---|
| (1) | ft/fw | 11.7718 | 11.7718 | 9.4175 | 11.7718 |
| (2) | νd1 | 33.27 | 35.25 | 35.25 | 35.04 |
| (3) | (νd2 + νd3)/2 | 91.21 | 81.61 | 81.61 | 81.61 |
| (4) | FNot × (ft/fw) | 76.3875 | 76.3875 | 61.1100 | 76.3875 |
| (5) | TLw/fw | 7.0980 | 7.0946 | 5.9566 | 7.0987 |
| (6) | TLt/ft | 0.9642 | 0.9742 | 1.1338 | 0.9743 |
| (7) | TLt/(ft × tanωt) | 13.4937 | 13.5175 | 12.7276 | 13.5319 |
| (8) | Bfw/(fw × tanωw) | 0.7236 | 0.7429 | 0.6668 | 0.6759 |
| (9) | Denw/fw | 1.6070 | 1.5575 | 1.4893 | 1.5796 |
| (10) | DG4/TLw | 0.1170 | 0.0210 | 0.0685 | 0.0722 |
| (11) | Gfave | 4.5300 | 4.5550 | 4.0850 | 4.2150 |
| (12) | Gfn | 5.5200 | 5.5200 | 4.5800 | 4.8400 |
| (13) | GISave | 3.7550 | 4.4550 | 3.8700 | 3.9500 |
| (14) | GISp | 3.6700 | 4.4000 | 4.0300 | 4.0600 |
| (15) | −M1/TLt | 0.3747 | 0.3814 | 0.4421 | 0.3810 |
| (16) | −M2/TLt | 0.0384 | 0.0685 | 0.1034 | 0.0597 |
| (17) | −M3/TLt | 0.1749 | 0.2059 | 0.2022 | 0.1978 |
| (18) | −M4/TLt | 0.1749 | 0.2069 | 0.2022 | 0.1980 |
| (19) | −M5/TLt | 0.1715 | 0.2166 | 0.2048 | 0.1935 |
| (20) | d1/ED1 | 0.0286 | 0.0292 | 0.0296 | 0.0286 |
| (21) | d1/(Denw × tanωw) | 0.0581 | 0.0609 | 0.0628 | 0.0593 |
| (22) | d2 × (1/R2f − 1/R2r) | 0.1366 | 0.1246 | 0.0963 | 0.1172 |
| (23) | d1/f1 | 0.0144 | 0.0151 | 0.0139 | 0.0147 |
| (24) | d1/DG1 | 0.1050 | 0.1049 | 0.1097 | 0.1055 |
| (25) | νd2 | 100.82 | 81.61 | 81.61 | 81.61 |
| (26) | νd3 | 81.61 | 81.61 | 81.61 | 81.61 |
| (27) | θgF2 | 0.5337 | 0.5389 | 0.5389 | 0.5389 |
| (28) | θgF3 | 0.5389 | 0.5389 | 0.5389 | 0.5389 |

TABLE 28

| Expression Number | | Example 5 | Example 6 | Example 7 | Example 8 |
|---|---|---|---|---|---|
| (29) | REf/fE | −5.2245 | −9.2671 | −6.0448 | −57.3051 |
| (30) | RfF/RfR | 2.1975 | 3.8275 | 2.8748 | 2.5662 |
| (31) | ffoc/ft | −0.1711 | −0.1340 | −0.1905 | −0.1589 |

TABLE 28-continued

| Expression Number | | Example 5 | Example 6 | Example 7 | Example 8 |
|---|---|---|---|---|---|
| (32) | \|fIS/ft\| | 0.1536 | 0.1535 | 0.2162 | 0.1514 |
| (33) | fL22/f2 | 5.0987 | 4.9243 | 5.0519 | 5.0996 |
| (34) | $(1-\beta fw^2) \times \beta fRw^2$ | −3.6170 | −2.9383 | −2.3681 | −2.8286 |
| (35) | $(1-\beta ft^2) \times \beta fRt^2$ | −12.1993 | −11.0057 | −10.3932 | −10.1257 |
| (36) | $\|(1-\beta ISw) \times \beta ISRw\|$ | 1.5610 | 1.4533 | 1.1047 | 1.4859 |
| (37) | $\|(1-\beta ISt) \times \beta ISRt\|$ | 3.0071 | 3.0003 | 2.4124 | 3.0191 |
| (38) | $\|BRw \times (fw \times \tan\omega w)\|$ | 0.0483 | 0.0460 | 0.0720 | 0.0498 |
| (39) | $\|BRt \times (ft \times \tan\omega t)\|$ | 0.0081 | 0.0018 | 0.0038 | 0.0027 |
| (40) | f1/f2 | −7.3868 | −6.9453 | −8.0072 | −7.3129 |
| (41) | f2/f3 | 0.0021 | −0.6808 | −0.6783 | −0.6909 |
| (42) | M4/ME | 1.0000 | 0.9549 | 0.9648 | 0.9829 |
| (43) | fw/fMw | 0.7013 | 0.6827 | 0.8251 | 0.7848 |
| (44) | ft/fMt | 8.4513 | 7.9742 | 7.6384 | 9.5575 |
| (45) | MfF/MfR | 1.0000 | 0.9506 | 0.9648 | 1.0000 |
| (46) | Rc2ef/Ry2ef | 0.7150 | 0.7124 | 0.7589 | 0.6994 |
| (47) | Rc21r/Ry21r | 1.0063 | 1.0796 | 1.2079 | 1.0960 |
| (48) | Rc3ef/Ry3ef | 1.0000 | 0.9305 | 1.0000 | 1.0000 |
| (49) | Rc31r/Ry31r | 0.8292 | 0.4080 | 0.7115 | 0.6014 |
| (50) | (1/Rc2ef − 1/Rc2er)/ (1/Ry2ef − 1/Ry2er) | 1.5911 | 1.8105 | 1.7278 | 1.7068 |
| (51) | (1/Rc21f − 1/Rc21r)/ (1/Ry21f − 1/Ry21r) | 0.9409 | 0.9168 | 0.7915 | 0.8839 |
| (52) | (1/Rc3ef − 1/Rc3er)/ (1/Ry3ef − 1/Ry3er) | 1.0000 | 1.0528 | 1.0000 | 1.0000 |
| (53) | (1/Rc31f − 1/Rc31r)/ (1/Ry31f − 1/Ry31r) | 1.5697 | 1.5039 | 1.3267 | 1.3537 |

The zoom lenses of Examples 1 to 8 each have a zoom ratio of 9 times or more and achieve a high zoom ratio while being configured to have a small size, and each maintain high optical performance by satisfactorily correcting various aberrations.

Figure 22:
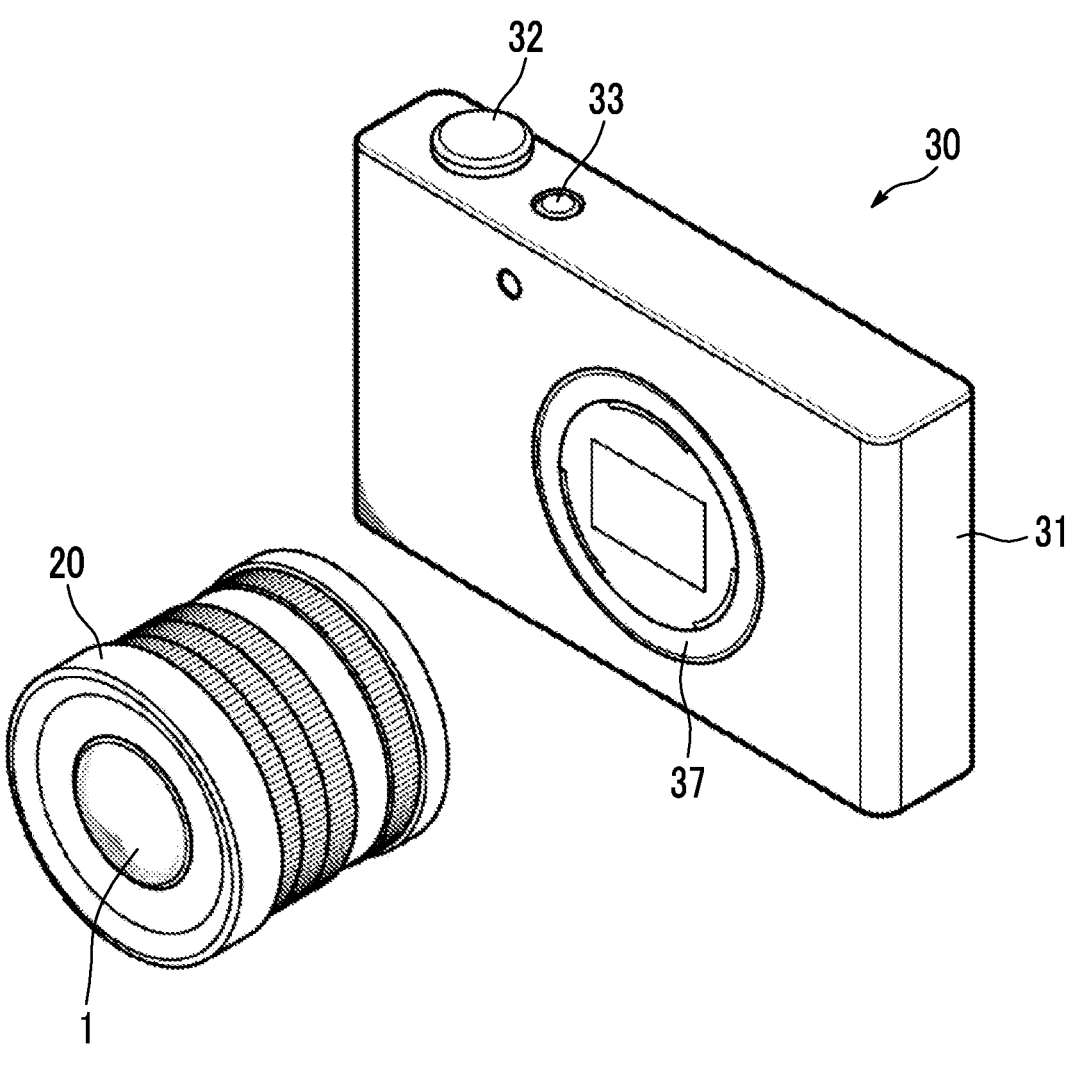
FIG. 22 is a perspective view of a front side of an imaging apparatus according to an embodiment.
Figure 23:
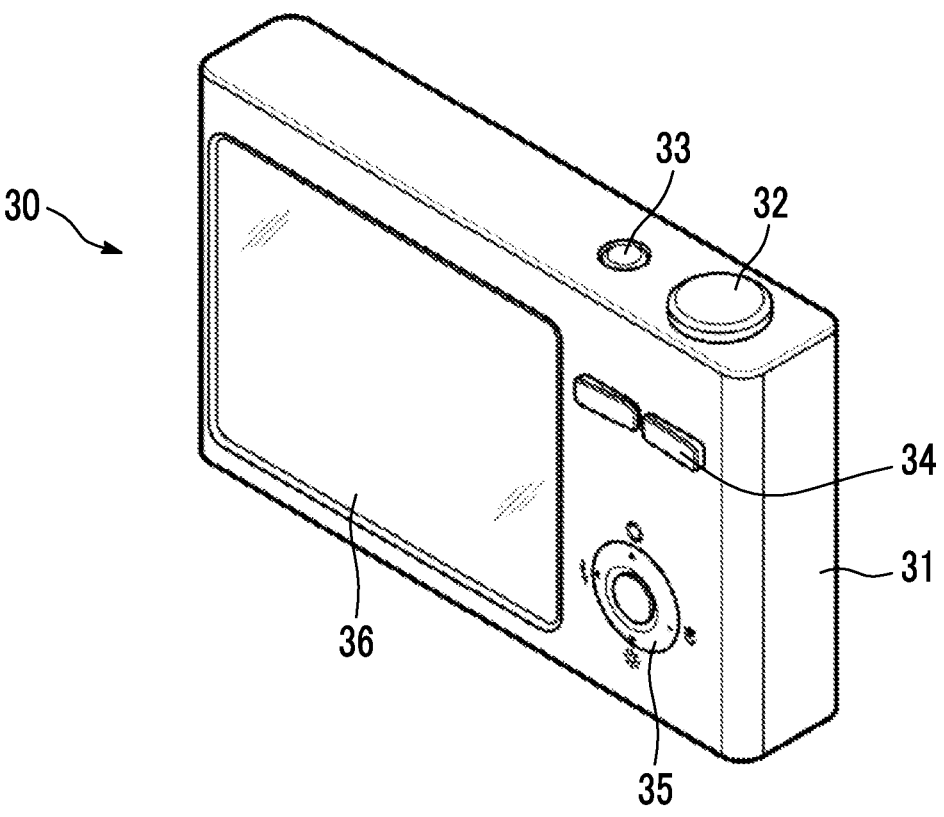
FIG. 23 is a perspective view of a rear side of the imaging apparatus according to the embodiment.

Next, an imaging apparatus according to an embodiment of the present disclosure will be described. FIGS. 22 and 23 are external views of a camera 30 which is the imaging apparatus according to the embodiment of the present disclosure. FIG. 22 is a perspective view of the camera 30 viewed from a front side, and FIG. 23 is a perspective view of the camera 30 viewed from a rear side. The camera 30 is a so-called mirrorless type digital camera, and an interchangeable lens 20 can be removably mounted thereon. The interchangeable lens 20 is configured to include a zoom lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31.

The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, a video camera, and a security camera.

What is claimed is:

1. A zoom lens comprising, in order from an object side to an image side: a first lens group that has a positive refractive power; a second lens group that has a negative refractive power; a middle group that includes one or more lens groups; and a final lens group, wherein the middle group has a positive refractive power as a whole throughout an entire zoom range, during zooming, a spacing between the first lens group and the second lens group changes, a spacing between the second lens group and the middle group changes, and a spacing between the middle group and the final lens group changes, and in a case where the middle group includes a plurality of lens groups, all spacings of adjacent lens groups in the middle group change during zooming, wherein a focal length of the zoom lens in a state where an infinite distance object is in focus at a wide angle end is fw, a focal length of the zoom lens in a state where the infinite distance object is in focus at a telephoto end is ft, and Conditional Expression (1) is satisfied, which is represented by $$6 < ft/fw < 30 \tag{1},$$

wherein a back focal length of the zoom lens at an air-equivalent distance in a state where the infinite distance object is in focus at the wide angle end is Bfw, a maximum half angle of view in a state where the infinite distance object is in focus at the wide angle end is ωw, and Conditional Expression (8) is satisfied, which is represented by $$0.5 < Bfw/(fw \times \tan \omega w) < 1.1 \tag{8},$$

wherein a central thickness of a lens closest to the object side in the first lens group is d1, a focal length of the first lens group is f1, and Conditional Expression (23) is satisfied, which is represented by $$0.01 < d1/f1 < 0.021 \tag{23},$$

wherein the zoom lens includes a focus group that moves along an optical axis during focusing, a focal length of the focus group is ffoc, and Conditional Expression (31-1) is satisfied, which is represented by $$-0.28 < ffoc/ft < -0.05 \tag{31-1}, and$$

wherein a focal length of the second lens group is f2, a focal length of a lens group closest to the object side in the middle group is f3, and Conditional Expression (41) is satisfied, which is represented by $$-0.9 < f2/f3 < -0.54 \tag{41}, and$$

wherein an Abbe number of a lens closest to the object side in the first lens group based on a d line is vd1, and Conditional Expression (2) is satisfied, which is represented by $$29.6 < vd1 < 50 \tag{2}, and$$

wherein an Abbe number of a lens which is third from the object side in the first lens group based on a d line is vd3, and Conditional Expression (26) is satisfied, which is represented by $$70 < vd3 < 110 \tag{26}.$$

2. The zoom lens according to claim 1, wherein an Abbe number of a lens which is second from the object side in the first lens group based on a d line is vd2, an Abbe number of a lens which is third from the object side in the first lens group based on the d line is vd3, and Conditional Expression (3) is satisfied, which is represented by $$68 < (vd2 + vd3)/2 < 98 \tag{3}.$$

3. The zoom lens according to claim 1, wherein the first lens group consists of, in order from the object side to the image side, a negative lens, a positive lens, and a positive lens.

4. The zoom lens according to claim 1, wherein the focus group has a negative refractive power.

5. The zoom lens according to claim 1, wherein the focus group includes a positive lens and a negative lens.

6. The zoom lens according to claim 1, wherein the focus group consists of a cemented lens in which a positive lens and a negative lens are cemented to each other.

7. The zoom lens according to claim 1, wherein a lens group which is fourth from the object side in the zoom lens is a focus group that moves along an optical axis during focusing.

8. The zoom lens according to claim 1, wherein the middle group includes at least one lens group that has a positive refractive power.

9. The zoom lens according to claim 1, wherein the middle group includes a lens group that has a positive refractive power at a position closest to the object side.

10. The zoom lens according to claim 1, wherein the middle group includes, successively in order from a position closest to the object side to the image side, a lens group that has a positive refractive power and a lens group that has a negative refractive power.

11. The zoom lens according to claim 1, wherein all the lens groups move during zooming.

12. The zoom lens according to claim 1, wherein the zoom lens consists of five lens groups as a whole.

13. The zoom lens according to claim 1, wherein a lens group closest to the object side in the middle group includes, successively in order from the object side to the image side, a positive lens, a positive lens, and a negative lens.

14. The zoom lens according to claim 1, wherein a lens group closest to the object side in the middle group includes, successively in order from the image side to the object side, a positive lens, a positive lens, and a negative lens.

15. The zoom lens according to claim 1, wherein the second lens group consists of, in order from the object side to the image side, a negative lens, a negative lens, a positive lens, and a negative lens.

16. The zoom lens according to claim 1, wherein an F number in a state where the infinite distance object is in focus at the telephoto end is FNot, and Conditional Expression (4) is satisfied, which is represented by $$45 < FNot \times (ft/fw) < 130 \tag{4}.$$

17. The zoom lens according to claim 1, wherein a sum of a back focal length of the zoom lens at an air-equivalent distance and a distance on an optical axis from a lens surface closest to the object side in the first lens group to a lens surface closest to the image side in the final lens group in a state where the infinite distance object is in focus at the wide angle end is TLw, and Conditional Expression (5) is satisfied, which is represented by $$4.5 < TLw/fw < 9.5 \tag{5}.$$

18. The zoom lens according to claim 1, wherein a sum of a back focal length of the zoom lens at an air-equivalent distance and a distance on an optical axis from a lens surface closest to the object side in the first lens group to a lens surface closest to the image side in the final lens group in a state where the infinite distance object is in focus at the telephoto end is TLt, and Conditional Expression (6) is satisfied, which is represented by $$0.5 < TLt/ft < 1.3 \tag{6}.$$

19. The zoom lens according to claim 1, wherein a sum of a back focal length of the zoom lens at an air-equivalent distance and a distance on an optical axis from a lens surface closest to the object side in the first lens group to a lens surface closest to the image side in the final lens group in a state where the infinite distance object is in focus at the telephoto end is TLt, a maximum half angle of view in a state where the infinite distance object is in focus at the telephoto end is ωt, and Conditional Expression (7) is satisfied, which is represented by $$10 < TLt/(fi \times \tan \omega t) < 18 \tag{7}$$

20. The zoom lens according to claim 1, wherein a distance on an optical axis from a lens surface closest to the object side in the first lens group to a paraxial entrance pupil position in a state where the infinite distance object is in focus at the wide angle end is Denw, and Conditional Expression (9) is satisfied, which is represented by $$1.1 < Denw/fw < 1.9 \tag{9}$$

21. The zoom lens according to claim 1, wherein a lens group which is fourth from the object side in the zoom lens is set as a fourth lens group, the fourth lens group moves during at least one of zooming or focusing, a distance on an optical axis from a lens surface closest to the object side in the fourth lens group to a lens surface closest to the image side in the fourth lens group is DG4, a sum of a back focal length of the zoom lens at an air-equivalent distance and a distance on an optical axis from a lens surface closest to the object side in the first lens group to a lens surface closest to the image side in the final lens group in a state where the infinite distance object is in focus at the wide angle end is TLw, and Conditional Expression (10) is satisfied, which is represented by $$0.009 < DG4/TLw < 0.12 \tag{10}$$

22. The zoom lens according to claim 1, wherein an average value of specific gravities of all lenses in the focus group is Gfave, and Conditional Expression (11) is satisfied, which is represented by $$2.3 < Gfave < 5.15 \tag{11}$$

23. The zoom lens according to claim 1, wherein the focus group includes at least one negative lens, a specific gravity of the at least one negative lens in the focus group is Gfn, and Conditional Expression (12) is satisfied, which is represented by $$2.4 < Gfn < 5.6 \tag{12}$$

24. The zoom lens according to claim 1, wherein the zoom lens includes a vibration-proof group that moves in a direction intersecting with an optical axis during image shake correction, an average value of specific gravities of all lenses in the vibration-proof group is GISave, and Conditional Expression (13) is satisfied, which is represented by $$2.5 < GISave < 5.2 \tag{13}$$

25. The zoom lens according to claim 1, wherein the zoom lens includes a vibration-proof group that moves in a direction intersecting with an optical axis during image shake correction, the vibration-proof group includes at least one positive lens, a specific gravity of the at least one positive lens in the vibration-proof group is GISp, and Conditional Expression (14) is satisfied, which is represented by $$2.6 < GISp < 5 \tag{14}$$

26. The zoom lens according to claim 1, wherein a net displacement of the first lens group along the optical axis during zooming from the wide angle end to the telephoto end is M1, a sign of M1 is positive in a case where the first lens group moves from the object side to the image side and is negative in a case where the first lens group moves from the image side to the object side, a sum of a back focal length of the zoom lens at an air-equivalent distance and a distance on the optical axis from a lens surface closest to the object side in the first lens group to a lens surface closest to the image side in the final lens group in a state where the infinite distance object is in focus at the telephoto end is TLt, and Conditional Expression (15) is satisfied, which is represented by $$0.25 < -M1/TLt < 0.6 \tag{15}$$

27. The zoom lens according to claim 1, wherein a net displacement of the second lens group along the optical axis during zooming from the wide angle end to the telephoto end is M2, a sign of M2 is positive in a case where the second lens group moves from the object side to the image side and is negative in a case where the second lens group moves from the image side to the object side, a sum of a back focal length of the zoom lens at an air-equivalent distance and a distance on the optical axis from a lens surface closest to the object side in the first lens group to a lens surface closest to the image side in the final lens group in a state where the infinite distance object is in focus at the telephoto end is TLt, and Conditional Expression (16) is satisfied, which is represented by $$0.01 < -M2/TLt < 0.2 \tag{16}$$

28. The zoom lens according to claim 1, wherein a lens group closest to the object side in the middle group is set as a third lens group, a net displacement of the third lens group along the optical axis during zooming from the wide angle end to the telephoto end is M3, a sign of M3 is positive in a case where the third lens group moves from the object side to the image side and is negative in a case where the third lens group moves from the image side to the object side, a sum of a back focal length of the zoom lens at an air-equivalent distance and a distance on the optical axis from a lens surface closest to the object side in the first lens group to a lens surface closest to the image side in the final lens group in a state where the infinite distance object is in focus at the telephoto end is TLt, and Conditional Expression (17) is satisfied, which is represented by $$0.08 < -M3/TLt < 0.4 \tag{17}$$

29. The zoom lens according to claim 1,
wherein a lens group which is fourth from the object side in the zoom lens is set as a fourth lens group,
a net displacement of the fourth lens group along the optical axis during zooming from the wide angle end to the telephoto end is M4,
a sign of M4 is positive in a case where the fourth lens group moves from the object side to the image side and is negative in a case where the fourth lens group moves from the image side to the object side,
a sum of a back focal length of the zoom lens at an air-equivalent distance and a distance on the optical axis from a lens surface closest to the object side in the first lens group to a lens surface closest to the image side in the final lens group in a state where the infinite distance object is in focus at the telephoto end is TLt, and
Conditional Expression (18) is satisfied, which is represented by $$0.15 < -M4/TLt < 0.3 \tag{18}$$

30. The zoom lens according to claim 1,
wherein a lens group which is fifth from the object side in the zoom lens is set as a fifth lens group,
a net displacement of the fifth lens group along the optical axis during zooming from the wide angle end to the telephoto end is M5,
a sign of M5 is positive in a case where the fifth lens group moves from the object side to the image side and is negative in a case where the fifth lens group moves from the image side to the object side,
a sum of a back focal length of the zoom lens at an air-equivalent distance and a distance on the optical axis from a lens surface closest to the object side in the first lens group to a lens surface closest to the image side in the final lens group in a state where the infinite distance object is in focus at the telephoto end is TLt, and
Conditional Expression (19) is satisfied, which is represented by $$0.11 < -M5/TLt < 0.31 \tag{19}$$

31. The zoom lens according to claim 1, wherein
an effective diameter of an object side surface of the lens closest to the object side in the first lens group is ED1, and
Conditional Expression (20) is satisfied, which is represented by $$0.022 < d1/ED1 < 0.04 \tag{20}$$

32. The zoom lens according to claim 1, wherein
a distance on an optical axis from a lens surface closest to the object side in the first lens group to a paraxial entrance pupil position in a state where the infinite distance object is in focus at the wide angle end is Denw, and
Conditional Expression (21) is satisfied, which is represented by $$0.035 < d1/(Denw \times \tan \omega w) < 0.077 \tag{21}$$

33. The zoom lens according to claim 1, wherein
a central thickness of a lens which is second from the object side in the first lens group is d2,
a paraxial curvature radius of an object side surface of the lens which is second from the object side in the first lens group is R2f, a paraxial curvature radius of an image side surface of the lens which is second from the object side in the first lens group is R2r, and
Conditional Expression (22) is satisfied, which is represented by $$0.06 < d2 \times (1/R2f - 1/R2r) < 0.19 \tag{22}$$

34. The zoom lens according to claim 1, wherein
a distance on an optical axis from a lens surface closest to the object side in the first lens group to a lens surface closest to the image side in the first lens group is DG1, and
Conditional Expression (24) is satisfied, which is represented by $$0.06 < d1/DG1 < 0.125 \tag{24}$$

35. The zoom lens according to claim 1,
wherein an Abbe number of a lens which is second from the object side in the first lens group based on a d line is $\nu d2$, and
Conditional Expression (25) is satisfied, which is represented by $$75 < \nu d2 < 120 \tag{25}$$

36. The zoom lens according to claim 1,
wherein a partial dispersion ratio of a lens which is second from the object side in the first lens group between a g line and an F line is $\theta gF2$, and
Conditional Expression (27) is satisfied, which is represented by $$0.46 < \theta gF2 < 0.62 \tag{27}$$

37. The zoom lens according to claim 1,
wherein a partial dispersion ratio of a lens which is third from the object side in the first lens group between a g line and an F line is $\theta gF3$, and
Conditional Expression (28) is satisfied, which is represented by $$0.46 < \theta gF3 < 0.62 \tag{28}$$

38. The zoom lens according to claim 1, wherein
a paraxial curvature radius of a surface having a minimum absolute value of the paraxial curvature radius among object side concave surfaces of lenses in the final lens group is REf,
a focal length of the final lens group is fE, and
Conditional Expression (29) is satisfied, which is represented by $$-18 < REf/fE < -2 \tag{29}$$

39. The zoom lens according to claim 1, wherein
a paraxial curvature radius of a lens surface closest to the object side in the focus group is RfF,
a paraxial curvature radius of a lens surface closest to the image side in the focus group is RfR, and
Conditional Expression (30) is satisfied, which is represented by $$1.5 < RfF/RfR < 6 \tag{30}$$

40. The zoom lens according to claim 1,
wherein the zoom lens includes a vibration-proof group that moves in a direction intersecting with an optical axis during image shake correction,
a focal length of the vibration-proof group is fIS, and
Conditional Expression (32) is satisfied, which is represented by $$0.01 < |fIS/ft| < 0.35 \tag{32}$$

41. The zoom lens according to claim 1, wherein a focal length of a lens which is second from the object side in the second lens group is fL22, and Conditional Expression (33) is satisfied, which is represented by $$1.4 < fL22/f2 < 7 \tag{33}.$$

42. The zoom lens according to claim 1, wherein a lateral magnification of the focus group in a state where the infinite distance object is in focus at the wide angle end is βfw, a combined lateral magnification of all lenses closer to the image side than the focus group in a state where the infinite distance object is in focus at the wide angle end is βfRw, and Conditional Expression (34) is satisfied, which is represented by $$-6 < (1-\beta fw^2) \times \beta fRw^2 < -1 \tag{34}.$$

43. The zoom lens according to claim 1, wherein a lateral magnification of the focus group in a state where the infinite distance object is in focus at the telephoto end is βft, a combined lateral magnification of all lenses closer to the image side than the focus group in a state where the infinite distance object is in focus at the telephoto end is βfRt, and Conditional Expression (35) is satisfied, which is represented by $$-25 < (1-\beta ft^2) \times \beta fRt^2 < -6.3 \tag{35}.$$

44. The zoom lens according to claim 1, wherein the zoom lens includes a vibration-proof group that moves in a direction intersecting with an optical axis during image shake correction, a lateral magnification of the vibration-proof group in a state where the infinite distance object is in focus at the wide angle end is βISw, a combined lateral magnification of all lenses closer to the image side than the vibration-proof group in a state where the infinite distance object is in focus at the wide angle end is βISRw, and Conditional Expression (36) is satisfied, which is represented by $$0.75 < |(1-\beta ISw) \times \beta ISRw| < 2.5 \tag{36}.$$

45. The zoom lens according to claim 1, wherein the zoom lens includes a vibration-proof group that moves in a direction intersecting with an optical axis during image shake correction, a lateral magnification of the vibration-proof group in a state where the infinite distance object is in focus at the telephoto end is βISt, a combined lateral magnification of all lenses closer to the image side than the vibration-proof group in a state where the infinite distance object is in focus at the telephoto end is βISRt, and Conditional Expression (37) is satisfied, which is represented by $$1.7 < |(1-\beta ISt) \times \beta ISRt| < 7 \tag{37}.$$

46. The zoom lens according to claim 1, wherein a lateral magnification of the focus group in a state where the infinite distance object is in focus at the wide angle end is βfw, a combined lateral magnification of all lenses closer to the image side than the focus group in a state where the infinite distance object is in focus at the wide angle end is βfRw, a composite focal length of all lenses closer to the image side than the focus group in a state where the infinite distance object is in focus at the wide angle end is ffRw, a sum of a back focal length of the zoom lens at an air-equivalent distance and a distance on an optical axis from a paraxial exit pupil position to a lens surface closest to the image side in the final lens group in a state where the infinite distance object is in focus at the wide angle end is Dexw, $$\gamma w = (1-\beta fw^2) \times \beta fRw^2, \text{ and}$$

$$BRw = \{\beta fw/(ffoc \times \gamma w) - 1/(\beta fRw \times ffRw) - (1/Dexw)\}, \text{ and}$$

Conditional Expression (38) is satisfied, which is represented by $$0 < |BRw \times (fw \times \tan \omega w)| < 0.25 \tag{38}.$$

47. The zoom lens according to claim 1, wherein a lateral magnification of the focus group in a state where the infinite distance object is in focus at the telephoto end is βft, a combined lateral magnification of all lenses closer to the image side than the focus group in a state where the infinite distance object is in focus at the telephoto end is βfRt, a composite focal length of all lenses closer to the image side than the focus group in a state where the infinite distance object is in focus at the telephoto end is ffRt, a sum of a back focal length of the zoom lens at an air-equivalent distance and a distance on an optical axis from a paraxial exit pupil position to a lens surface closest to the image side in the final lens group in a state where the infinite distance object is in focus at the telephoto end is Dext, a maximum half angle of view in a state where the infinite distance object is in focus at the telephoto end is ωt, $$\gamma t = (1-\beta ft^2) \times \beta fRt^2, \text{ and}$$

$$BRt = \{\beta ft/(ffoc \times \gamma t) - 1/(\beta fRt \times ffRt) - (1/Dext)\}, \text{ and}$$

Conditional Expression (39) is satisfied, which is represented by $$0 < |BRt \times (ft \times \tan \omega t)| < 0.034 \tag{39}.$$

48. The zoom lens according to claim 1, wherein

Conditional Expression (40) is satisfied, which is represented by $$-10 < f1/f2 < -5.6 \tag{40}.$$

49. The zoom lens according to claim 1, wherein a lens group closest to the object side in the middle group includes five or more lenses.

50. The zoom lens according to claim 1, wherein the number of lenses included in the focus group is two or less.

51. The zoom lens according to claim 1, wherein among movement loci of respective lens groups that move during zooming from the wide angle end to the telephoto end, different movement loci are only five.

52. The zoom lens according to claim 1, wherein a lens group which is fourth from the object side in the zoom lens is set as a fourth lens group, a net displacement of the fourth lens group along the optical axis during zooming from the wide angle end to the telephoto end is M4, a net displacement of the final lens group along the optical axis during zooming from the wide angle end to the telephoto end is ME, and signs of M4 and ME are positive in a case where the fourth lens group and the final lens group move from the object side to the image side and are negative in a case where the fourth lens group and the final lens group move from the image side to the object side, and Conditional Expression (42) is satisfied, which is represented by $$0.9 < M4/ME < 1.1 \tag{42}.$$

53. The zoom lens according to claim 1, wherein a focal length of the middle group in a state where the infinite distance object is in focus at the wide angle end is fMw, and Conditional Expression (43) is satisfied, which is represented by $$0.54 < fw/fMw < 0.95 \tag{43}.$$

54. The zoom lens according to claim 1, wherein a focal length of the middle group in a state where the infinite distance object is in focus at the telephoto end is fMt, and Conditional Expression (44) is satisfied, which is represented by $$5.1 < ft/fMt < 20 \tag{44}.$$

55. The zoom lens according to claim 1, wherein a net displacement of a lens group adjacent to the object side in the focus group along the optical axis during zooming from the wide angle end to the telephoto end is MfF, a net displacement of a lens group adjacent to the image side in the focus group along the optical axis during zooming from the wide angle end to the telephoto end is MfR, and signs of MfF and MfR are positive in a case where the lens groups move from the object side to the image side and are negative in a case where the lens groups move from the image side to the object side, and Conditional Expression (45) is satisfied, which is represented by $$0.9 < MfF/MfR < 1.1 \tag{45}.$$

56. The zoom lens according to claim 1, wherein the zoom lens includes eight or more lens surfaces each having an aspherical shape.

57. The zoom lens according to claim 1, wherein a lens closest to the image side in the second lens group includes an aspherical surface.

58. The zoom lens according to claim 1, wherein a lens closest to the object side in the second lens group includes an aspherical surface.

59. The zoom lens according to claim 1, wherein a lens closest to the image side in a lens group closest to the object side in the middle group includes an aspherical surface.

60. The zoom lens according to claim 1, wherein a lens closest to the object side in a lens group closest to the object side in the middle group includes an aspherical surface.

61. The zoom lens according to claim 1, wherein an object side surface of a lens closest to the image side in the second lens group has an aspherical shape by which a refractive power at a position of a maximum effective diameter is weaker than a refractive power near an optical axis.

62. The zoom lens according to claim 1, wherein an image side surface of a lens closest to the object side in the second lens group has an aspherical shape by which a refractive power at a position of a maximum effective diameter is stronger than a refractive power near an optical axis.

63. The zoom lens according to claim 1, wherein an object side surface of a lens closest to the image side in a lens group closest to the object side in the middle group has an aspherical shape by which a refractive power at a position of a maximum effective diameter is weaker than a refractive power near an optical axis.

64. The zoom lens according to claim 1, wherein an image side surface of a lens closest to the object side in a lens group closest to the object side in the middle group has an aspherical shape by which a refractive power at a position of a maximum effective diameter is weaker than a refractive power near an optical axis.

65. The zoom lens according to claim 1, wherein a paraxial curvature radius of an object side surface of a lens closest to the image side in the second lens group is Rc2ef, a curvature radius of the object side surface of the lens closest to the image side in the second lens group at a position of a maximum effective diameter is Ry2ef, and Conditional Expression (46) is satisfied, which is represented by $$0.1 < Rc2ef/Ry2ef < 0.999 \tag{46}.$$

66. The zoom lens according to claim 1, wherein a paraxial curvature radius of an image side surface of a lens closest to the object side in the second lens group is Rc21r, a curvature radius of the image side surface of the lens closest to the object side in the second lens group at a position of a maximum effective diameter is Ry21r, and Conditional Expression (47) is satisfied, which is represented by $$1.001 < Rc21r/Ry21r < 4.5 \tag{47}.$$

67. The zoom lens according to claim 1, wherein a paraxial curvature radius of an object side surface of a lens closest to the image side in a lens group closest to the object side in the middle group is Rc3ef, a curvature radius of the object side surface of the lens closest to the image side in the lens group closest to the object side in the middle group at a position of a maximum effective diameter is Ry3ef, and Conditional Expression (48) is satisfied, which is represented by $$0.1 < Rc3ef/Ry3ef < 0.999 \tag{48}.$$

68. The zoom lens according to claim 1, wherein a paraxial curvature radius of an image side surface of a lens closest to the object side in a lens group closest to the object side in the middle group is Rc31r, a curvature radius of the image side surface of the lens closest to the object side in the lens group closest to the object side in the middle group at a position of a maximum effective diameter is Ry31r, and Conditional Expression (49) is satisfied, which is represented by $$0<Rc31r/Ry31r<0.999 \qquad (49).$$

69. The zoom lens according to claim 1, wherein
a paraxial curvature radius of an object side surface of a lens closest to the image side in the second lens group is Rc2ef,
a paraxial curvature radius of an image side surface of a lens closest to the image side in the second lens group is Rc2er,
a curvature radius of the object side surface of the lens closest to the image side in the second lens group at a position of a maximum effective diameter is Ry2ef,
a curvature radius of the image side surface of the lens closest to the image side in the second lens group at the position of the maximum effective diameter is Ry2er, and
Conditional Expression (50) is satisfied, which is represented by $$1.05<(1/Rc2ef-1/Rc2er)/(1/Ry2ef-1/Ry2er)<5 \qquad (50).$$

70. The zoom lens according to claim 1, wherein
a paraxial curvature radius of an object side surface of a lens closest to the object side in the second lens group is Rc21f,
a paraxial curvature radius of an image side surface of the lens closest to the object side in the second lens group is Rc21r,
a curvature radius of the object side surface of the lens closest to the object side in the second lens group at a position of a maximum effective diameter is Ry21f,
a curvature radius of the image side surface of the lens closest to the object side in the second lens group at the position of the maximum effective diameter is Ry21r, and
Conditional Expression (51) is satisfied, which is represented by $$0.4<(1/Rc21f-1/Rc21r)/(1/Ry21f-1/Ry21r)<0.99 \qquad (51).$$

71. The zoom lens according to claim 1, wherein
a paraxial curvature radius of an object side surface of a lens closest to the image side in a lens group closest to the object side in the middle group is Rc3ef,
a paraxial curvature radius of an image side surface of the lens closest to the image side in the lens group closest to the object side in the middle group is Rc3er,
a curvature radius of the object side surface of the lens closest to the image side in the lens group closest to the object side in the middle group at a position of a maximum effective diameter is Ry3ef,
a curvature radius of the image side surface of the lens closest to the image side in the lens group closest to the object side in the middle group at the position of the maximum effective diameter is Ry3er, and
Conditional Expression (52) is satisfied, which is represented by $$1.01<(1/Rc3ef-1/Rc3er)/(1/Ry3ef-1/Ry3er)<2 \qquad (52).$$

72. The zoom lens according to claim 1, wherein
a paraxial curvature radius of an object side surface of a lens closest to the object side in a lens group closest to the object side in the middle group is Rc31f,
a paraxial curvature radius of an image side surface of the lens closest to the object side in the lens group closest to the object side in the middle group is Rc31r,
a curvature radius of the object side surface of the lens closest to the object side in the lens group closest to the object side in the middle group at a position of a maximum effective diameter is Ry31f,
a curvature radius of the image side surface of the lens closest to the object side in the lens group closest to the object side in the middle group at the position of the maximum effective diameter is Ry31r, and
Conditional Expression (53) is satisfied, which is represented by $$1.1<(1/Rc31f-1/Rc31r)/(1/Ry31f-1/Ry31r)<3 \qquad (53).$$

73. The zoom lens according to claim 1,
wherein Conditional Expression (1-1) is satisfied, which is represented by $$7.5<ft/fw<20 \qquad (1-1).$$

74. An imaging apparatus comprising the zoom lens according to claim 1.

\* \* \* \* \*